US011640013B2

(12) United States Patent
Garrett et al.

(10) Patent No.: US 11,640,013 B2
(45) Date of Patent: May 2, 2023

(54) WEATHER-DETECTING DEVICES AND RELATED METHODS

(71) Applicant: University of Utah Research Foundation, Salt Lake City, UT (US)

(72) Inventors: Timothy John Garrett, Salt Lake City, UT (US); Florian Solzbacher, Salt Lake City, UT (US); Konstantin Shkurko, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 435 days.

(21) Appl. No.: 16/755,812

(22) PCT Filed: Oct. 15, 2018

(86) PCT No.: PCT/US2018/055954
§ 371 (c)(1),
(2) Date: Apr. 13, 2020

(87) PCT Pub. No.: WO2019/075484
PCT Pub. Date: Apr. 18, 2019

(65) Prior Publication Data
US 2020/0326456 A1 Oct. 15, 2020

Related U.S. Application Data

(60) Provisional application No. 62/572,199, filed on Oct. 13, 2017.

(51) Int. Cl.
*G01W 1/14* (2006.01)
(52) U.S. Cl.
CPC ................................... *G01W 1/14* (2013.01)

(58) Field of Classification Search
CPC ...................................................... G01W 1/14
See application file for complete search history.

(56) References Cited

U.S. PATENT DOCUMENTS

| | | |
|---|---|---|
| 4,333,004 A | 6/1982 | Forgue et al. |
| 5,790,026 A | 8/1998 | Lardiere, Jr. et al. |
| 2007/0273394 A1* | 11/2007 | Tanner ................... G01P 13/02 324/664 |

(Continued)

OTHER PUBLICATIONS

Ma et al.; "Wireless Remote Weather Monitoring System based on MEMS Technologies." MDPI; Sensors; Mar. 1, 2011; vol. 11, Issue 3; pp. 2715-2727.

(Continued)

*Primary Examiner* — Ricky Go
(74) *Attorney, Agent, or Firm* — Thorpe North & Western, LLP

(57) ABSTRACT

A weather-detecting device (100) can include a substrate (102) and a detection region (106) exposed to an environment within which the weather-detecting device (100) is situated when in use. An array (110) of heating elements (112) can be mounted at a first side of the substrate (102), with at least one surface of each heating element (112) in the array (110) being positioned within the detection region (106). A controller can be electrically coupled to the array (110) of heating elements (112), and the controller can individually address each heating element (112) in the array (110) to selectively pass electrical current through each heating element (112).

29 Claims, 49 Drawing Sheets

(56) References Cited

U.S. PATENT DOCUMENTS

| | | | | |
|---|---|---|---|---|
| 2013/0019618 | A1* | 1/2013 | Veerasamy | B60S 1/087 62/85 |
| 2014/0007654 | A1 | 1/2014 | Lillie et al. | |
| 2016/0247273 | A1 | 8/2016 | Fallgatter et al. | |
| 2017/0176062 | A1* | 6/2017 | Qazi | F25B 21/04 |
| 2019/0181323 | A1* | 6/2019 | Lee | H01L 35/32 |

OTHER PUBLICATIONS

PCT Application No. PCT/US18/55954 Filing date Oct. 15, 2018; Timothy John Garrett, International Search Report, dated Feb. 4, 2019; 11 Pages.

\* cited by examiner

WEATHER-DETECTING DEVICES AND RELATED METHODS

RELATED APPLICATION

This application claims priority to U.S. Provisional Application No. 62/572,199, filed Oct. 13, 2018 which is incorporated herein by reference.

STATEMENT REGARDING FEDERALLY SPONSORED RESEARCH OR DEVELOPMENT

This invention was made with government support under Grant No. AGS1127692 awarded by the National Science Foundation and Grant No. NNX13AB34A awarded by the National Aeronautics and Space Administration. The Government has certain rights in the invention.

TECHNICAL FIELD

The present disclosure relates to weather-detecting devices, such as, for example, devices for detecting precipitation.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Weather stations are employed in such environments as homes, airports, roadsides, industrial sites, farms, and battlefields. Weather stations are generally capable of providing precise measurements of temperature, humidity, pressure, and/or winds. Often, however, weather stations are incapable of providing highly desirable information regarding precipitation. For example, few weather stations detect rain, and even fewer weather stations are capable of identifying snow and/or differentiating reliably between the two.

Some precipitation monitors and present-weather sensors (PWS) that may be incorporated into weather stations are presently used in the scientific, weather-monitoring, communications, agricultural, military, insurance, and transportation-safety sectors. Certain of these devices are capable of measuring aspects of both rain and snowfall, but have high power demands (e.g., 600 W) that make them impractical for some environments (e.g., remote roadsides) and/or expensive or burdensome to operate. Further, the devices require sheltered conditions in order to function as designed and are expensive. Certain present-weather sensors that can measure and identify rain and snow are inaccurate at low precipitation rates or around the freezing point, thus limiting their utility for identification of frozen hydrometeors, which are generally present in such conditions.

Disclosed herein are various embodiments of weather-detecting devices that that include one or more advantages over known devices. For example, certain embodiments ameliorate or eliminate one or more of problems discussed above. In various embodiments, a weather detecting device includes an array of small heating elements. Each heating element in the array can operate independently, or stated otherwise, may be individually addressable. If one or more heating elements are electrically connected, then such a collection are considered a single heating element with respect to s The heating elements can function as pixels by which information regarding one or more properties of hydrometeors or other weather phenomena may be obtained. For example, some embodiments of a weather-detecting device are configured to determine the presence, rate, and/or type of precipitation encountered by the device. These and other or further features and advantages of the weather-sensing devices will be apparent from the disclosure that follows.

Figure 1:
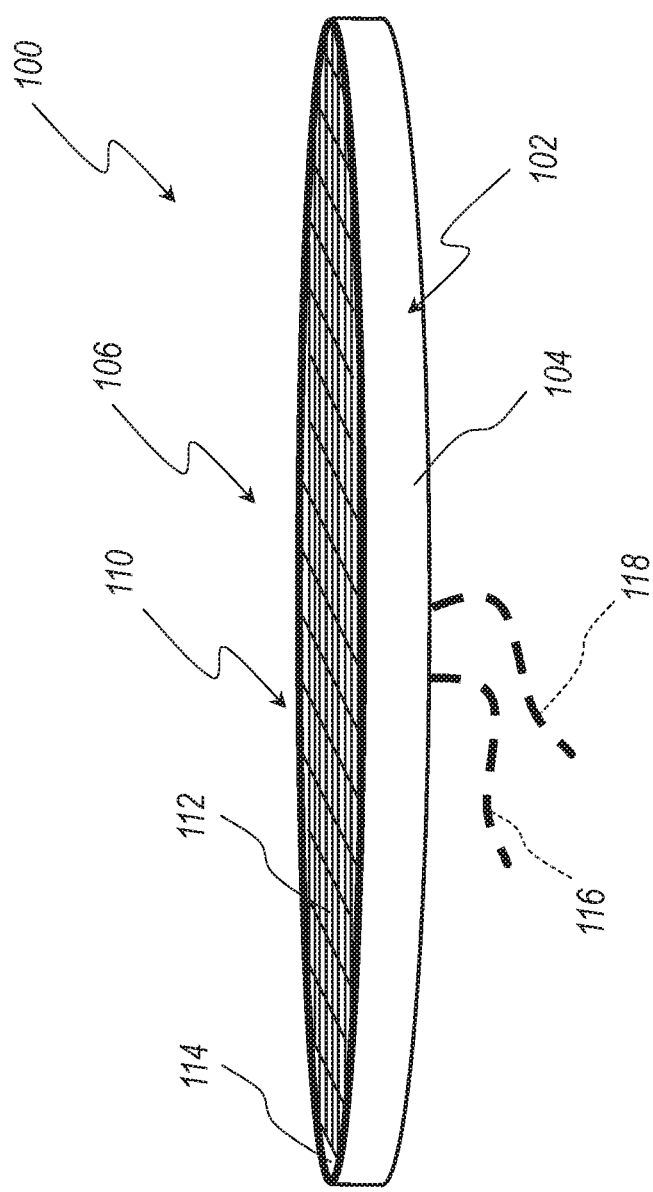
FIG. 1 is a perspective view of an embodiment of a weather-detecting device that includes a substantially circular array of heating elements.

FIG. 1 is a perspective view of an embodiment of a weather-detecting device 100. As further discussed hereafter, the weather-detecting device can be configured to detect, measure, and/or characterize one or more of a variety of properties of a weather system, such as one or more of the presence, rate, size, shape, structure (e.g., microstructure) mass, density or wetness, or total amount of precipitation; the presence, speed, or direction of wind; and/or the presence or behavior of turbulence or micro-turbulence. In many instances, the device 100 is particularly useful for monitoring or measuring properties of precipitation, and may operate in manners that are advantageous relative to other systems that purport to perform the same or similar precipitation-related functions. Accordingly, the device 100 may also or alternatively be referred to as a precipitation-detection device. In other or further instances, the device 100 may also or alternatively be referred to as a wind sensor. The terms "detect" or "detection" are used in a broad sense, and are not limited to the detection of the absence or presence of a particular event, such as precipitation, but are sufficiently broad to include the detection, measurement, and/or characterization of other properties of the event, such as those previously mentioned (e.g., presence, rate, size, shape, structure, or mass of precipitation). In some embodiments, the device 100 is configured solely for use in detecting, measuring, and/or characterizing precipitation. In other or further embodiments, the device 100 may be configured to detect, measure, or characterize weather phenomena in addition to or instead of precipitation. In various embodiments, the device 100 may function as a present-weather sensor. While the present disclosure describes illustrative embodiments primarily in the context of precipitation detection, this focus should not be construed as limiting. Moreover, as discussed further below, although the present disclosure describes illustrative embodiments in the context of weather detection, this focus should not be construed as limiting either.

The weather-detecting device 100 includes a base 102 that supports a detection region 106. In the illustrated embodiment, the base 102 includes a housing 104 or other suitable packaging component that protects electronic components from the elements. The illustrated detection region 106 is substantially circular, although any other suitable shape is contemplated. The illustrated detection region 106 is substantially planar and provides a surface upon which precipitation can be positioned (e.g., can land) to permit the device 100 to interact therewith. The illustrated detection region 106 is configured to be positioned in an upwardly facing direction. Stated otherwise, in the illustrated embodiment, the substantially planar detection region 106 defines a surface normal that is directed vertically upward (i.e. with respect to gravity) when the device 100 is in use. Such an orientation may be particularly advantageous for determining precipitation properties. Other orientations are also possible. For example, the detection region 106 may face any suitable direction, such as when used to detect wind or turbulence properties. In some instances, a surface normal of the detection region 106 may be directed horizontally with respect to gravity, such as when the device 100 is wall mounted. The device 100 can be mounted directly in a desired position or can include positionable mounting hardware which allows the device 100 to be manually or automatically repositioned. Such positionable mounting hardware can include, but is not limited to, jointed armatures, gear-driven joints, and the like.

The weather-detecting device 100 includes a two-dimensional array 110 of heating elements 112. The heating elements 112 may also be referred to as hotplates, as they can be configured to function as miniature hotplates. The term "hotplate" should not be construed to necessarily require the elements 112 to have a plate-like shape, although in many embodiments, at least a portion of each heating element 112 may include such a plate-like or planar shape. In some embodiments, the heating elements or hotplates 112 are on the order of tens or hundreds of microns in size, or stated otherwise, may have a maximum dimension of no greater than one or a few millimeters (e.g. less than 8 mm or less than 4 mm), and thus may be referred to as micro-hotplates.

In the illustrated embodiment, the array 110 of heating elements 112 is substantially circular and generally corresponds to the same size and shape of the detection region 106 generally. In some embodiments, the array 110 of heating elements 112 defines the detection region 106. For example, in some embodiments, the heating elements 112 are directly exposed to an environment in which the weather-detecting device 100 is positioned. Accordingly, wind may traverse across exposed surfaces of the heating elements 112, precipitation may land directly on and come into direct contact with the heating elements 112, and so on. In other embodiments, the heating elements 112 may be shielded from direct contact with the surrounding environment. For example, in some embodiments, the detection region 106 may include a protective layer attached to the heating elements 112 that prevents the heating elements 112 from directly contacting the surrounding environment. The protective layer may be thin and/or can have a high thermal conductivity to permit the heating elements 112 to readily thermally interact with the environment. In either case, the heating elements 112 are positioned within the detection region 106.

In the illustrated embodiment, the heating elements 112 are mounted on a substrate 114. Any suitable substrate material is contemplated, such as silicon, glass, ceramics, or polymers as bulk material or a thin film. The substrate 114 can electrically isolate the heating elements 112 from each other. In various embodiments, the weather-detecting device 100 is manufactured using nanofabrication techniques.

In some embodiments, the weather-detecting device 100 includes one or more electrical leads 116 or cables by which electrical power is provided to the device. In other or further embodiments, the weather-detecting device 100 includes one or more communication lines 118 by which the weather-detecting device 100 communicates with other components of a weather station and/or with a processing or control hub to which additional weather-detecting devices are communicatively coupled. For example, in some instances, a distributed array of devices 100 may form a network having a large geographic footprint from which data can be gathered and analyzed. The one or more communication lines 118 can comprise any suitable mode of information transport, such as one or more wires or cables conforming to any suitable communication standard, such as one or more Ethernet cables, optical fibers, etc. In other or further embodiments, the weather-detecting device 100 is configured to communicate wirelessly with a weather station and/or other data processing system. Any suitable wireless protocol may be used, including but certainly not limited to, Bluetooth, Wi-Fi, or ZigBee.

Any suitable type of communications network can be used as the mechanism for transmitting data between the weather-detecting device 100 and other components of a weather station and/or data processing systems, according to any suitable protocols and techniques. In addition to those previously mentioned, further examples include the Internet, cellular telephone networks, EDGE, 3G, 4G, long term evolution (LTE), Session Initiation Protocol (SIP), Short Message Peer-to-Peer protocol (SMPP), SS7, Hypertext Transfer Protocol (HTTP), Secure Hypertext Transfer Protocol (SHTTP), Transmission Control Protocol/Internet Protocol (TCP/IP), and/or the like, and/or any combination thereof. In some embodiments, data obtained via one or more weather-detecting devices 100 may be stored in one or more cloud-based storage systems.

Figure 2A:
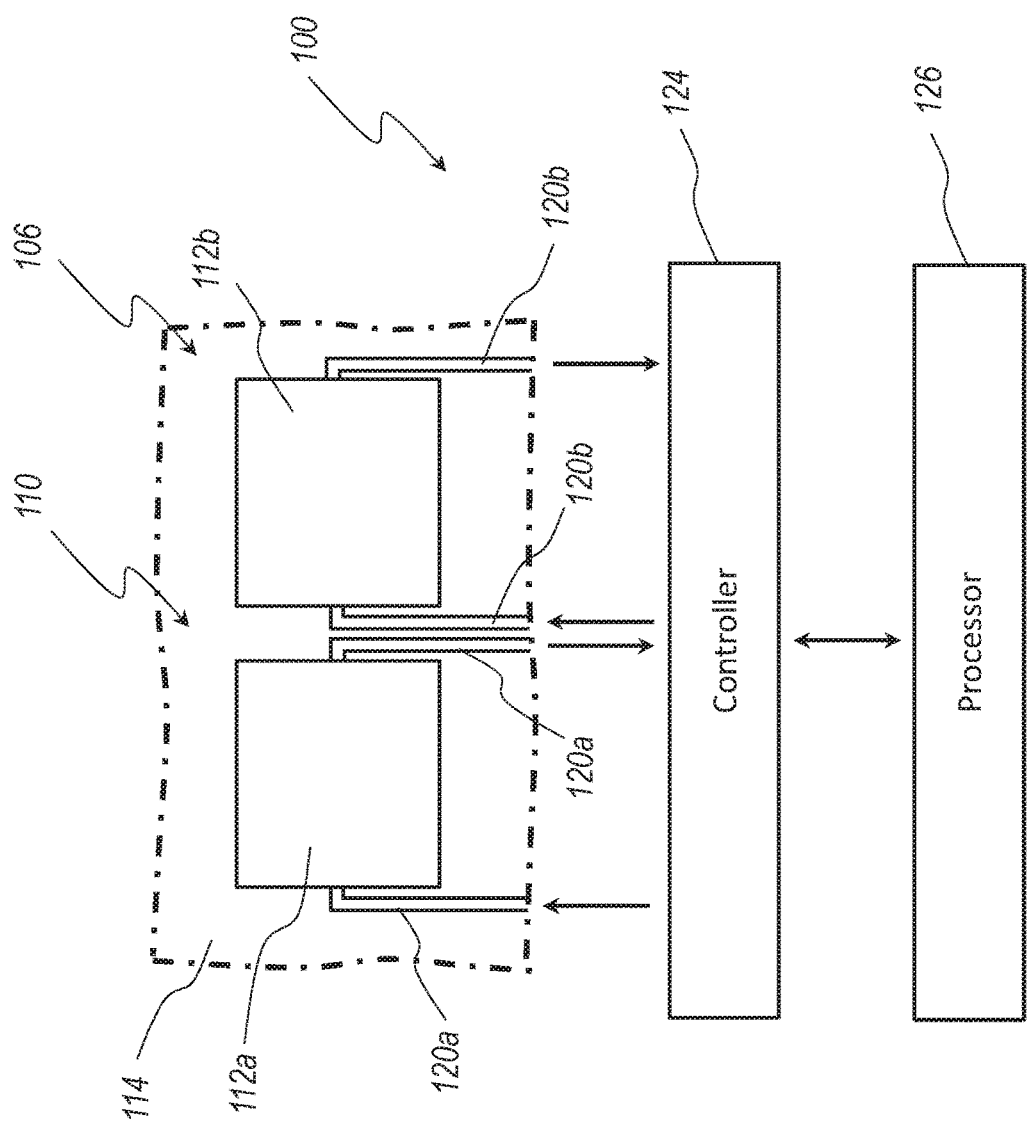
FIG. 2A depicts a plan view of a portion of the weather-detecting device of FIG. 1 and a schematic view of additional portions of the weather-detecting device, wherein the plan view depicts two of the heating elements of the array and electrical leads connected thereto.

FIG. 2A depicts a plan view of a portion of the weather-detecting device 100, along with a schematic view of a controller 124 and a processor 126. Two heating elements 112a, 112b are shown as representative members of the array 110. The heating element 112a is electrically coupled with two electrical traces 120a, and the heating element 112b likewise is electrically coupled with two electrical traces 120b. The traces 120a, 120b are electrically coupled with a controller 124 in any suitable manner. For example, in the illustrated embodiment, the electrical traces 120a, 120b are deposited on the substrate 114, such as by wire bonding or any suitable semiconductor or microelectromechanical systems (MEMS) or advanced semiconductor and electronic device packaging or lamination fabrication technique or techniques (deposition, electroplating, etc.). In some embodiments, such as when the total number of heating elements 112 is relatively small, there may be sufficient room between adjacent heating elements 112 to permit the electrical traces 120 to be routed to a periphery of the substrate 114, while maintaining a small distance between adjacent heating elements 112. In some instances, the traces 120 may be coupled with pins or sockets (not shown) at the periphery of the substrate that electrically interface with the controller 124, much like a common semiconductor chip.

The controller 124 can be configured to individually, or independently, address each heating element in the array 110. In the embodiment depicted in FIG. 2A, the controller addresses the heating element 112a by way the traces 120a and addresses the heating element 112b by way of the traces 120b. In some embodiments, the controller 124 includes multiple individual controllers that are each dedicated to operating an individual heating element 112a, 112b. In such instances, the individual controllers may be referred to collectively as the controller 124.

The controller 124 delivers electrical current through the heating elements 112a, 112b to heat the elements to a target temperature and/or to maintain the elements at the target temperature. The target temperature may also be referred to as a set-point, which can be used by the controller 124 in any suitable manner. In some embodiments, the target temperature for each heating element 112a, 112b is a fixed, predetermined value that is preprogrammed into the controller 124. In other embodiments, the target temperature may be dynamically assignable, such that a user may select the target temperature via the processor 126.

In some embodiments, the target temperature is selected (e.g., preselected or dynamically selected) to optimize heat transfer to hydrometeors positioned on the detection region 106 and/or to optimize the power consumption efficiency of the device 100. For example, in some embodiments, the target temperature is selected to be higher than an ambient temperature of the environment within which the detector 100 is positioned by an amount that rapidly heats the hydrometeors to evaporate or sublimate the hydrometeors, but is not so high that a vapor barrier builds at the surface of the detection region 106 to inhibit heat transfer. Such a vapor barrier can result from the Leidenfrost effect such that temperature can be set to evaporate water with the nucleation boiling point regime where such a vapor barrier does not form while also maintaining heat transfer from the heating element to the hydrometeor. In some embodiments, the target temperature is within a range of from about 120° C. to about 140° C., is no less than about 120° C., is no more than about 130° C., is about 120° C., or is about 130° C.

The controller 124 and/or the processor 126 can determine the actual or instantaneous temperature of the heating elements 112a, 112b in any suitable manner. For example, in some embodiments, the controller 124 and/or the processor 126 determine or assess a temperature-dependent electrical resistance of the heating elements 112a, 112b. In some embodiments, the resistance of a heating element 112a, 112b is used as a surrogate for the target temperature based on a defined relationship between the resistance and temperature of the heating element. Thus, in some embodiments, a resistance that represents the target temperature is selected as the set-point for the controller 124.

The controller 124 may be of any suitable variety. For example, in some embodiments, the controller 124 is a proportional-integral-derivative controller (PID controller). Such a controller may be configured to actuate the heating elements in a variety of manners. For example, a PID controller can be configured to provide current to the heating elements 112a, 112b by amounts proportional to a size of their deviation from the set-point value. To this end, the PID controller can control an amplitude, frequency, and/or duration of current delivery to the heating elements 112a, 112b. For example, in some embodiments, the controller 124 may deliver pulses of electrical current that have a fixed amplitude to the heating elements 112a, 112b, and the pulses may deliver the pulses at a fixed frequency. The controller 124 may employ pulse-width modulation to control the amount of electrical power delivered to the heating elements 112a, 112b. In other embodiments, the controller 124 may modulate a frequency and/or an amplitude of current delivery to impart a determined amount of power to the heating elements 112a, 112b.

In some embodiments, the controller 124 is an advanced process controller (APC) that incorporates inferential, model, and/or proprietary control and computational techniques.

In embodiments, the controller 124 is a more simplistic feedback controller that operates in a binary manner, or stated otherwise, operates in either an "on" state or "off" state. Such an approach can resemble operation of traditional thermostats, or stated otherwise, may employ two-point control. When in the "on" state, the controller 124 may deliver current to a given heating element in a constant or consistent manner. For example, the controller 124 may deliver pulses of current to the heating element, and the pulses may be of a fixed duration and amplitude and delivered at a fixed frequency. When in the "off" state, the controller 124 can terminate or otherwise withhold delivery of current to the heating element. The controller 124 may thus merely determine whether the heating element is operating at or above the set-point or target temperature: if so, the controller 124 can respond by transitioning to or remaining in the off state; otherwise, if the heating element is at a temperature below the target temperature, the controller 124 can respond by transitioning to or remaining in the on state.

A simple feedback controller 124 can be less computationally intense than a PID controller, and thus may operate quicker and/or in a more power-efficient manner. In some embodiments, such a feedback controller 124 can be advantageous for its quicker response times and higher temporal resolution. Further, the binary nature of the feedback controller 124 can readily or directly provide digital information to the processor 126 without any need for prior computation or conversion (e.g., analogue-to-digital conversion). This feature can also yield a quicker response time and higher temporal resolution for the weather-detecting device 100.

In various embodiments that employ two-point control, such as just described, the controller 124 may employ a sampling rate (e.g. an oversampling rate) that is significantly faster than a time constant of the heating elements. That is, a large number of samples may be obtained during the course of a particular cooling event, such as the evaporation of a hydrometeor. In various embodiments, an oversampling rate may be no less than 100 or no less than 1000 times faster than an inverse of the time constant of the heating elements. As described further below, such operation can lead to a direct digital, pulse-width modulation (PWM) output signature to retain the heating element at a target temperature, which can then be equated with the power used to melt and evaporate, or to sublimate, the portion of a hydrometeor positioned over that heating element.

In certain embodiments, the controller 124 is a microcontroller or a microprocessor. For example, in some embodiments, the controller 124 is formed as an application-specific integrated circuit (ASIC). In some embodiments, the controller 124 and the processor 126 are integrated into the same device, such as, for example the same ASIC. In other or further embodiments, the processor 126 may be separate from the controller 124. For example, in some embodiments, the processor 126 may be separate from the weather-detecting device 100 and may be configured to communicate with the device 100 via the communication line 118 and/or via a wireless interface.

The processor 126 can be configured to communicate with the controller 124 to obtain data regarding the heating elements 112a, 112b, process the data, output the processed data, and/or control operation of the controller 124 based on the processed data. As previously mentioned, the processor 126 may include a special purpose processing device, such as an ASIC, SoC, SiP, FPGA, PAL, PLA, FPLA, PLD, or other customized or programmable device. In other embodiments, the processor 126 may include a general purpose device, such as an Intel®, AMD®, NVIDIA®, Qualcomm®, Xilinx®, or other "off-the-shelf" microprocessor. Any suitable processing device or system is contemplated, such as any previously mentioned, an EG, a collection of microcontrollers and/or processors, or a GPU+CPU combination.

In some embodiments, the processor 126 is embodied in one or more computer systems, which may include one or more additional processors, and which can include memory. The computer systems may include various input devices and/or output devices. The memory may include static RAM, dynamic RAM, flash memory, one or more flip-flops, ROM, CD-ROM, DVD, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing processes described herein is readily provided by those of skill in the pertinent art(s) using the teachings presented here and programming languages and tools, such as Java, Pascal, C++, C, PHP, .Net, SQL and other database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Figure 2B:
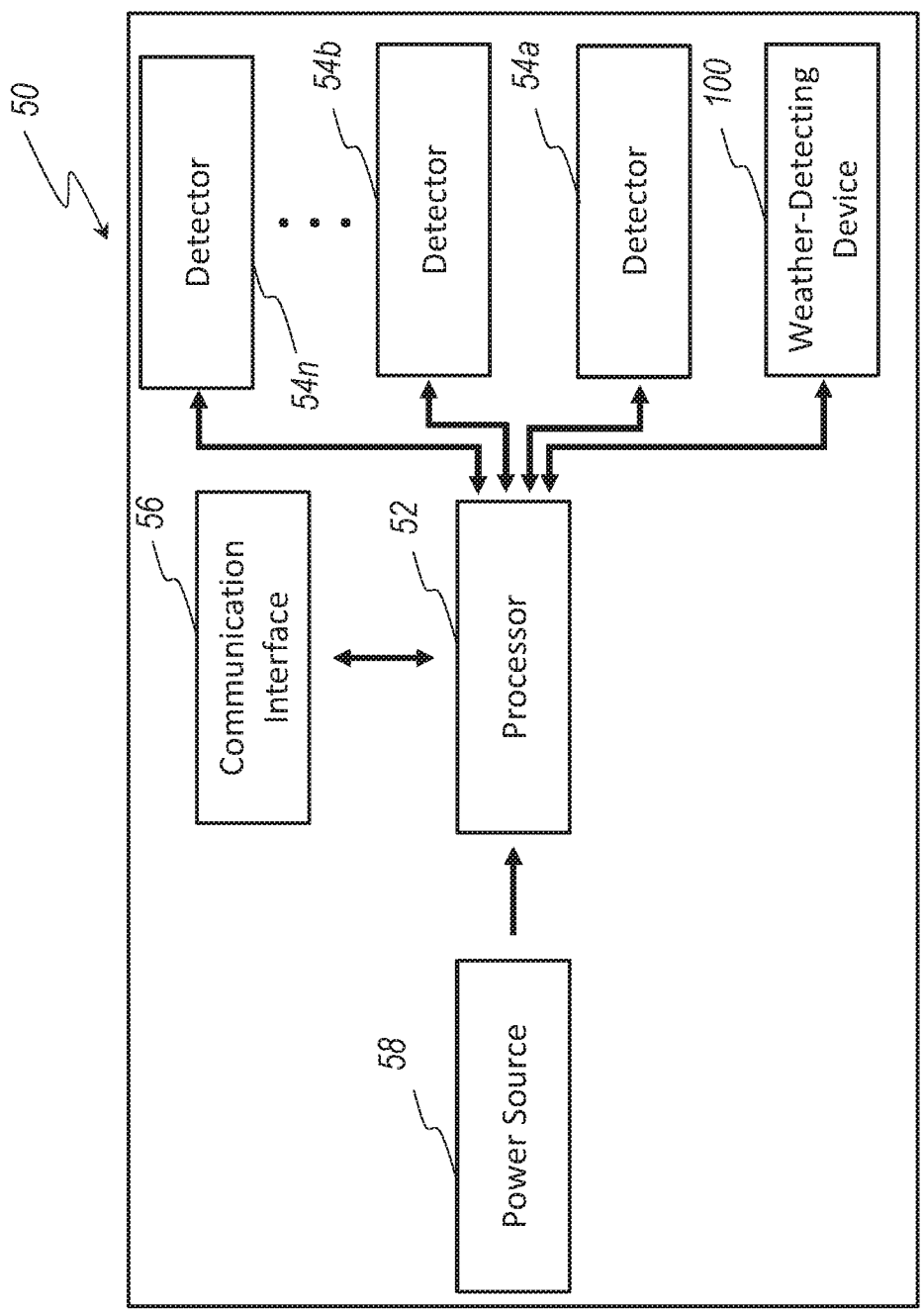
FIG. 2B depicts a schematic view of an embodiment of a weather-sensing system that includes the weather-detecting device of FIGS. 1 and 2A

FIG. 2B depicts a schematic illustration of a weather-sensing system 50 into which the weather-detecting device 100 may be incorporated. In some embodiments, the system 50 is a standalone weather sensor unit (e.g., a standalone unit such as that depicted in FIG. 21A). In other embodiments, the system 50 is a weather station. For example, in some instances, the weather-sensing system 50 (such as the standalone unit depicted in FIG. 21A) may be retroactively incorporated into an existing weather station. In other instances, a weather-detecting device 100 may itself be incorporated into a weather station, whether during initial fabrication of the weather station or by retroactive installation into an existing weather station.

The weather-sensing system 50 includes a processor 52 that is configured to control, communicate with, and/or otherwise interface with a plurality of detectors 54a, 54b, 54c. One of the detectors is the weather-detecting device 100. The other detectors may include one or more of a camera, a pressure sensor, a humidity sensor, a temperature sensor, wind speed sensor, or any other suitable detector. The processor 52 is further coupled to a communication interface 56 via which the system 50 can communicate with one or more further control or processing systems (see FIG. 2D) and/or other systems 50 (see FIGS. 2D and 2E). In certain embodiments, the communication interface may be configured to communicate over a wired or wireless network. For example, the communication interface 56 may be configured to communicate via any of the wireless networks mentioned above.

The weather-sensing system 50 can further include a power source 58 of any suitable variety. In some embodiments, the power source 58 may include hard wiring for connection to an electrical grid. In other embodiments, the power source 58 may include a local battery that may be recharged or replaced and may permit remote or autonomous functioning of the system 50. For example, a solar panel can be operatively connected to the local battery for recharging.

Figure 2C:
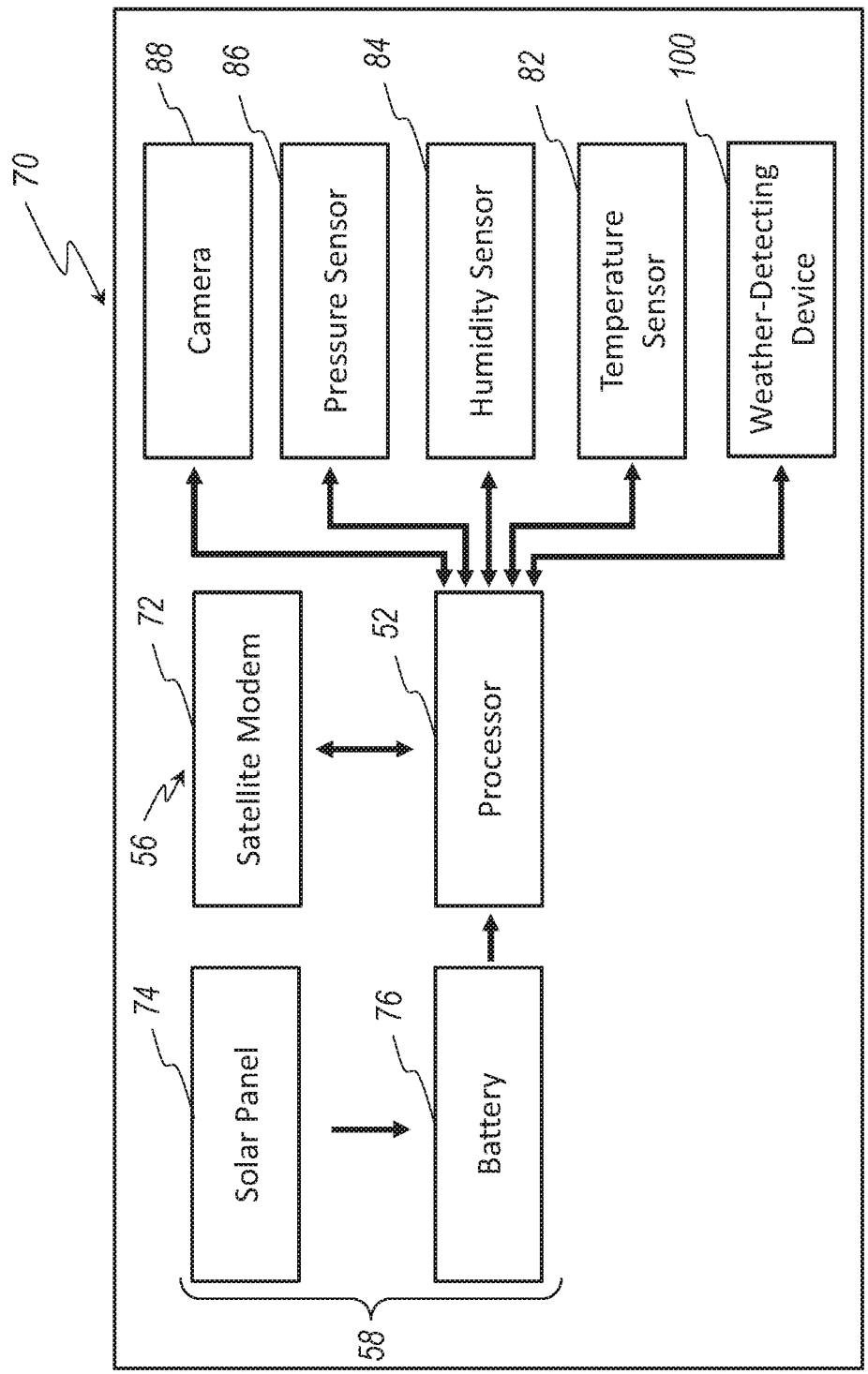
FIG. 2C depicts a schematic view of another embodiment of a weather-sensing system that includes the weather-detecting device of FIGS. 1 and 2A.

FIG. 2C depicts a schematic illustration of another embodiment of a weather-sensing system 70 that includes the weather-detecting device 100. The system 70 is a standalone weather sensor unit that may, in some embodiments, resemble the unit depicted in FIG. 21A. In addition to the weather-detecting device 100, the system 70 includes a temperature sensor 82, a humidity sensor 84, a pressure sensor 86, and a camera 88. In some embodiments, the camera 88 is a stereo camera that may be used to detect cloud cover and/or base height. The system 70 includes a processor 52 in communication with each of the weather-detecting device 100, the sensors 82, 84, 86, and the camera 88. The processor 52 may be configured to control one or more operational aspects of these components, receive data from these components, and/or process the data.

The system 70 includes a communication interface 56—specifically, the system 70 can include a satellite modem for communicating over a wireless network. The processor 52 is in communication with the satellite modem 72 to transmit information thereby and/or receive information therefrom.

The system 70 includes a renewable power source 58 in the form of a solar panel 74 and a rechargeable battery 76. The illustrated power source 58 can permit the system 70 to operate autonomously. The illustrated power source 58 may further permit the system 70 to operate in regions that are not readily serviced by exiting electrical grids.

Figure 2D:
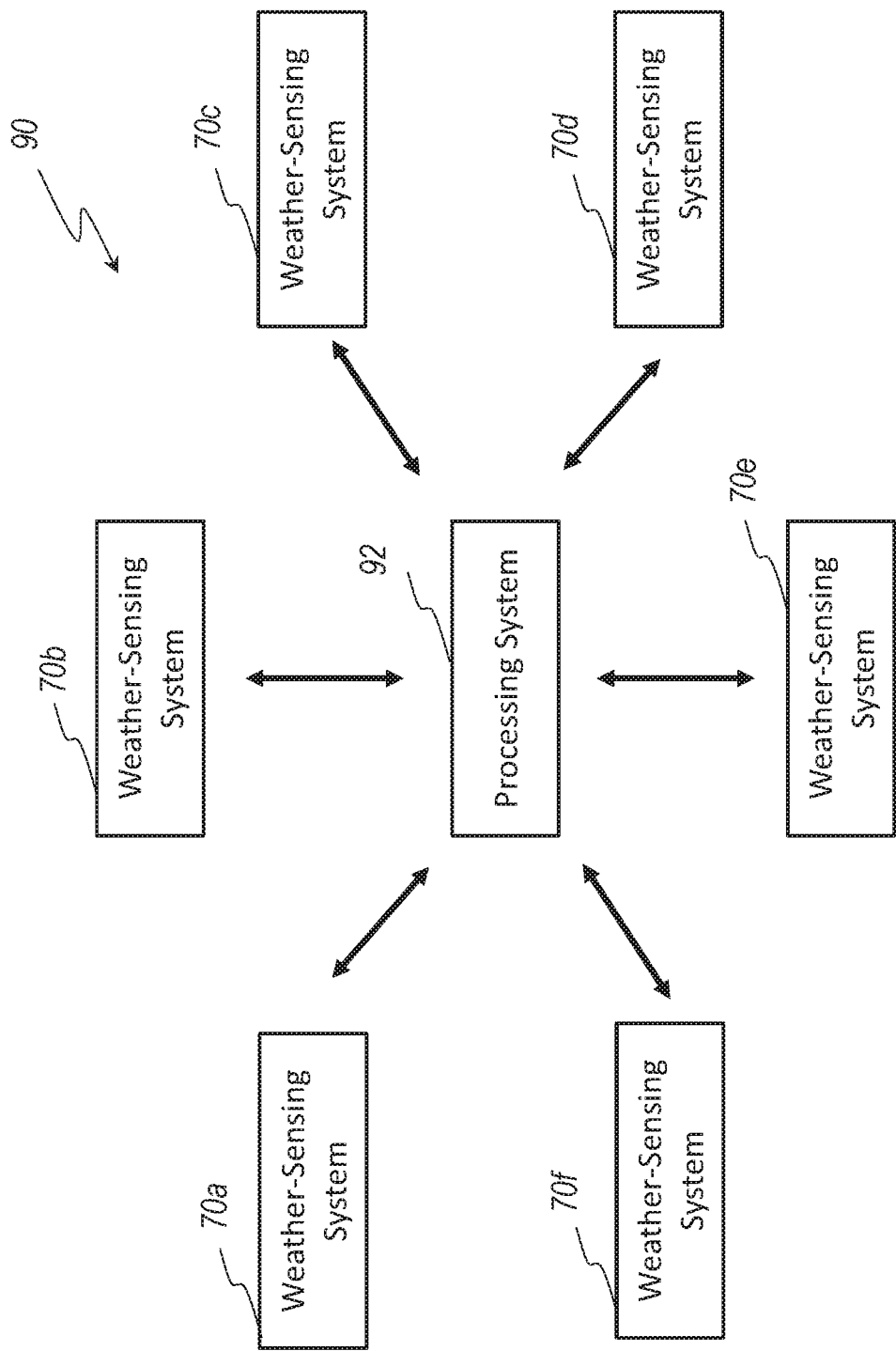
FIG. 2D depicts a schematic view of an embodiment of an array of weather-sensing systems, such as the weather-sensing system of FIG. 2C, arranged in a centralized network.

FIG. 2D depicts a schematic illustration of a centralized network 90 of weather-sensing systems 70a, 70b, 70c, 70d, 70e, 70f, such as the weather-sensing system of FIG. 2C. The weather-sensing systems 70a, 70b, 70c, 70d, 70e, 70f are distributed in an array, and each is communicatively coupled with a central processing system 92 of any suitable variety. The central processing system 92 may control one or more operational aspects of one or more of the weather-sensing systems 70a, 70b, 70c, 70d, 70e, 70f, receive data from one or more of the weather-sensing systems 70a, 70b, 70c, 70d, 70e, 70f, and/or process the data.

Figure 2E:
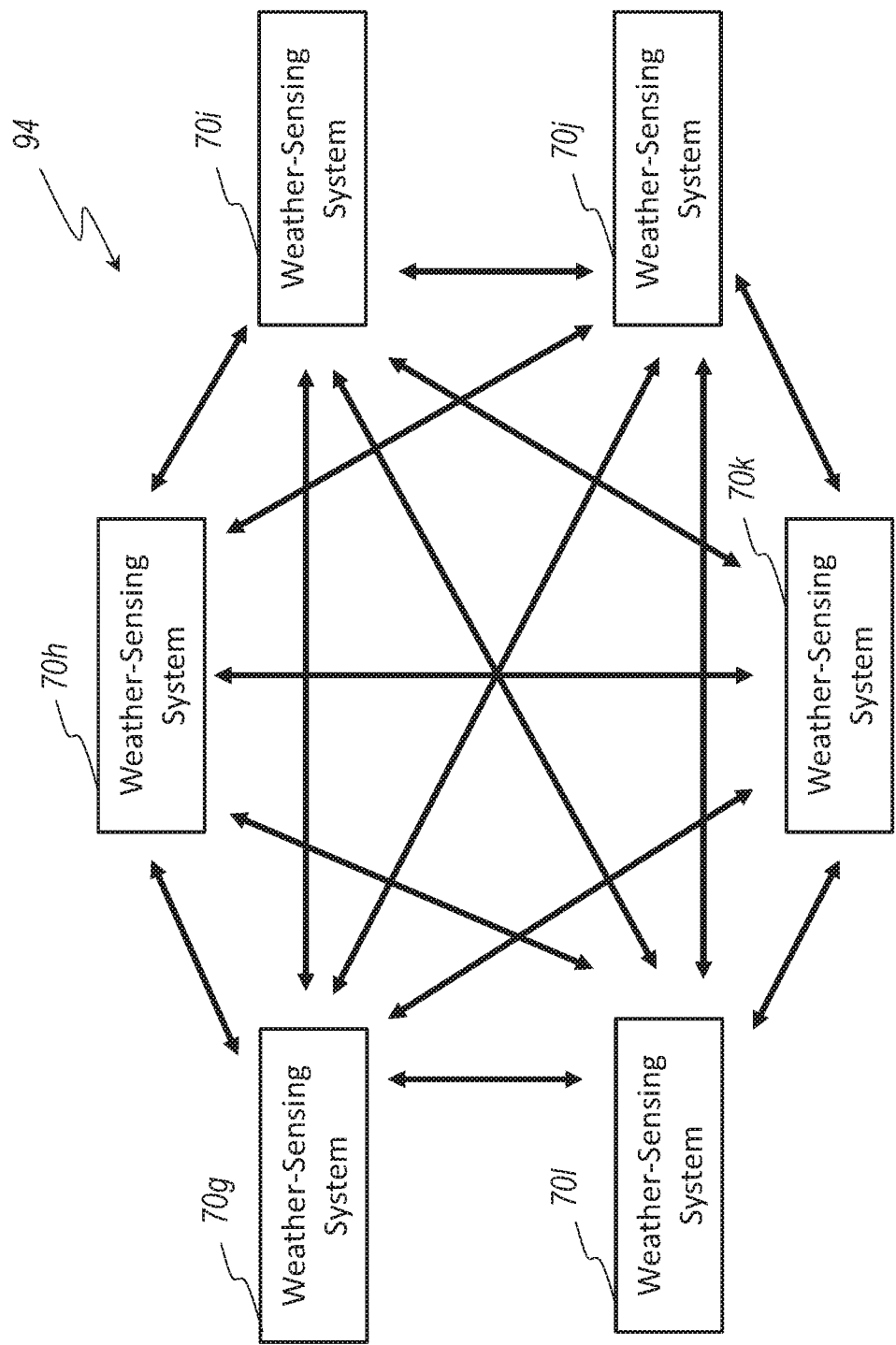
FIG. 2E depicts a schematic view of an embodiment of an array of weather-sensing systems, such as the weather-sensing system of FIG. 2C, arranged in a distributed network.

FIG. 2E depicts a schematic illustration of a distributed network 94 of weather-sensing systems 70g, 70h, 70i, 70j, 70k, 70l, such as the weather-sensing system of FIG. 2C. The weather-sensing systems 70g, 70h, 70i, 70j, 70k, 70l are distributed in an array, and each is communicatively coupled with all of the other weather-sensing systems in the array. One or more of the processors 52 (see FIG. 2C) of the weather-sensing systems 70g, 70h, 70i, 70j, 70k, 70l may control one or more operational aspects of one or more of the other weather-sensing systems 70g, 70h, 70i, 70j, 70k, 70l, receive data from one or more of the other weather-sensing systems 70g, 70h, 70i, 70j, 70k, 70l, and/or process the data.

In other embodiments, any suitable number of weather-sensing systems may be used. Fewer connections between the systems are also contemplated. For example, in other networks 94, some weather-sensing systems are only in communication with one, or some, but not all of the other weather-sensing systems. Moreover, any suitable combination or integration of centralized and distributed networks is contemplated.

Figure 3:
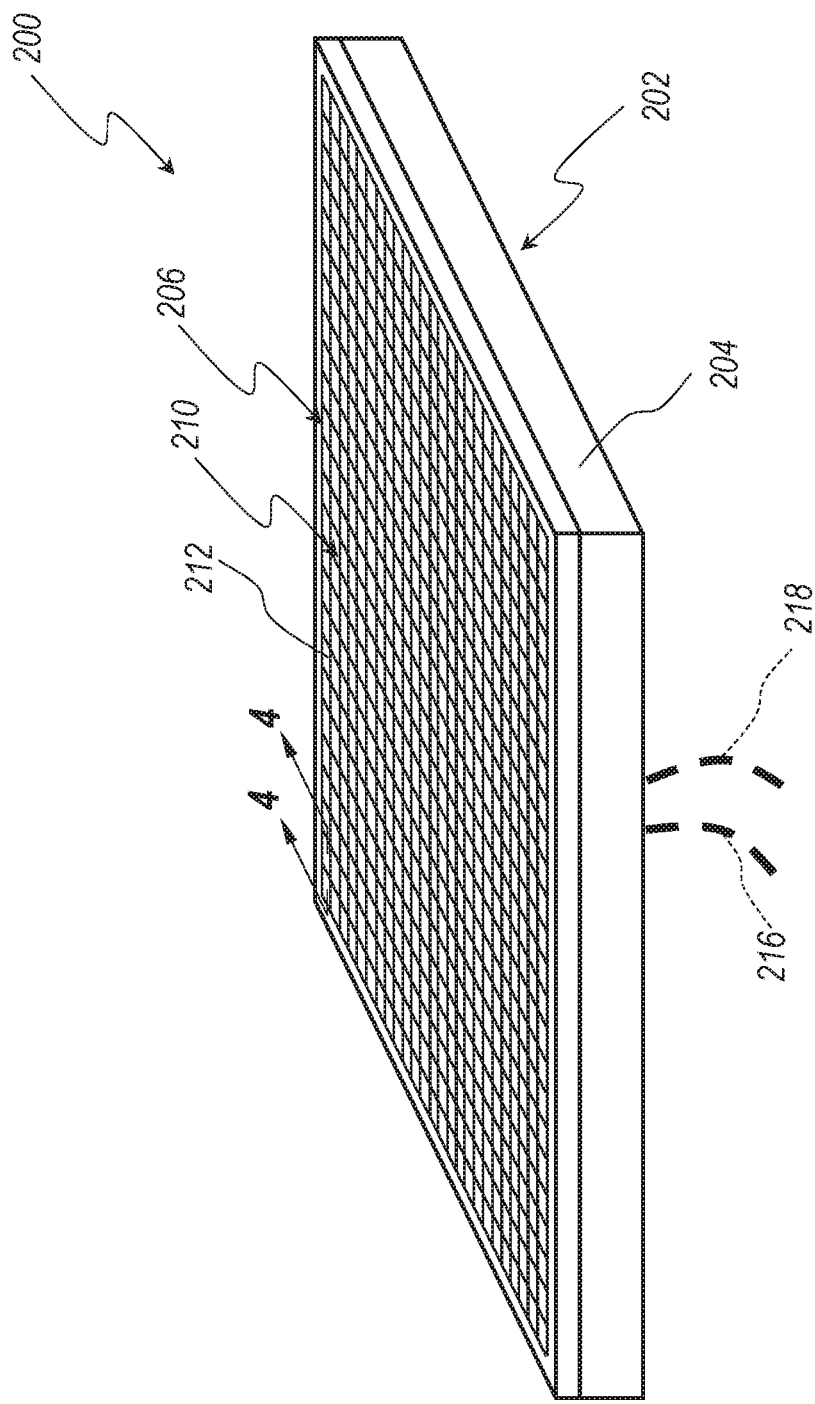
FIG. 3 is a perspective view of another embodiment of a weather-detecting device that includes a substantially square array of heating elements.

FIG. 3 is a perspective view of another embodiment of a weather-detecting device 200 that can resemble the weather-detecting device 100 described above in certain respects. Accordingly, like features are designated with like reference numerals, with the leading digits incremented to "2." Relevant disclosure set forth above regarding similarly identified features thus may not be repeated hereafter. Moreover, specific features of the weather-detecting device 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the weather-detecting device 200. Any suitable combination of the features and variations of the same described with respect to the weather-detecting device 100 can be employed with the weather-detecting device 200, and vice versa. For example, the weather-detecting device 200 may be incorporated into any of the systems described above into which the weather-detecting device 100 is incorporated. This pattern of disclosure applies equally to further embodiments depicted in subsequent figures and described hereafter, wherein the leading digits may be further incremented.

The weather-detecting device 200 a base 202 that supports a detection region 206. The illustrated detection region 206 is substantially square, although other shapes and configurations are contemplated. The detection region 206 includes a two-dimensional array 210 of heating elements 212. Each heating element 212 is substantially square and is coplanar with the remaining heating elements 212. In various embodiments, the weather-detecting device 200 includes one or more electrical leads 216 and/or communication lines 218. In other or further embodiments, the weather-detecting device 200 is configured for wireless communication in manners such as described above. The base 202 can include a controller module 204 that is configured to control operation of the array 210 of heating elements.

The weather-detecting device 200 can be very compact and easily incorporated into exiting weather stations. In various embodiments, the detection region 206 of the weather-detecting device has a diameter, or maximum dimension, of no greater than about 2 cm, 3 cm, 4 cm, 5 cm, or 10 cm. In other or further embodiments, an area of the detection region may be no greater than about 4 $cm^2$, 9 $cm^2$, 16 $cm^2$, 25 $cm^2$, 50 $cm^2$, or 100 $cm^2$. Further, the heating elements 212 can be very small, and in various embodiments, are sufficiently small and sufficiently densely packed to permit the device 200 to resolve hydrometeors of numerous or all types. The device 200 similarly may be able to resolve the spatial melting or sublimation patterns or profiles of the hydrometeors as they shrink. Stated otherwise, the array 210 of heating elements 212 can be viewed as an array of pixels. Accordingly, the terms heating elements and pixels may be used interchangeably herein. Heating elements 212 that are activated to heat a hydrometeor, when considered as pixels, provide a pixelated image of the hydrometeor. The array 210 of heating elements 212 can be similar to the pixel arrangement of a charge-coupled device (CCD), and imaging or other observations of the hydrometeors can proceed in manners similar to image processing for CCDs. Accordingly, although the heating elements 212 do not capture light or otherwise receive visual data from the hydrometeors, visualization of the hydrometeors or other data processing may nevertheless be carried out based on the pattern of heating elements that are activated to heat the hydrometeors. The device 200 thus can have a high spatial resolution, which can depend on the density and size of the heating elements 212. In some embodiments, the spatial resolution is less than 1 millimeter.

In various embodiments, the heating elements 212 are substantially square, with a side of each square measuring no greater than about 0.5 mm, 1 mm, 2 mm, or 5 mm. In other or further embodiments, the heating elements 212 have a surface area of no greater than about 0.25 $mm^2$, 0.5 $mm^2$, 1 $mm^2$, 2 $mm^2$, 3 $mm^2$, 4 $mm^2$, 9 $mm^2$, or 25 $mm^2$. In various embodiments, the array 210 of heating elements 212 has a density of no fewer than 10, 100, or 1,000 heating elements per square centimeter. In the illustrated embodiment, the square array 210 has a side length of 2.5 centimeters and includes a 25×25 array of heating elements 212. The array 210 has a density of 100 heating elements per square centimeter. In other embodiments, the array 210 has a side length of 2.5 centimeters, includes a 50×50 array of heating elements 212, and has a density of 400 heating elements per square centimeter. Such examples, are merely illustrative, as other configurations are contemplated.

The size of each heating element and/or the heating element density may be selected to permit no fewer than two, three, four or more or any other number of heating elements to be in simultaneous thermal contact with (e.g., positioned directly under) a hydrometeor of the smallest size of interest. Stated otherwise, the size of each heating element and/or the heating element density may be selected to provide a resolution sufficient to determine desired properties of hydrometeors of the smallest size of interest. For example, certain embodiments having a heating element diameter of about 0.5 millimeter and/or a density of about 400 heating elements per square centimeter can be capable of readily resolving hydrometeors having a diameter of no less than about 1 millimeter. For example, in certain of such embodiments, the devices may intercept such hydrometeors with no fewer than four heating elements.

Figure 4:
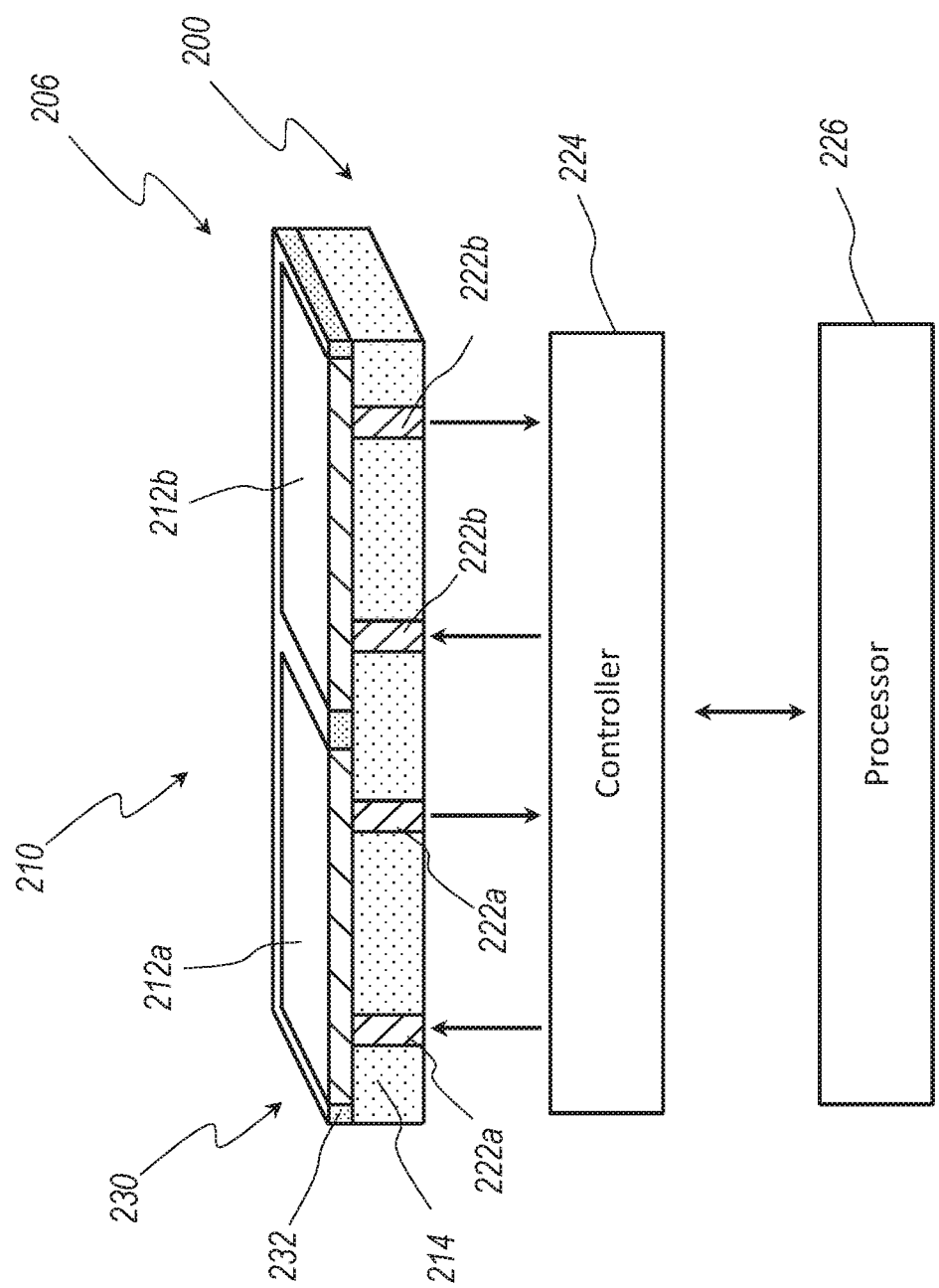
FIG. 4 depicts a cross-sectional perspective view of a portion of the weather-detecting device of FIG. 3 and a schematic view of additional portions of the weather-detecting device, wherein the cross-sectional perspective view depicts two of the heating elements of the array and vias connected thereto.

FIG. 4 depicts a cross-sectional perspective view of a portion of the weather-detecting device 200 and a schematic view of a controller 224 and a processor 226. The controller 224 and the processor 226 can be substantially the same as the various controller and processor configurations previously described. In some embodiments, one or more of the controller 224 and the processor 226 are mounted to substrate 214. In particular, the controller 224 and/or the processor 226 may be mounted to a side of the substrate 214 that is opposite the side on which the heating elements are mounted.

In the illustrated embodiment, the weather-detecting device 200 includes a MEMS chip 230. The chip 230 can include a substrate 214 to which the heating elements 212 are mounted. The substrate 214 can be of any suitable variety. For example, in various embodiments, the substrate 214 comprises silicon or glass. In one embodiment, the substrate 214 comprises a HermeS® glass wafer available from SCHOTT of Elmsford, N.Y. or a ceramic with electrical feedthroughs as available from Hereaus Technology Group and other manufacturers. Alternatively, a polymer substrate or a polymer film that is sufficiently heat resistant (e.g. KAPTON) can be used and mounted on a polymer frame or a conventional epoxy/glass fiber based (e.g. FR-4, FR-5) printed circuit board.

The cross-sectional perspective view of FIG. 4 depicts two representative heating elements of the array 210, which are identified as the elements 212a and 212b. The heating element 212a is electrically coupled to two vias 222a that extend through the substrate 214, and the heating element 212b is electrically coupled to two vias 222b that extend through the substrate 214. The controller 224 is electrically coupled to each of the vias 222a, 222b and is configured to individually address the heating elements 212a, 212b by way of the vias 222a, 222b, respectively. The vias 222a, 222b may be formed in any suitable manner. For example, in certain embodiments in which the substrate 214 is formed of silicon, the vias 222a, 222b can be formed using standard through-silicon via (TSV) methodologies. Similarly, in certain embodiments in which the substrate 214 is formed of glass, the vias 222a, 222b can be formed using standard through-glass via (TGV) methodologies.

In some instances, chip architecture that includes vias, such as that depicted in FIG. 4, can permit closer spacing of the heating elements, as compared with traditional electrical traces, such as those depicted in FIG. 2. In certain embodiments that include a large number of heating elements 212, the spacing may be significantly closer. For example, in various embodiments, the spacing between adjacent heating elements 212a, 212b can be no greater than about 0.1, 0.2, 0.3, 0.4, or 0.5 mm.

In some embodiments, the vias 222a, 222b can facilitate design of the MEMS chip 230. For example, the vias 222a, 222b can permit both the heating elements 212a, 212b and electrical contacts that are coupled to the vias 222a, 222b to be arranged in the same pattern at opposite sides of the substrate 214. In this manner, mapping the heating elements 212a, 212b and their associated contacts is greatly facilitated. In certain embodiments, the MEMS chip 230 can be bonded to any suitable controller 224 in any suitable manner. For example, in some embodiments, the controller 224 comprises an ASIC module, and the MEMS chip 230 is bonded to the ASIC module via standard flip chip bonding components and processes. Other arrangements are also contemplated, such as any of the illustrative controller options mentioned above. For example, in some embodiments, the controller 224 can comprise an off-the-shelf microcontroller, or collections or arrays of controllers (e.g., FPGA), that follow the architecture of the heating elements such that inputs to and outputs from the controller 224 are substantially beneath the respective heating elements associated with those inputs and outputs.

In the illustrated embodiment, a thermal barrier 232 is deposited on the substrate 214. The thermal barrier 232 encompasses each of the heating plates 212a, 212b and is configured to inhibit heat transfer between neighboring heating plates. Typically, the thermal barrier 232 can fully extend an entire peripheral edge of each heating plate(s) which are independently thermally addressable. Thermal isolation of the heating plates 212a, 212b, or inhibition of thermal transfer between the heating plates, can improve efficiency and/or the accuracy of the device 200. For example, when a hydrometeor, or a portion thereof, contacts the heating plate 212a, but not the heating plate 212b, only the heating plate 212a is initially cooled. If uninhibited thermal communication between the heating elements 212a, 212b is permitted, however, the heating plate 212b will also be cooled, thus making it more difficult to pinpoint which of the heating plates 212a, 212b is in direct thermal communication with the hydrometeor. Moreover, increasing the thermal efficiency of each heating plate 212a, 212b, or of the chip 230 more generally, yields a concomitant increase in the power consumption efficiency of the heating plates 212a, 212b and the chip 230. In certain embodiments, each heating plate within the array 210 is maintained at a target temperature that is within a range of from about 120° C. to about 130° C., is no less than about 120° C., is no more than about 130° C., is about 120° C., or is about 130° C. using electrical energy at a rate of between about 2 mW and about 3 mW or at a rate of no more than about 10 mW or no more than about 100 mW. In some embodiments, including embodiments that have more heating plates than are depicted in FIG. 3, the total power consumption of the device 200 can be no more than about 10, 20, 30, 40, or 50 W.

Figure 5:
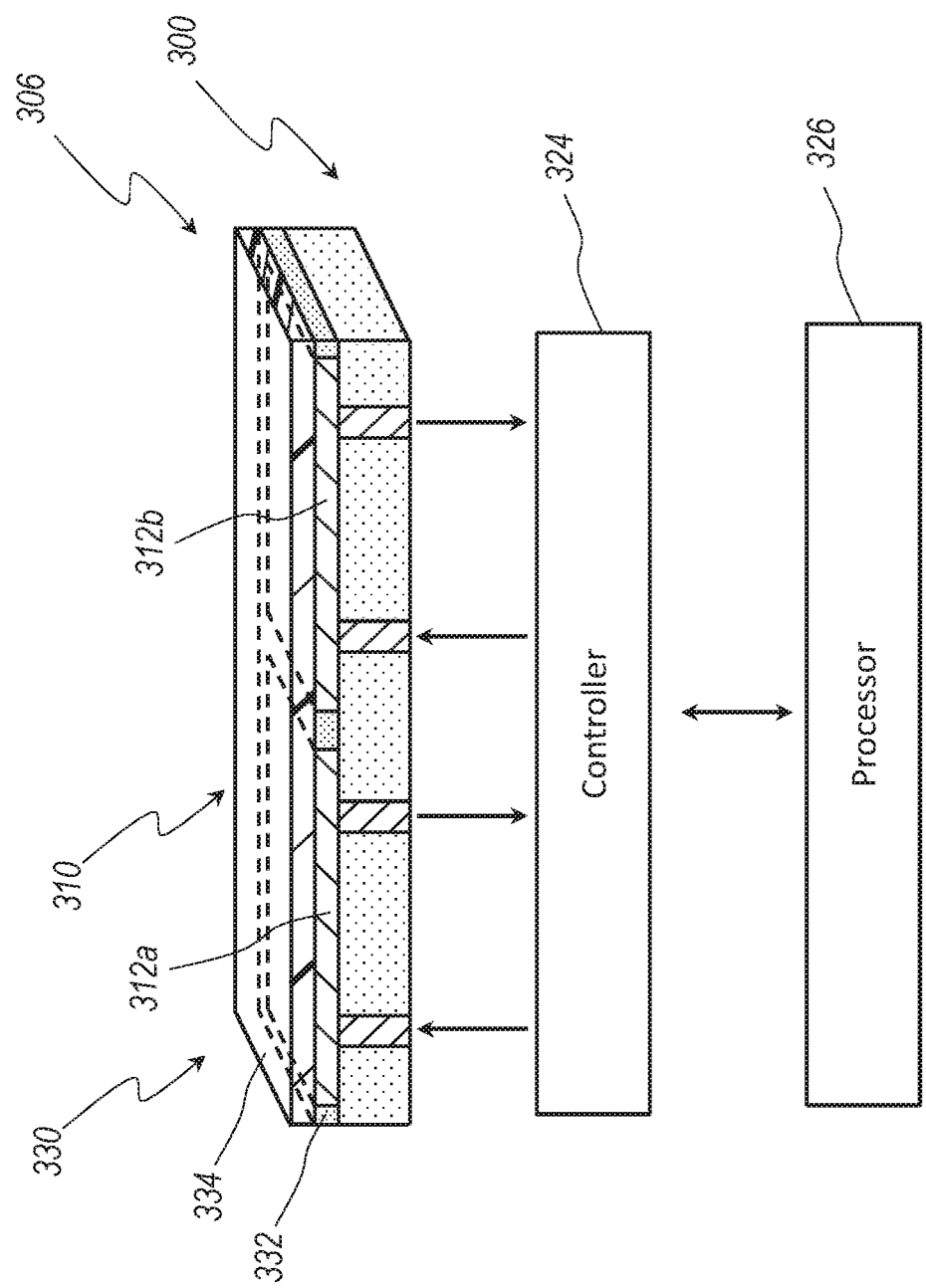
FIG. 5 depicts a cross-sectional perspective view of a portion of another embodiment of a weather-detecting device, similar to the device of FIGS. 3 and 4, and a schematic view of additional portions of the weather-detecting device, wherein the cross-sectional perspective view depicts two of the heating elements of an array, vias connected thereto, and a protective thermal transfer layer deposited over the heating elements.

FIG. 5 depicts a cross-sectional perspective view of a portion of another embodiment of a weather-detecting device 300 that is substantially similar to the weather-detecting device 200, and further depicts a schematic view of a controller 324 and a processor 326 that are either incorporated into the device 300 or are in communication therewith in manners such as described above. The weather-detecting device 300 includes MEMS chip 330 that includes an array 310 of heating elements, of which just two—the heating elements 312a and 312b—are shown. The weather-detecting device 300 further includes a thermal barrier layer 332 that encompasses the heating elements 312a, 312b. Further, the weather-detecting device includes a protective layer 334 that is positioned over the array 310 of heating elements 312a, 312b.

The weather-detecting device 300 defines a detection region 306 at which the heating elements 312a, 312b thermally interact with an environment that surrounds the device 300, or within which the device 300 is positioned. In the illustrated embodiment, the detection region 306 includes both the heating elements 312a, 312b and the protective layer 334. The protective layer 334 directly contacts the surrounding environment, whereas the heating elements 312a, 312b do not. The heating elements 312a, 312b are, however, capable of thermally communicating with the environment through the protective layer 334.

In certain embodiments, the protective layer 334 can be very thin and/or can otherwise have good thermal conduction properties to allow heat flow between the heating elements 312a, 312b and the surrounding environment to occur substantially unimpeded. In such embodiments, the heating elements 312a, 312b may be said to be in "significant thermal contact" with the surrounding environment. This term is used herein to signify that thermal transfer between components is substantially unimpeded, even though they may not be in direct physical contact with each other. This term is sufficiently broad to apply to situations in which direct physical contact is present, as well as situations in which one or more materials having high thermal conductivities prevent direct physical contact. The protective layer 334 may also be referred to as a thermal transfer layer. The thermal transfer layer 334 may have a sufficiently high thermal conductivity such that the heating elements covered thereby are in significant thermal contact with the surrounding environment.

Figure 6:
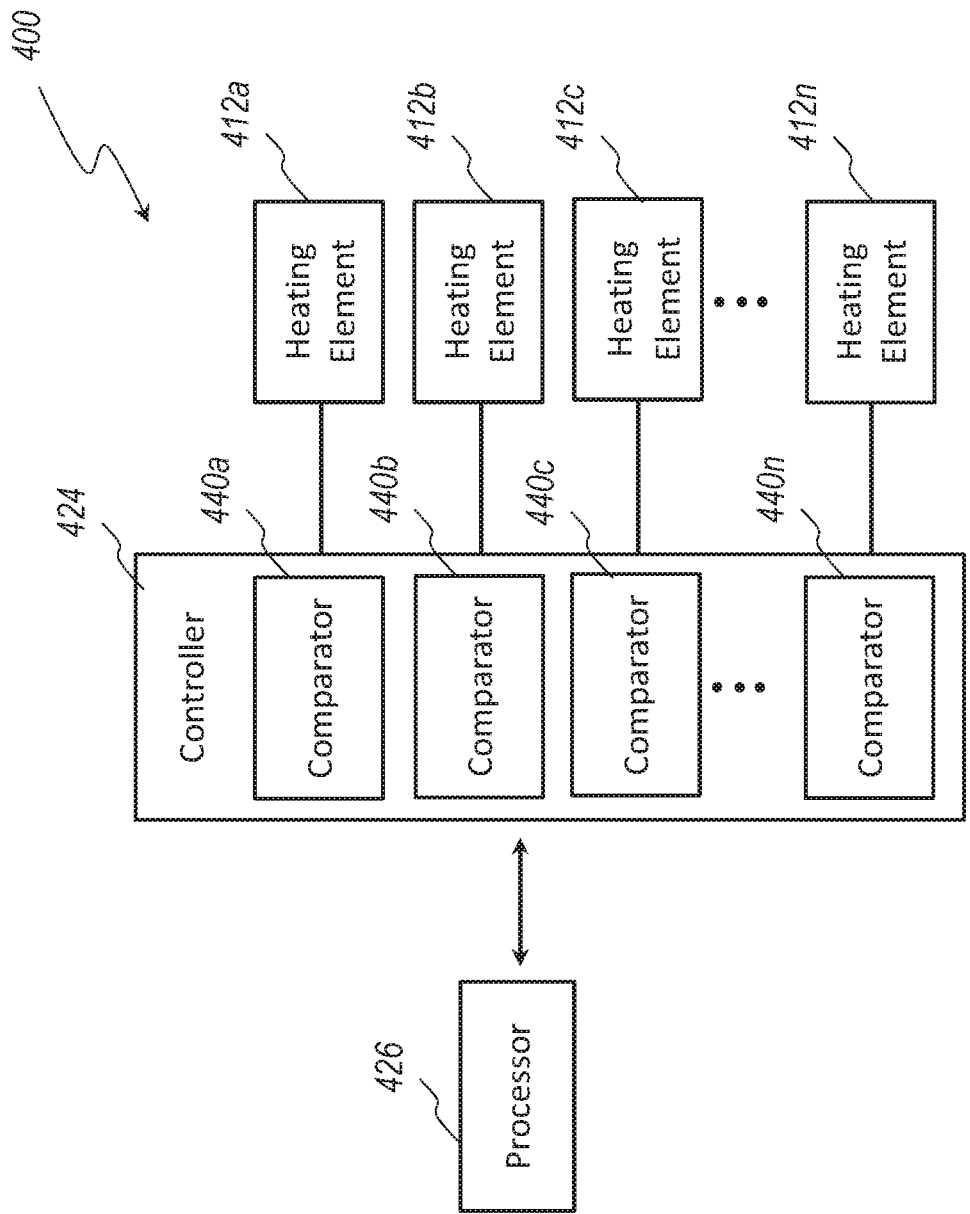
FIG. 6 is a schematic view of another embodiment of a weather-detecting device in which a controller includes a plurality of comparators that aid in controlling a plurality of heating elements.

FIG. 6 is a schematic view of an embodiment of a weather-detecting device 400 in which a controller 424 includes a large number of dedicated comparators 440a, 440b, 440c, 440n that aid in controlling an associated number of heating elements 412a, 412b, 412c, 412n. The controller 424 can operate in a simple feedback mode, such as described above, in which the controller 424, based on the setting of each comparator 440a, 440b, 440c, 440n activates the associated heating element 412a, 412b, 412c, 412n if the temperature (or resistance) of that heating element is below a predetermined set-point. For example, the set-point may be approximately 130° C., or it may be a resistance value associated with this temperature. If the temperature (or resistance) of the heating element matches or exceeds the set-point value, the controller 424 deactivates the heating element 412a, 412b, 412c, 412n. The controller 424 can provide data regarding the on/off state of each comparator 440a, 440b, 440c, 440n to the processor 426, thus directly providing digital data to the processor for further processing. Certain embodiments employing such a system architecture can provide the device 400 with a high temporal resolution due to the quick response of the controller 424 based directly on the state of the comparators 440a, 440b, 440c, 440n without further processing and/or the direct transfer of digital data to the processor without prior conversion (e.g., A/D conversion).

Figure 7A:
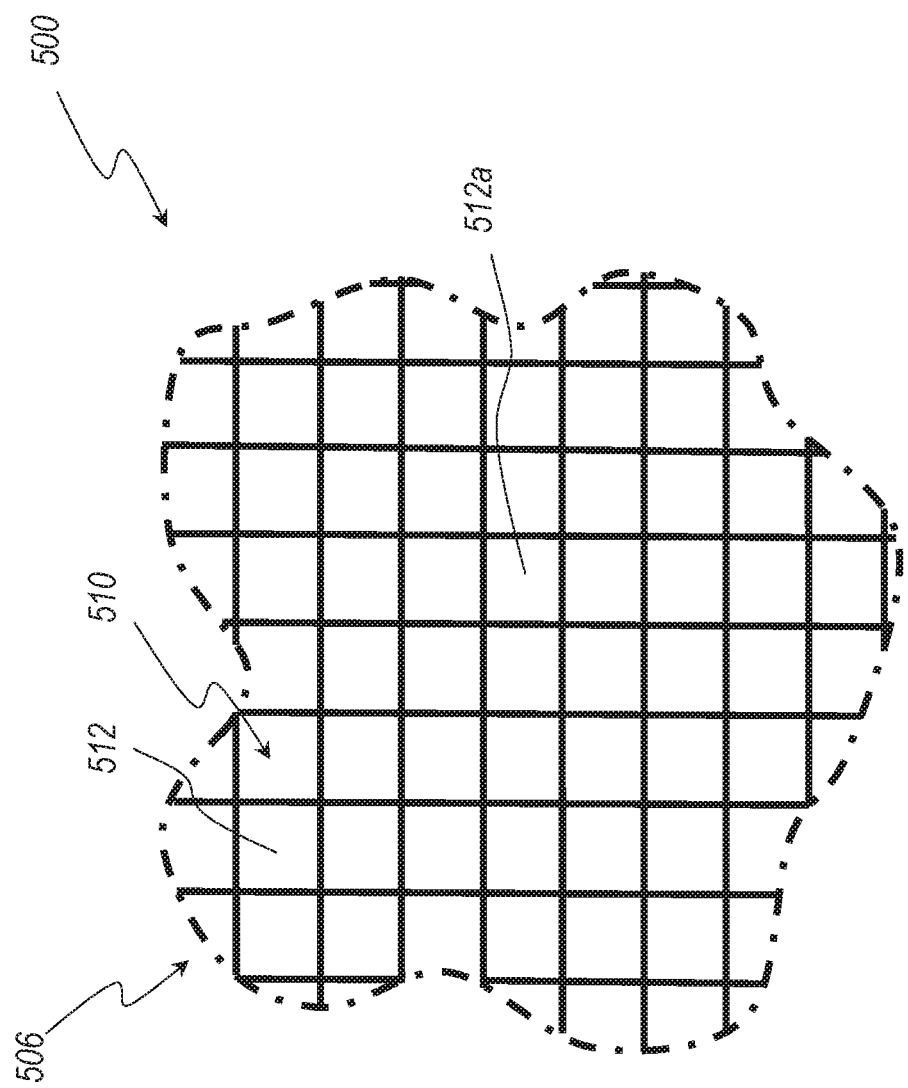
FIG. 7A is a partial plan view of another embodiment of a weather-detecting device that depicts the device operating in the absence of any cooling events.

FIG. 7A is a partial plan view of another embodiment of a weather-detecting device 500 that can resemble any of the devices 100, 200, 300, 400 in any respect. The device 500 includes a detection region 506 that includes an array 510 of heating elements 512. Only a portion of the detection region 506 is shown. One of the heating elements 512a is identified for purposes of illustration throughout FIGS. 7A-9. In FIG. 7A, the weather-detecting device is operating in the absence of any cooling events. Accordingly, the heating elements 512 are activated only intermittently in order to maintain the temperatures thereof at a target temperature (e.g., 130° C.).

Figure 7B:
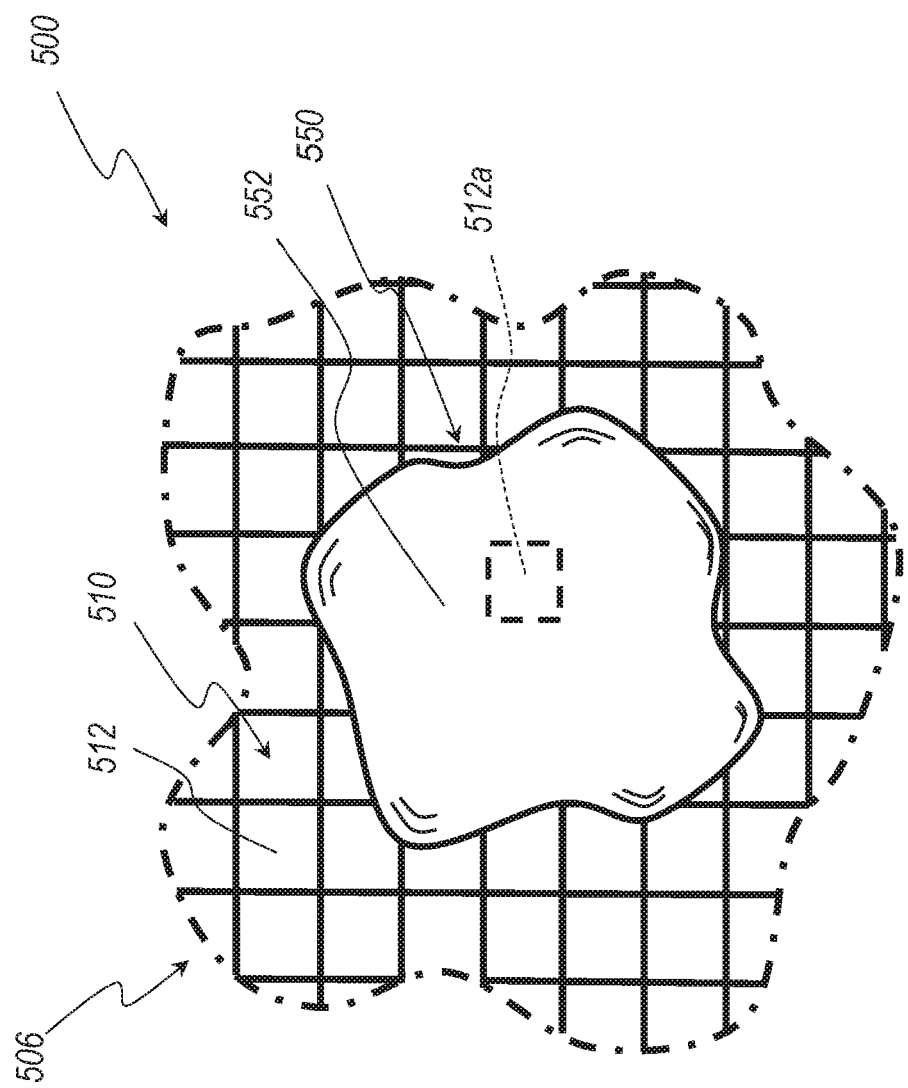
FIG. 7B is a partial plan view of the weather-detecting device of FIG. 7A operating in the presence of a cooling event—in particular, the presence of a hydrometeor positioned over a plurality of heating elements.

FIG. 7B is a partial plan view of the weather-detecting device 500 operating in the presence of a cooling event 550. The cooling event 550 is the positioning of a hydrometeor 552 over a plurality of the heating elements 512, such as may result from rainfall or snowfall during a storm, and the subsequent evaporation, melting and evaporation, or sublimation thereof. In some embodiments, the hydrometeor 552 is in direct physical contact with the heating elements 512. In other embodiments, the detection region 506 includes a protective layer over the heating elements 512, and the heating elements 512 are in significant thermal contact with the hydrometeor 552.

Figure 8A:
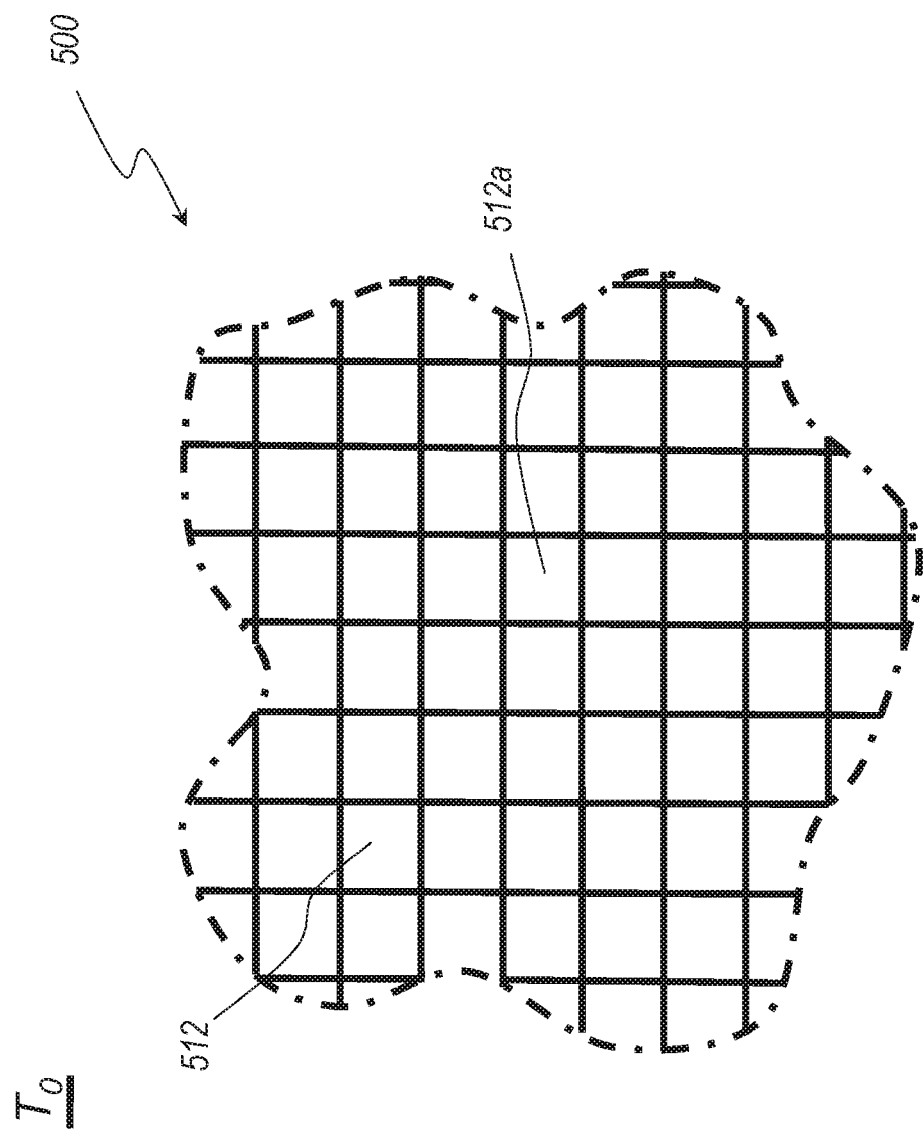
FIGS. 8A-8F are partial plan views of the weather-detecting device of FIG. 7A in which individual heating elements that are activated are shown shaded, thus depicting snapshots of a spatial heating profile at times $T_0$, $T_1$, $T_2$, $T_3$, $T_4$, and $T_5$, respectively.

FIGS. 8A-8F are partial plan views of the weather-detecting device 500 that depict different moments of time during operation of the device. FIG. 8A represents a moment $T_0$ in which all of the heating elements 512 are operating at the target temperature and thus none of the heating elements 512 are activated. FIG. 8A corresponds with a situation such as depicted in FIG. 7A, in which the device 500 is operating in the absence of a cooling event.

Figure 8B:
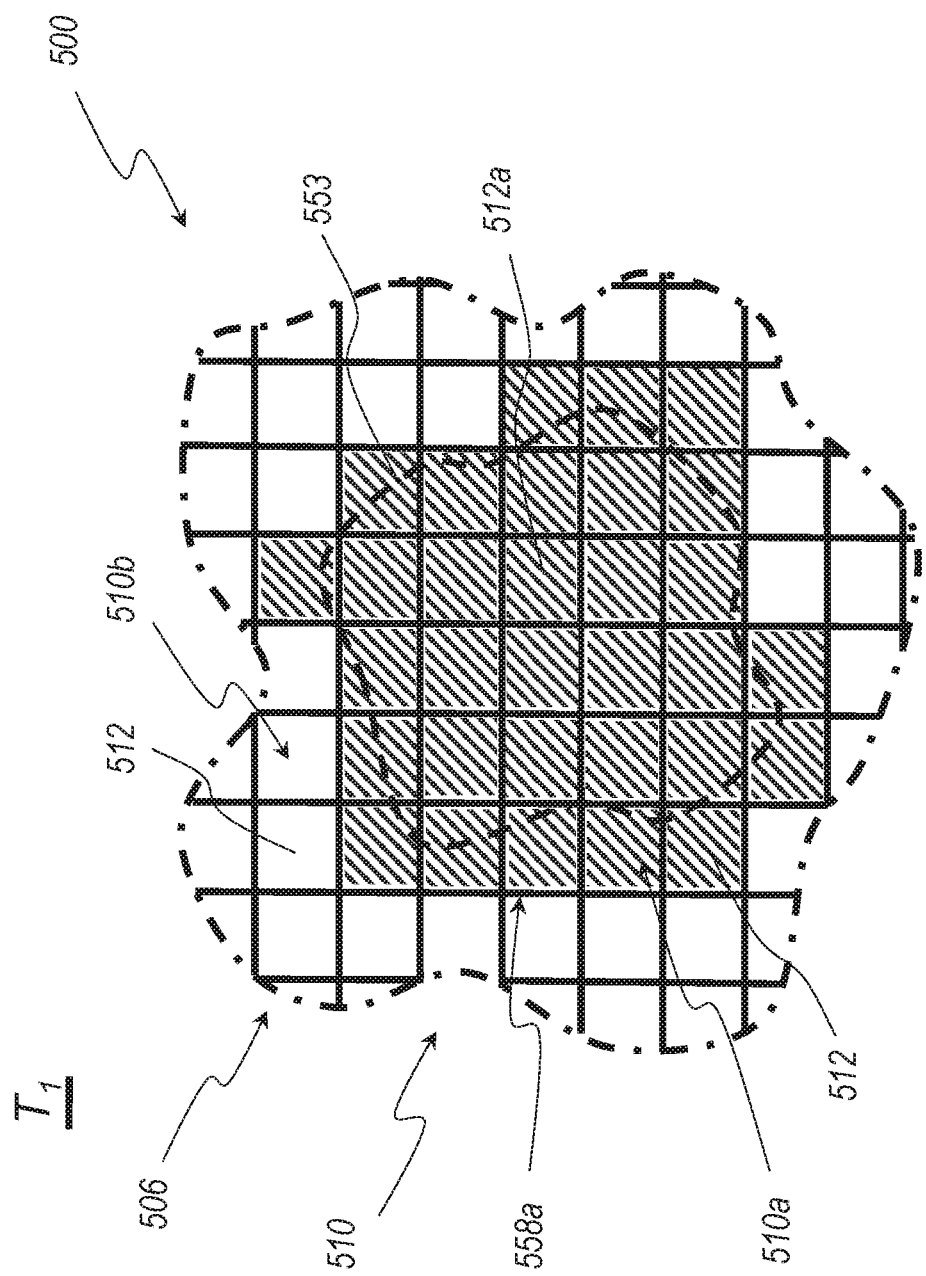

FIG. 8B represents a moment $T_1$ after the hydrometeor 552 (see FIG. 7B) has landed on the detection region 506. For purposes of clarity, the hydrometeor 552 itself is not depicted in FIG. 8B (or in any of FIGS. 8C-8F), but the perimeter of or footprint 553 that the hydrometeor 552 makes once initially positioned on the detection region 506 is shown. Individual heating elements 512 that are activated are depicted as being shaded, whereas non-activated heating elements 512 are not shaded. The portion of the array 510 depicted in FIG. 8B thus consists of two sub-arrays 510a, 510b, which may also be referred to as subsets of the array 510. The array 510a is composed of actuated heating elements 512 and the array 510b is composed of non-actuated heating elements 512.

The sub-array 510a provides a pixelated image 558a of the hydrometeor 552. In certain embodiments, a processor, such as those discussed above, can use data regarding the sub-array 510a to determine properties of the hydrometeor 552. For example, the initial size, shape, structure, and/or orientation of the portion of the hydrometeor 552 that contacts the detection region 506 can be determined from the data. A higher density of heating elements can yield a higher spatial resolution and/or a more accurate determination of these properties.

Figure 8C:
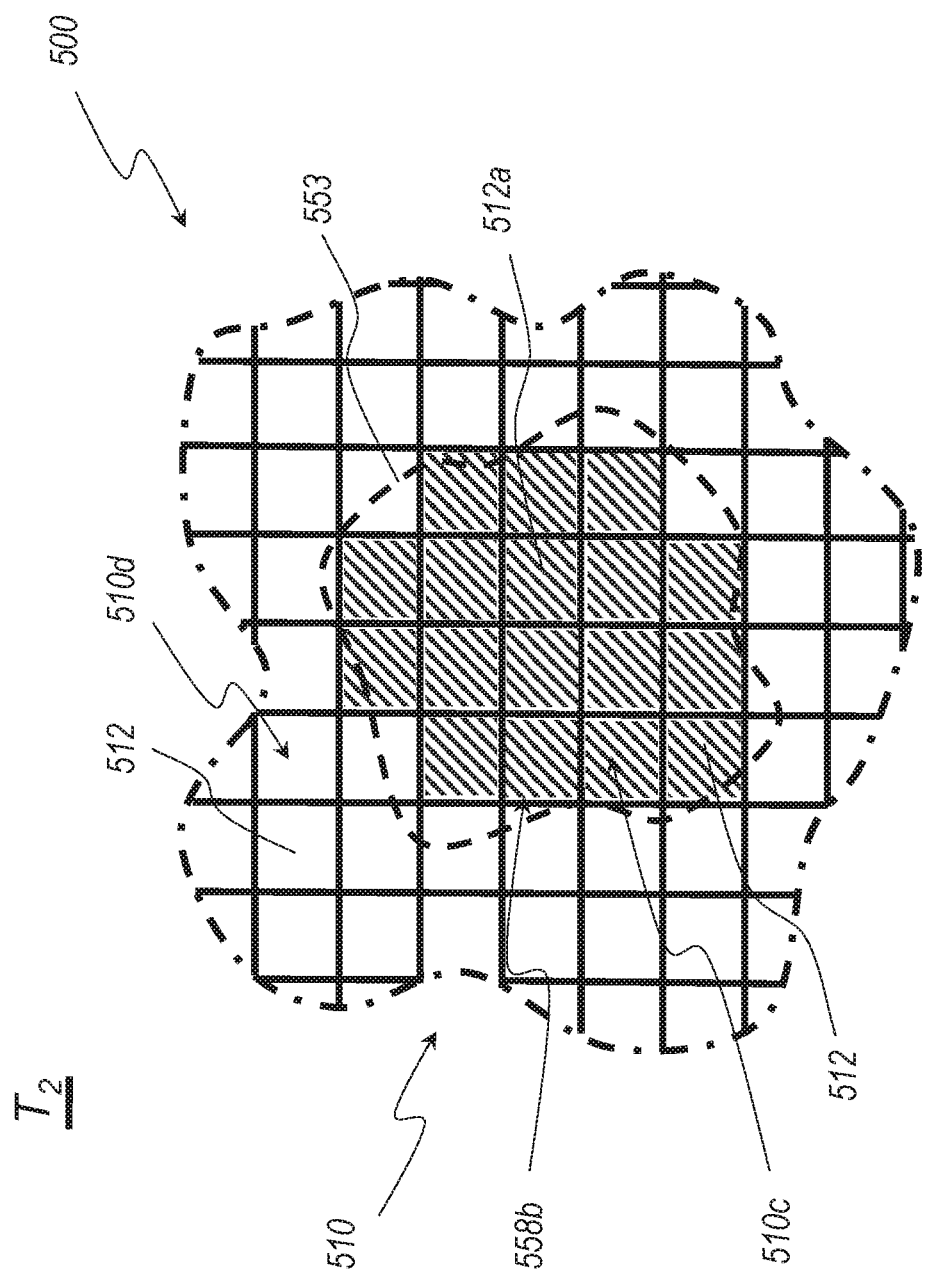

FIG. 8C represents a moment $T_2$ after the sub-array 510a (FIG. 8B) has heated the hydrometeor 552 until a portion thereof has evaporated or sublimated. In the illustrated heating event, a periphery of the hydrometeor 552 has evaporated or sublimated, while a more central portion thereof remains on the device 500. The array 510 has thus transitioned to a different set of sub-arrays 510c, 510d, in which the heating elements of the sub-array 510c are activated and those of the sub-array 510d are not. The sub-array 510c provides a pixelated image 558b of the remaining portion of the hydrometeor 552.

Figure 8D:
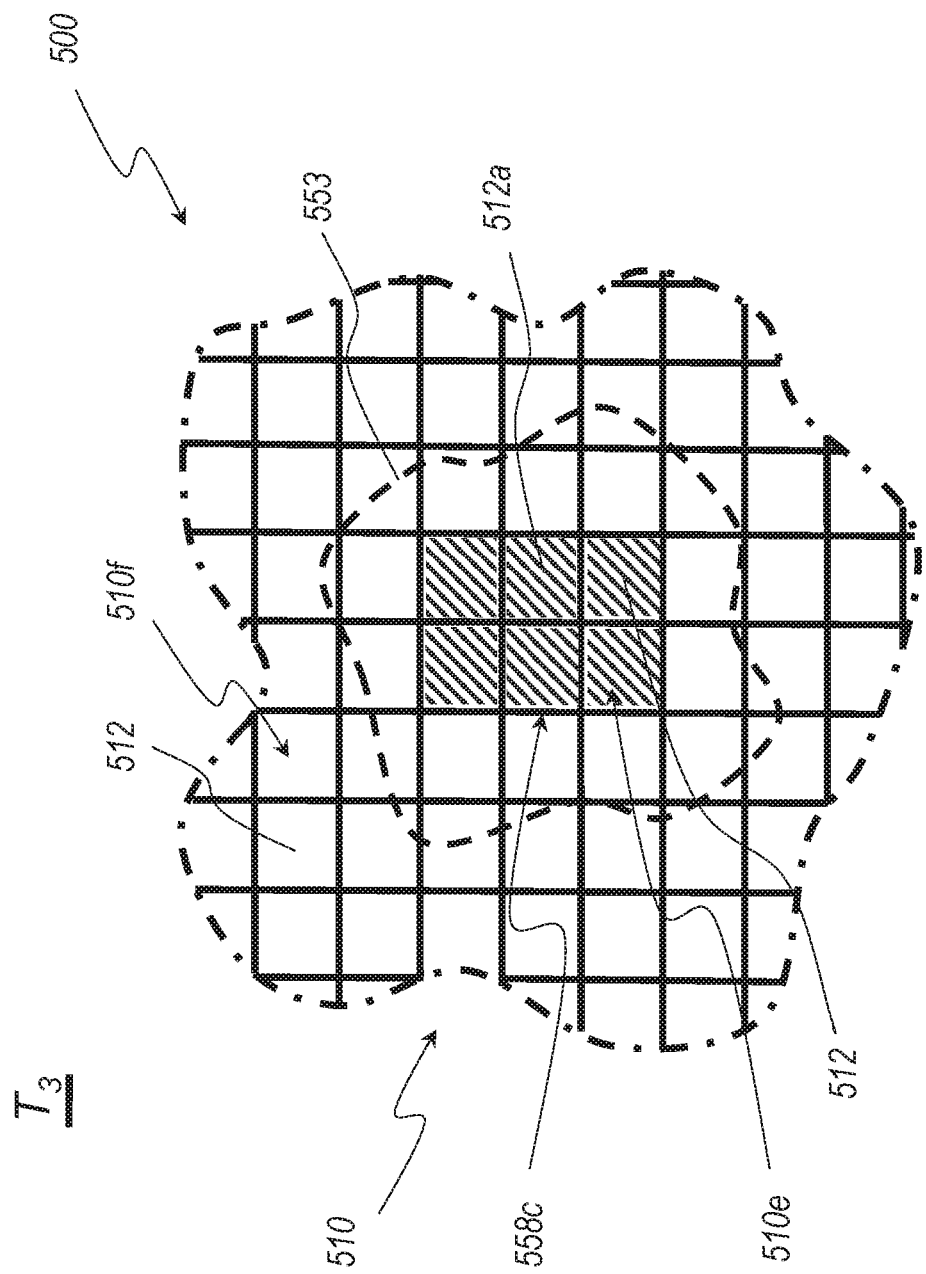

FIG. 8D represents a moment $T_3$ after the sub-array 510c (FIG. 8C) has heated the hydrometeor 552 until a further portion thereof has evaporated or sublimated. In the illustrated heating event, a periphery of the reduced-size hydrometeor 552 has evaporated or sublimated, while a more central portion thereof remains on the device 500. The array 510 has thus transitioned once again to a different set of sub-arrays 510e, 510f, in which the heating elements of the sub-array 510e are activated and those of the sub-array 510f are not. The sub-array 510e provides a pixelated image 558c of the remaining portion of the hydrometeor 552.

Figure 8E:
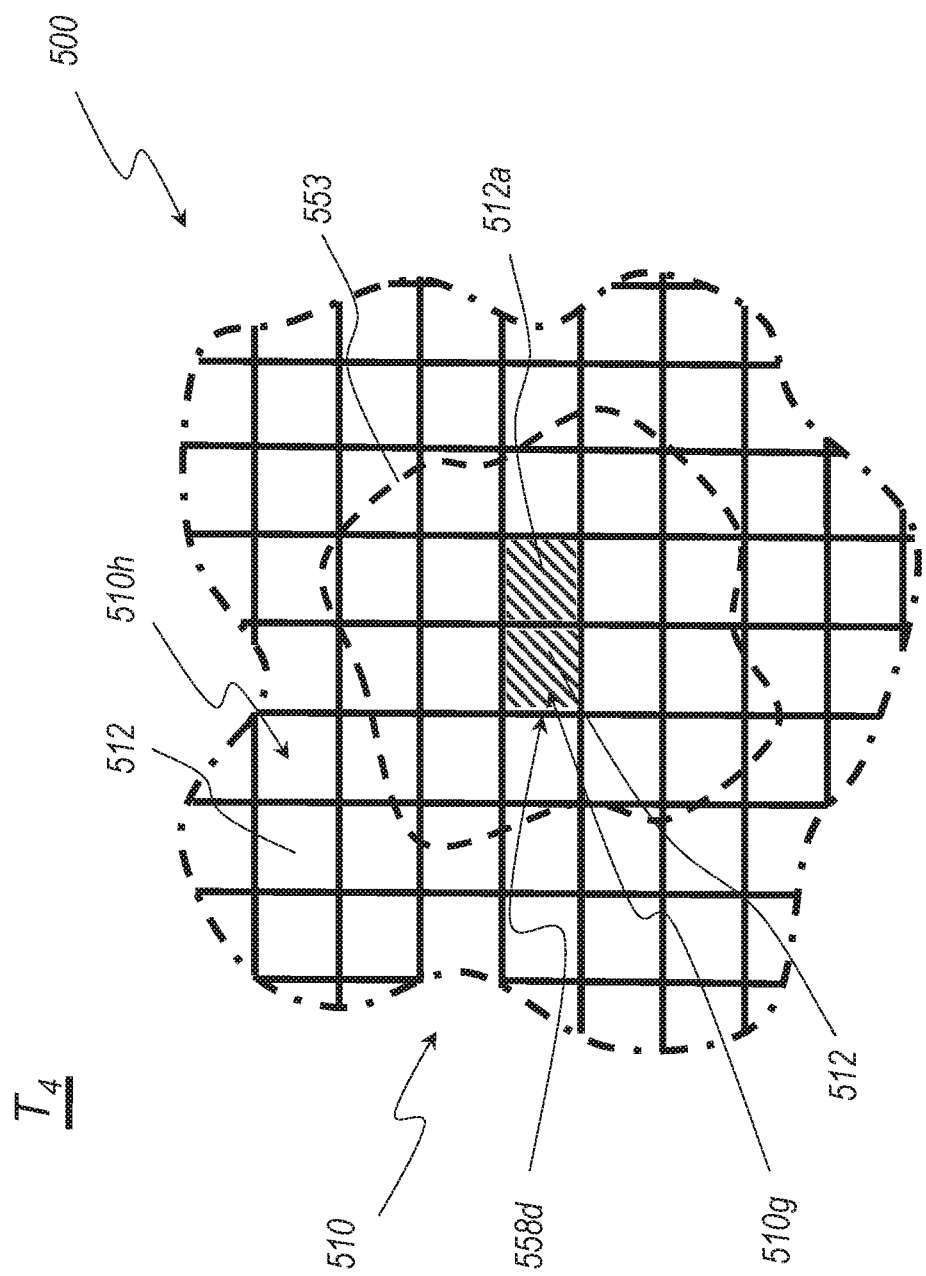

FIG. 8E represents a moment $T_4$ after the sub-array 510e (FIG. 8D) has heated the hydrometeor 552 until a further portion thereof has evaporated or sublimated. In the illustrated heating event, a periphery of the reduced-size hydrometeor 552 has evaporated or sublimated, while a more central portion thereof remains on the device 500. The array 510 has thus transitioned once again to a different set of sub-arrays 510g, 510h, in which the heating elements of the sub-array 510g are activated and those of the sub-array 510h are not. The sub-array 510g provides a pixelated image 558c of the remaining portion of the hydrometeor 552.

Figure 8F:
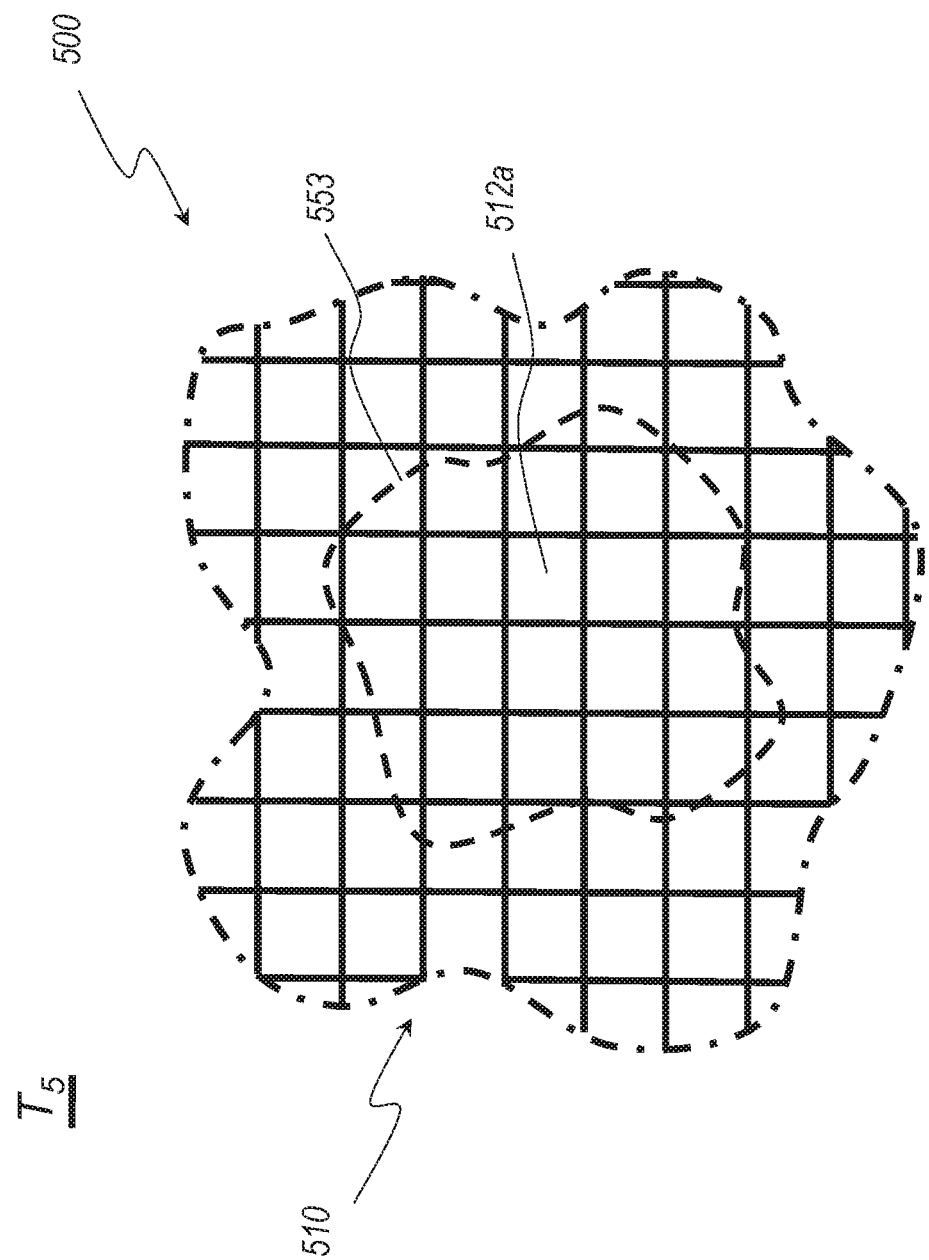

FIG. 8F represents a moment $T_5$ after the sub-array 510g (FIG. 8E) has heated the hydrometeor 552 until the final portion thereof has evaporated or sublimated. The array 510 has thus transitioned to the operational mode depicted in FIG. 8A in which the heating elements are activated only intermittently to maintain them at the target temperature.

In certain embodiments, a processor (such as those discussed above) can use data regarding one or more of the sub-arrays 510a, 510b, 510c, 510d, 510e, 510f, 510g to determine properties of the hydrometeor 552. For example, the size, shape, density, and/or orientation of the portion of the hydrometeor 552 that continues to contact the detection region 506 after application of a known quantity of heat can be determined from the data. By way of example, the number of pixels in the sub-array 510a can be used to determine the initial size of the hydrometeor 552, and the spatial distribution (or stated otherwise, configuration or geometry) of the pixels can be used to determine the initial shape and/or orientation of the hydrometeor 552. The sub-arrays 510a, 510c, 510e, 510g and the timing at which the data regarding the same are gathered can be used to determine the rate at which the hydrometeor 552 changes. In other or further instances, one or more of the hydrometeor properties (e.g., size) may be analyzed in conjunction with data regarding the mass of the hydrometeor 552 to determine a density or wetness of the hydrometeor. The total mass of the hydrometeor 552 may be determined by integrating the amount of energy delivered to the hydrometeor 552 via the activated heating elements. In various embodiments, the device 500 may be sensitive to hydrometeors having masses within a range of from about 0.1 mg to about 50 mg. Sensitivity to hydrometeors as small as 0.1 mg, or having 0.3 Joules of latent heat, can permit the device 500 to detect or measure a primary range of hydrometeor types.

In other or further embodiments, a processor (such as those discussed above) can use data regarding any, any combination of, or all sub-arrays of the device 500 that evaporate or sublimate hydrometeors over one or more time periods to determine a precipitation rate. For example, the precipitation rate can be calculated based on the frequency with which particles are intercepted by the hotplate array 510. In other or further instances, the precipitation rate may be calculated by determining the aggregate mass of hydrometeors that are intercepted by the hotplate array 510 over one or more time periods.

In some embodiments, data obtained via the device 500 may be combined with data from one or more additional detectors, sensors, or any other suitable data source to determine further weather properties. For example, in some embodiments, a weather-sensing system (such as the systems 50, 70 discussed above) may include a device 500 and a device for determining fall speed of precipitation. For example, the fall-speed detection instrumentation may include one or more of a motion sensor or a laser system. The weather-sensing system can calculate a visibility measurement based on information obtained via both the device 500 and the fall-speed detection instrumentation. In other or further instances, the fall-speed detection instrumentation may be used for precipitation classification and/or other measurements or determinations.

In some embodiments, the processor may output a visual representation of the hydrometeor 552, as recorded at any of times $T_0$-$T_5$ to any suitable output device, such as a computer monitor, a printer, etc. In some instances, the images generated by the processor may resemble the images 558a, 558b, 558c, 558d depicted in FIGS. 8B-8E. In other or further instances, the processor includes preprogrammed information regarding hydrometeor type or classification. The processor can operate on data from the heating elements (e.g., on/off status, timing of the same, sub-array data structures) using this preprogrammed information to automatically determine the hydrometeor type, classification, etc.

As can be appreciated from the foregoing, in some embodiments, the device 500 can include an array of heating elements 512, or miniature hotplates. Each hotplate is maintained at a temperature above the boiling point. When a hydrometeor lands on a sub-array of hotplate pixels, energy is transferred from each pixel to the hydrometeor to create a spatial and temporal map of hydrometeor size, form, and mass. Heating the hydrometeor via the hotplate evaporates the hydrometeor (e.g., raindrop or snowflake) and causes the temperature of the hotplate to drop. The time integral of the temperature drop on each pixel represents the pixel-level contribution to the hydrometeor mass. A hydrometeor may cover numerous adjacent pixels to create an image or picture of the hydrometeor. The total hydrometeor mass is the sum of masses for a set of contiguous pixels.

The density of a hydrometeor can be determined by the evaporation profile. A small dense raindrop that lands on the array may spread over just one or two pixels and evaporate rapidly. A low density aggregate snowflake with the same mass would cover a greater number of pixels (i.e., would be more spread out in the horizontal and vertical directions in the orientations shown in FIGS. 8A-8F).

FIGS. 8B-8E represent snapshots of a spatial heating profile of the hydrometeor 552 at times $T_1$, $T_2$, $T_3$, $T_4$, and $T_5$, respectively. The spatial profiles depicted in these figures may also be referred to as melting profiles, evaporation profiles, or sublimation profiles, depending on the physical changes that take place. The temporal heating profile (or temporal melting, evaporation, or sublimation profiles) of the hydrometeor is demonstrated, in part, in FIG. 9. One or more of the spatial or temporal heating profiles may be at least partially embodied in a visual depiction of the melting and evaporation or sublimation of a hydrometeor. For example, a video (e.g., MPEG) that demonstrates the melting and evaporation or sublimation of the hydrometeor may be formed of a series of sequential snapshots, such as the snapshots depicted in FIGS. 8B-8E. The video may be delivered to a monitor or other suitable viewing device, or may otherwise be processed or analyzed.

Figure 9:
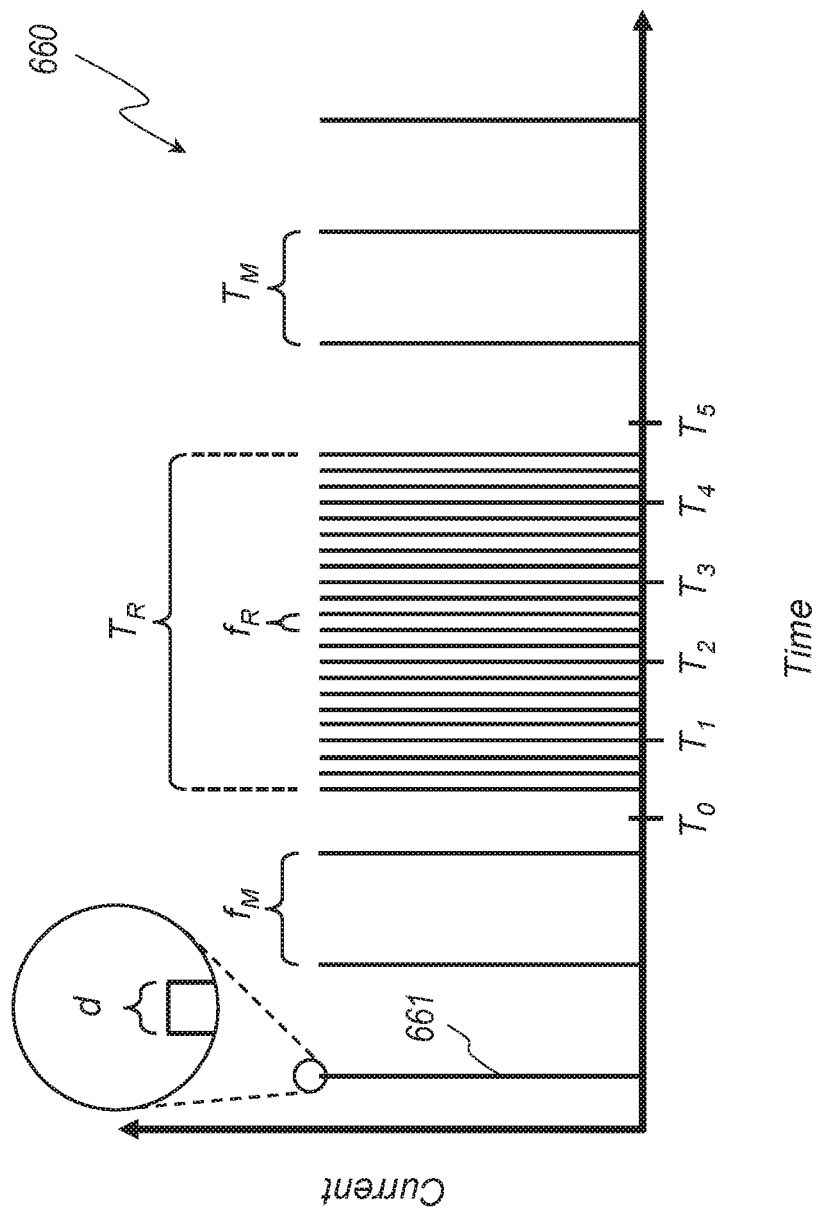
FIG. 9 is a plot of the current supplied to one of the heating elements of the device of FIG. 7A as a function of time, with the times $T_0$, $T_1$, $T_2$, $T_3$, $T_4$, and $T_5$ of FIGS. 8A-8F identified, and depicts a temporal heating profile of the heating element.

In particular, FIG. 9 is a plot 660 of the current supplied to one of the heating elements of the device 500 as a function of time, with the times $T_0$, $T_1$, $T_2$, $T_3$, $T_4$, and $T_5$ of FIGS. 8A-8F identified. The overall temporal heating profile of the hydrometeor would constitute a compilation or integration of similar temporal profiles obtained for all of the pixels, or heating elements, from which heat was transferred to the hydrometeor.

In the illustrated embodiment, a controller, such as any of the controllers previously discussed, intermittently directs a pulse 661 of current through the heating element 512a to maintain the heating element at a target temperature, which may be above the boiling point of water for a given set of environmental conditions (e.g., 120 or 130° C., in some instances). Each pulse 661 has substantially the same amplitude and the same duration d.

When the heating element 512a is not subjected to a cooling event, but rather, is merely subjected to the ambient environment within which the weather-detection device 500 is positioned, an occasional pulse is required to maintain the heating element 512a at the target temperature. The frequency $f_M$ at which such maintenance pulses are provided may be substantially constant. The time between such maintenance pulses is designated as the maintenance time $T_M$ in plot 660.

In the illustrated example, the heating element 512a is subjected to the cooling event 550 of a significant thermal contact with the hydrometeor 552 (see FIG. 7B) just after the time $T_0$ (i.e., just after the moment depicted in FIG. 8A and before the moment depicted in FIG. 8B). That is, the heating element 512a either comes into direct contact with the hydrometeor 552 or is brought into very close proximity to the hydrometeor 552 and may be physically distanced from the hydrometeor 552 by one or more thermally conducting layers, at least one of which is in direct physical contact with the hydrometeor 552.

The hydrometeor 552 draws heat from the heating element 512a, such that the temperature of the heating element 512a drops below the target temperature. As a result, the controller continuously supplies current pulses 661 to the heating element 512a until the element is once again at the target temperature. The time required to bring the heating element 512a back to the target temperature after a heating event is the recovery time $T_R$. In the illustrated example, multiple heating elements 512 are exposed to the hydrometeor 552. As the hydrometeor 552 melts and evaporates or as it sublimates, the hydrometeor 552 may shrink such that some heating elements 512 are exposed to the hydrometeor 552 longer than others. In like fashion, some of the heating elements may have shorter recovery times than others. The heating element 512a is exposed to the hydrometeor 552 the longest of any of the heating elements that supply heat to the hydrometeor 552. Accordingly, the recovery time $T_R$ is representative of not only the heating element 512a, but also of the weather-detecting device 500 more generally. That is, the recovery time $T_R$ of the heating element is also the recovery time of the device 500 relative to the hydrometeor 552. A processor can use the recovery times of individual pixels or heating elements, groups of contiguous heating elements involved in recovering from a common cooling event, and/or of the device 500 from a cooling event to determine properties of the cooling event. For example, one or more such recovery times may be used to determine the properties of a hydrometeor, such as its mass or density, or may be used to determine the properties of wind, such as its strength or direction.

During recovery from the cooling event 550 of the present example, the controller delivers current pulses 661 at a recovery frequency $J_R$, which is much higher than the maintenance frequency $f_M$. In the illustrated embodiment, the recovery frequency $f_R$ corresponds to the sample rate of the controller. Stated otherwise, the controller may make regular determinations of whether or not each heating element is operating at the target temperature and respond accordingly (e.g., activate or deactivate the heating element) at a set rate. In the illustrated embodiment, this sampling rate corresponds to the frequency $f_R$. Thus, because the heating element 512a operated below the target temperature every time its status was sampled during the period beginning after time $T_0$ and ending before $T_5$, current pulses were consistently delivered to the heating element 512a at the frequency $f_R$.

In various embodiments, no less than one sample may be taken every 1, 2, 5, 10, 20, or 50 milliseconds. Stated otherwise, the sample rate (and corresponding recovery frequency $f_R$) for a given heating element may be no less than 20, 50, 100, 200, 500, or 1,000 hertz. In some embodiments, a very high sample rate may be used. For example, in some instances, a sample may be taken on the order of microseconds, with a sample rate on the order of megahertz. For example, in various embodiments, a sample is taken every microsecond for a sample rate of 1 MHz. Any other suitable sampling rate is contemplated.

The plot 660 does not necessarily represent an accurate proportional difference between the identified time constants and/or provide an accurate depiction of the number of pulses 661 that may be employed in recovering from a cooling event such as the heating of a hydrometeor. For example, in various embodiments, a sample rate (e.g., $f_R$) of a device 500 is on the order of microseconds, milliseconds or tens of milliseconds. In other or further embodiments, a recovery time from a hydrometeor cooling event (e.g., $T_R$) is on the order of hundredths of a second, tenths of a second, or seconds. For example, in some instances, the time constant for a recovery time may be on the order of hundredths of a second, and the sampling rate may be on the order of microseconds. Certain embodiments of the device 500 thus may provide high temporal resolution of heating profiles.

In other embodiments, rather than rapidly sampling and pulsing continuously, the controller may instead determine when a heating element deviates from a normal operating temperature. When such a deviation occurs, the heating element may be activated and remain in the activated (or "on") state with rapid sampling and pulsing until the heating element has equilibrated.

Figure 10:
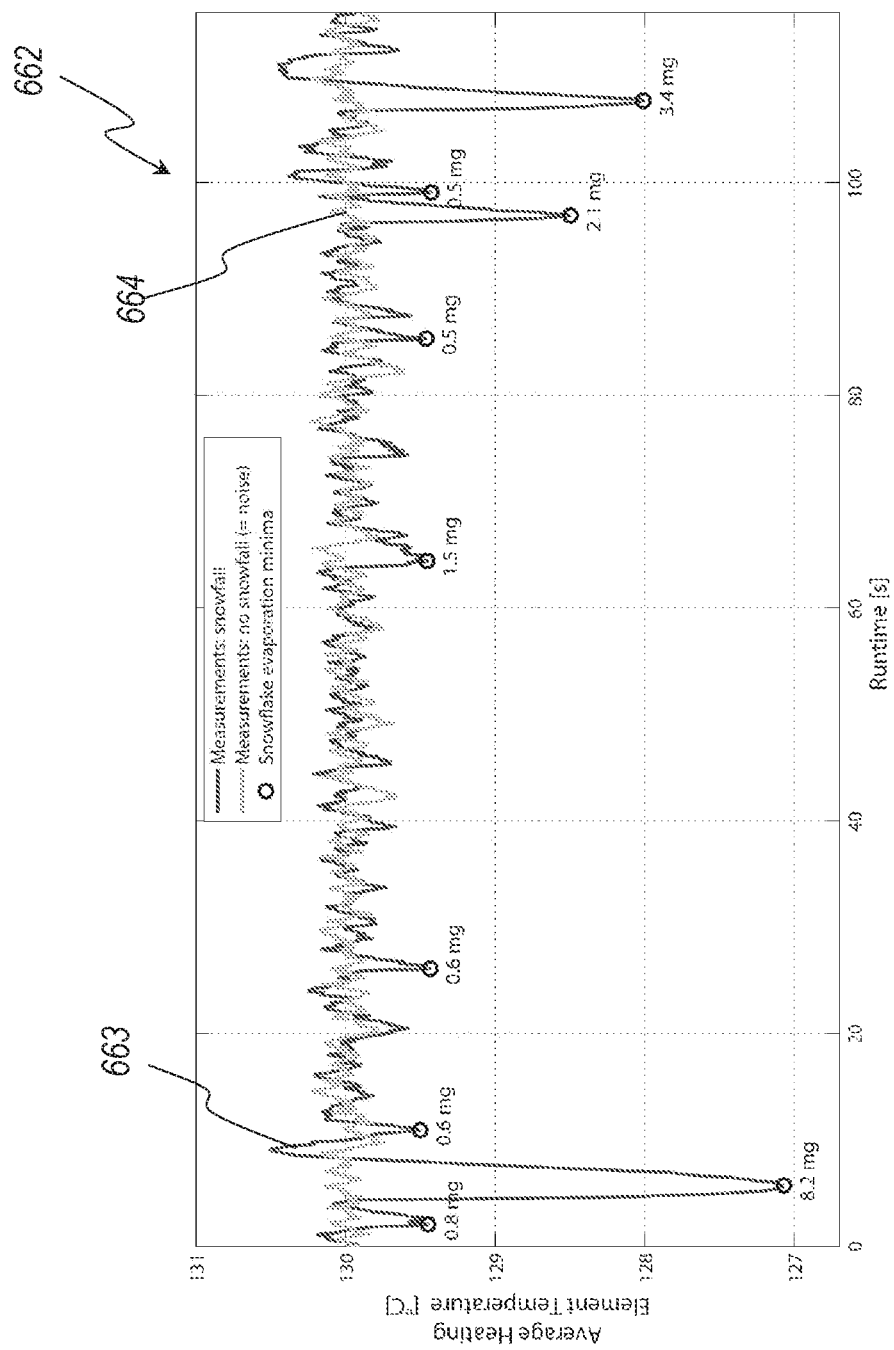
FIG. 10 is a plot of the average heating element temperature of the weather-detecting device of FIG. 7A during a measurement period during which the device is subjected to snowfall.

FIG. 10 is a plot of the average heating element temperature of the weather-detecting device 500 during two different periods of operation. In particular, FIG. 10 represents a measurement event 663 during which the device 500 is subjected to snowfall for approximately two minutes and a measurement event 664 during which the device is not subjected to snowfall for approximately two minutes (thus demonstrating noise). As can be seen from the measurement event 663, larger snowflakes yield greater deviances from the target temperature of 130° C. and require larger recovery times, as compared with the smaller snowflakes.

Figure 11:
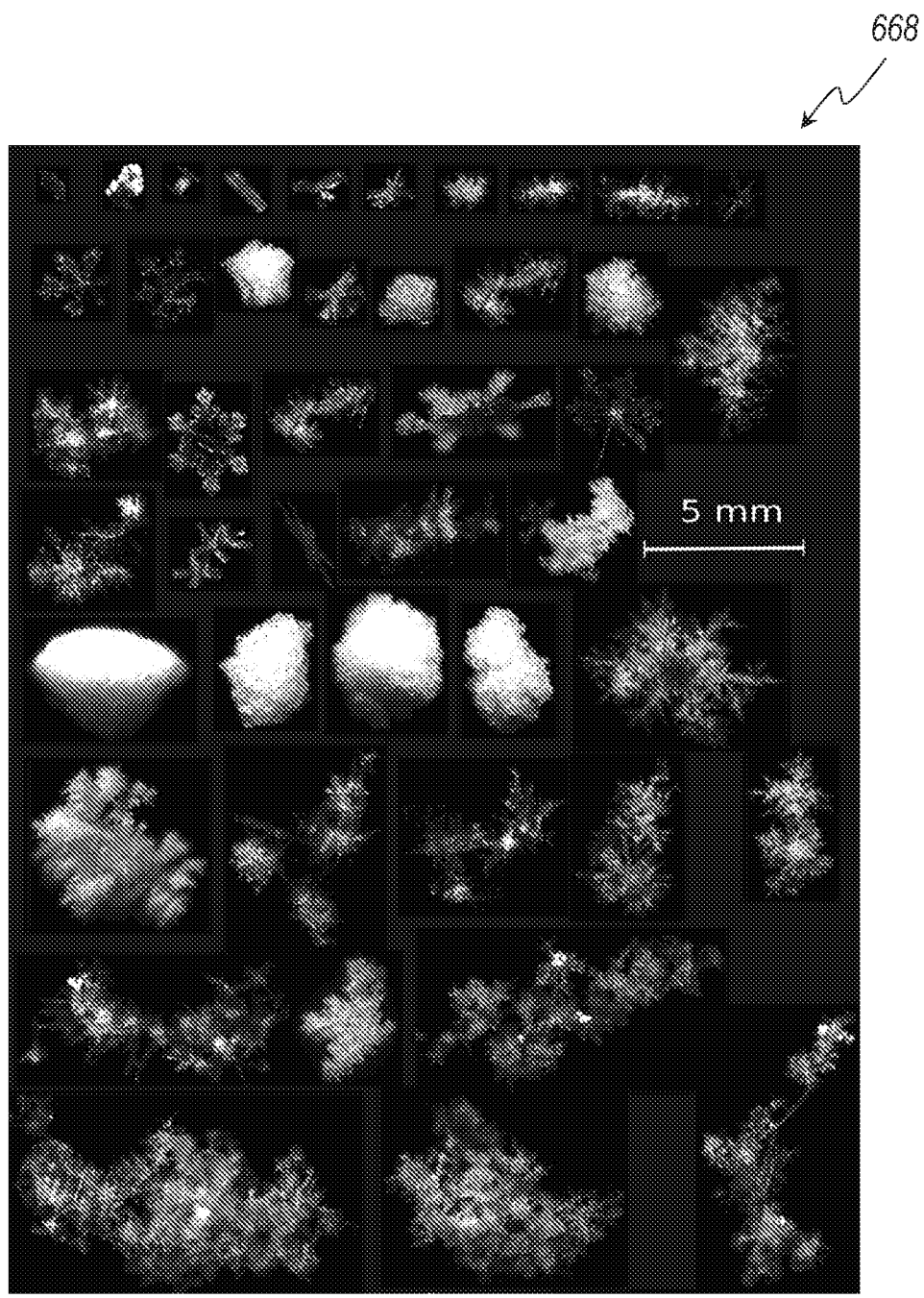
FIG. 11 is a compilation of photographs that depict illustrative varieties of frozen hydrometeors that the weather-detecting device of FIG. 7A can be used to identify.

FIG. 11 is a compilation 668 of photographs that depict illustrative varieties of frozen hydrometeors, including snow and hail, which the weather-detecting device 500, or any of the other weather-detecting devices disclosed herein, can be used to identify. Each hydrometeor is photographed in freefall using a multi-angle camera. The photographs demonstrate that frozen hydrometeors come in a wide variety of shapes, sizes, masses, and densities. In some instances, a multi-angle camera may be used in conjunction with any of the weather-detecting devices disclosed herein to assist in identifying the type of hydrometeors present in a particular storm or other weather event. For example, the size, shape, and density of the hydrometeors are readily apparent from the illustrated photographs. By way of illustration, density can be estimated from the size and/or the total whiteness of the grayscale images.

Systems that employ both the multi-angle camera and a weather-detecting device 500 may provide more information and/or more accurate information than may be obtained with the weather-detecting device 500 on its own. For example, the multi-angle camera can provide information regarding the shape, size, orientation, and/or velocity of a hydrometeor during freefall, whereas certain embodiments of the weather-detecting device 500 only provide information regarding such properties as the shape, size, and/or orientation of the hydrometeor after it has landed on a two-dimensional (e.g., planar) surface.

Use of a multi-angle camera can add significantly to the cost of a weather-detecting system, however. Moreover, significantly more power may be used and/or data processing loads encountered in operating such a camera. A camera can also increase the size of system. Accordingly, in some embodiments, a multi-angle camera is not used. Such embodiments can be advantageous over weather-detecting systems (and, in particular, precipitation-monitoring systems) that employ a multi-angle camera, as well as other weather-detecting or precipitation-monitoring systems, because the devices are capable of obtaining much or all of the useful information regarding the type of hydrometeors present in a given weather that a camera obtains without any of the disadvantages associated with using a separate, dedicated camera.

For example, as previously discussed, the weather-detecting devices provide pixelated representations of the hydrometeors. These pixelated representations can provide photograph-like snapshots of the hydrometeors once they have landed on the device, and series of such snapshots can demonstrate the behavior of the hydrometeors as they are heated (e.g., their heating profiles). Although some information that a multi-angle camera can provide may be absent from measurements obtained via a weather-detecting device (e.g., the freefall information mentioned above or, depending on the size of the heater element pixels, a reduction in resolution), these snapshots can provide the desired information in determining the type of hydrometeor under observation. For example, the size and shape of a hydrometeor can be determined from the number and orientation of the pixels/heaters that are activated in response to the hydrometeors. The density of a hydrometeor likewise can be determined, such as from size information combined with mass information.

In certain embodiments, the weather-detecting device 500 has a sufficiently high spatial resolution to be able to distinguish a wide variety of hydrometeor types. For example, the photograph compilation 668 provides a 5 mm scale indicator. Embodiments having densely packed pixels that are much smaller than 5 mm thus can be configured to identify different varieties of hydrometeors based on their different shapes. For example, in some embodiments, the device 500 can have a resolution that is on the order of one millimeter or smaller. Thus, size and shape can readily be determined from the pixelated representation of the hydrometeors obtained via the device 500. Further, density information that can help distinguish the different types of hydrometeors (e.g., rain, graupel, sleet, snow, hail) can be obtained by comparing this size information to the mass information for a given hydrometeor. As previously discussed, the mass information can be obtained from the amount of heating required to evaporate or sublimate the hydrometeors.

Figure 12:
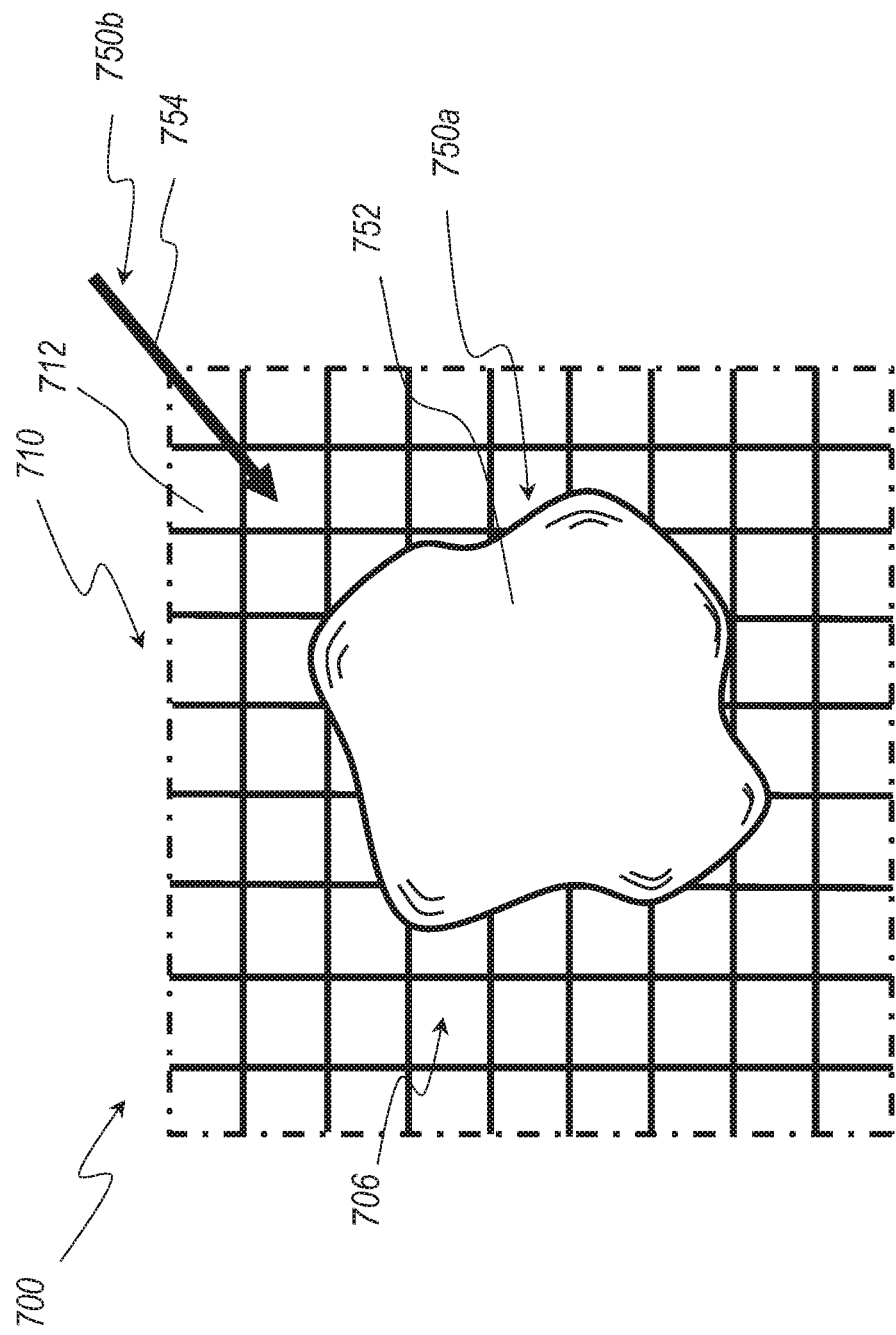
FIG. 12 is a partial plan view of another embodiment of a weather-detecting device operating in the presence of two simultaneously occurring cooling events—in particular, the presence of a hydrometeor on a plurality of the illustrated heating elements and the presence of wind gust that passes across each of the illustrated heating elements.

FIG. 12 is a partial plan view of another embodiment of a weather-detecting device 700 that includes a detection region 706 having an array of heating elements 712. The device 700 is depicted operating in the presence of two simultaneously occurring cooling events 750a, 750b. The cooling event 750a is the positioning of a hydrometeor 752 over a plurality of the heating elements 712, such as may result from rainfall or snowfall during a storm, and the subsequent evaporation, melting and evaporation, or sublimation thereof. The cooling event 750b is the presence of a wind gust 754 that passes across all of the illustrated heating elements 712. Although the shape of the hydrometeor 752 is schematically depicted as being the same as that of the hydrometeor 552, the hydrometeor 752 is provided on the device 700 under different environmental conditions (including the presence of the wind 754), the hydrometeor 752 may have a different mass than the hydrometeor 754, the heating elements 712 may have a different size than the heating elements 512, and/or the heating elements 712 may be operated at different pulse rates or pulse amplitudes, such that the heating profile of the hydrometeor 752 may be different from that of the hydrometeor 552.

FIGS. 13A-13G are partial plan views of the weather-detecting device 700 that depict different moments of time during operation of the device. Two of the heating elements 712a, 712b are identified for purposes of illustration throughout FIGS. 13A-15.

Figure 13A:
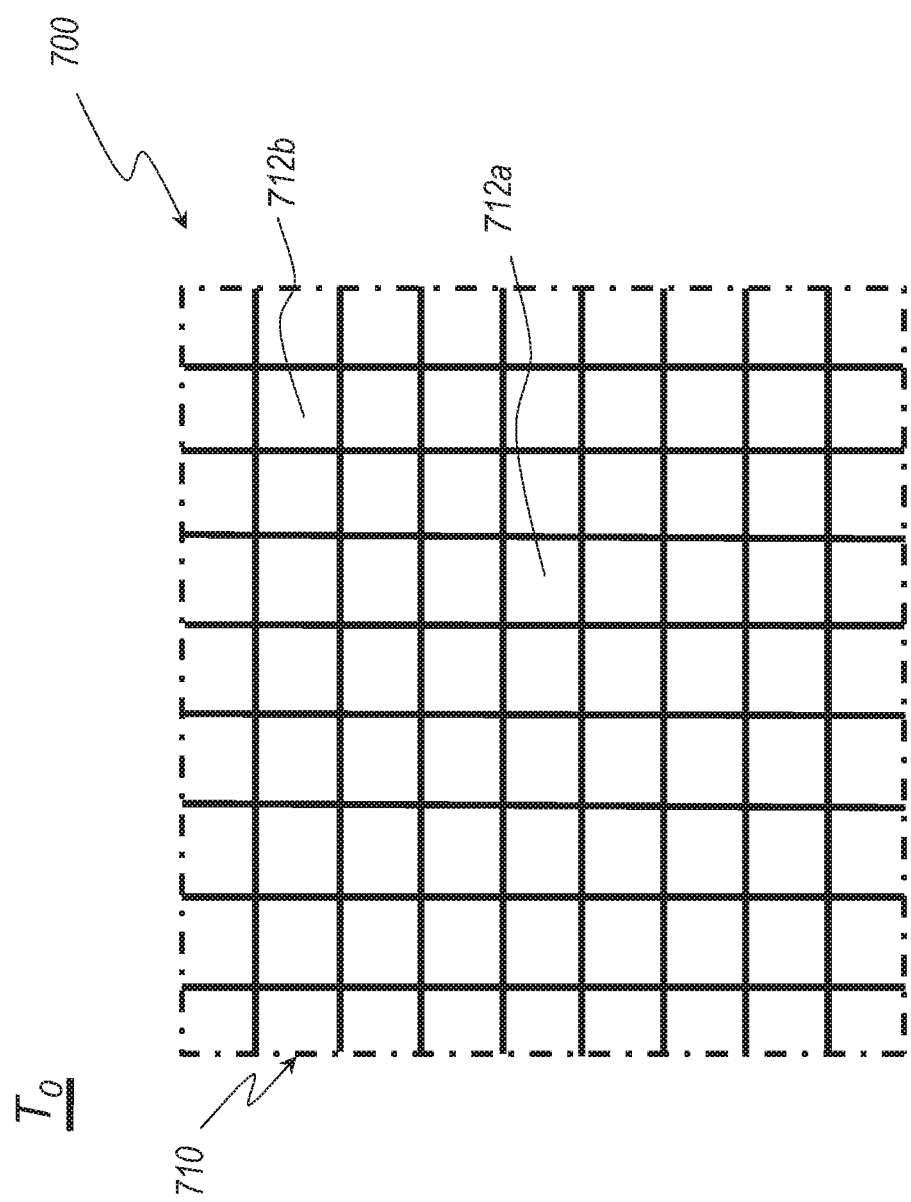
FIGS. 13A-13G are partial plan views of the weather-detecting device of FIG. 12 in which individual heating elements that are activated are shown shaded, thus depicting snapshots of a spatial heating profile at times $T_0$, $T_1$, $T_2$, $T_3$, $T_4$, $T_5$, and $T_6$, respectively.

FIG. 13A represents a moment $T_0$ in which all of the heating elements 712 are operating at the target temperature. Accordingly, none of the heating elements 712 are activated.

Figure 13B:
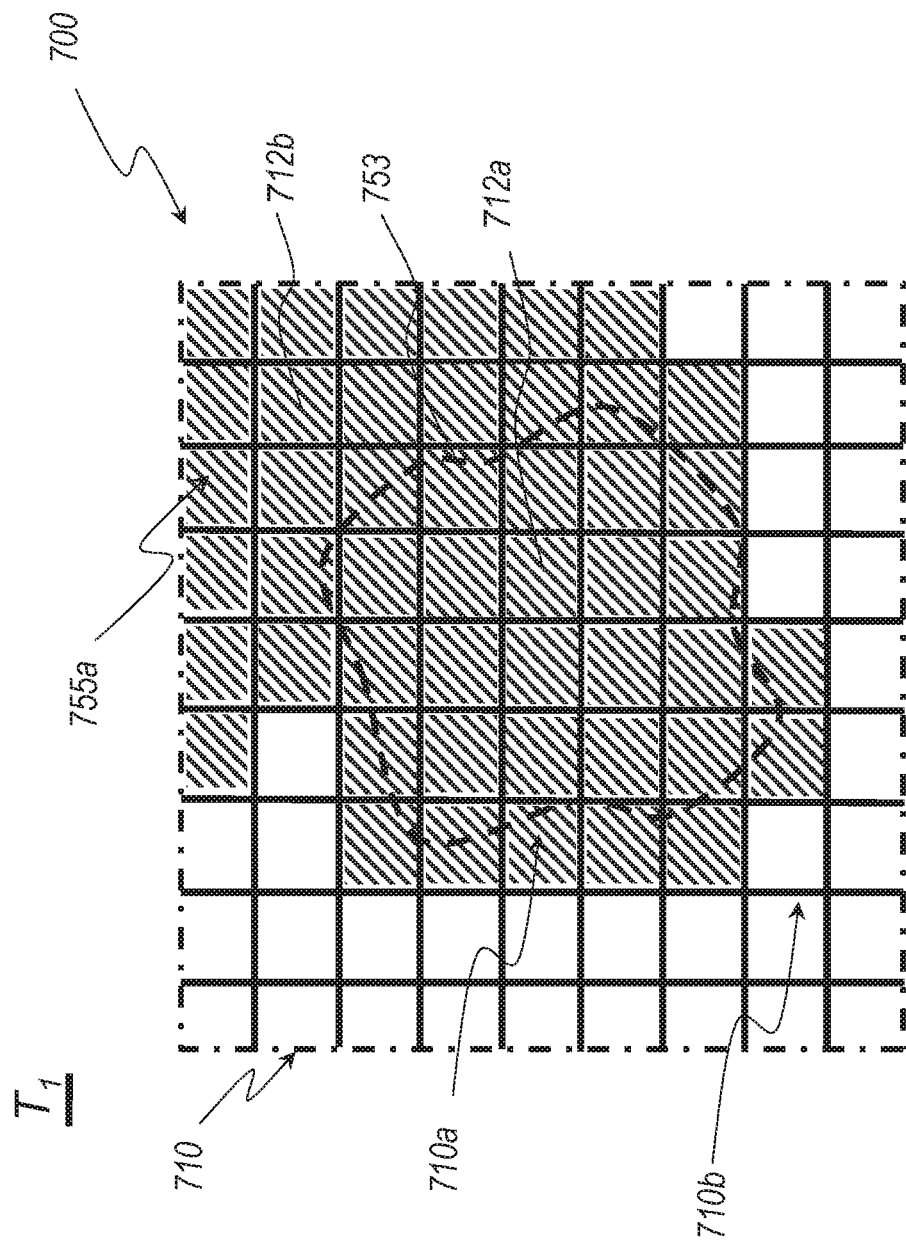

FIG. 13B represents a moment $T_1$ after the hydrometeor 752 (see FIG. 12) has landed on the detection region 706 and during which the wind gust 754 has traversed a first group 755a of the heating elements 712. For purposes of clarity, the hydrometeor 752 itself is not depicted in FIG. 13B (or in any of FIGS. 13C-13G), but the perimeter of or footprint 753 that the hydrometeor 752 makes once initially positioned on the detection region 706 is shown. Throughout FIGS. 13B-13G, individual heating elements 712 that are activated are depicted as being shaded, whereas non-activated heating elements 712 are not shaded. The array 710 thus includes a sub-array 710a of activated pixels and a sub-array 710b of non-activated pixels.

Further, the sub-array 710a of activated elements consists of the first set or group 755a of heating elements 712 over which the wind gust 754 passes (i.e., the activated pixels within the sub-array 710a over which the hydrometeor 752 is not positioned) and a second set of heating elements 712 over which the hydrometeor 752 is positioned. In the illustrated scenario, first group 755a of heating elements 712 is positioned at the upper right corner of the array 710.

Figure 13C:
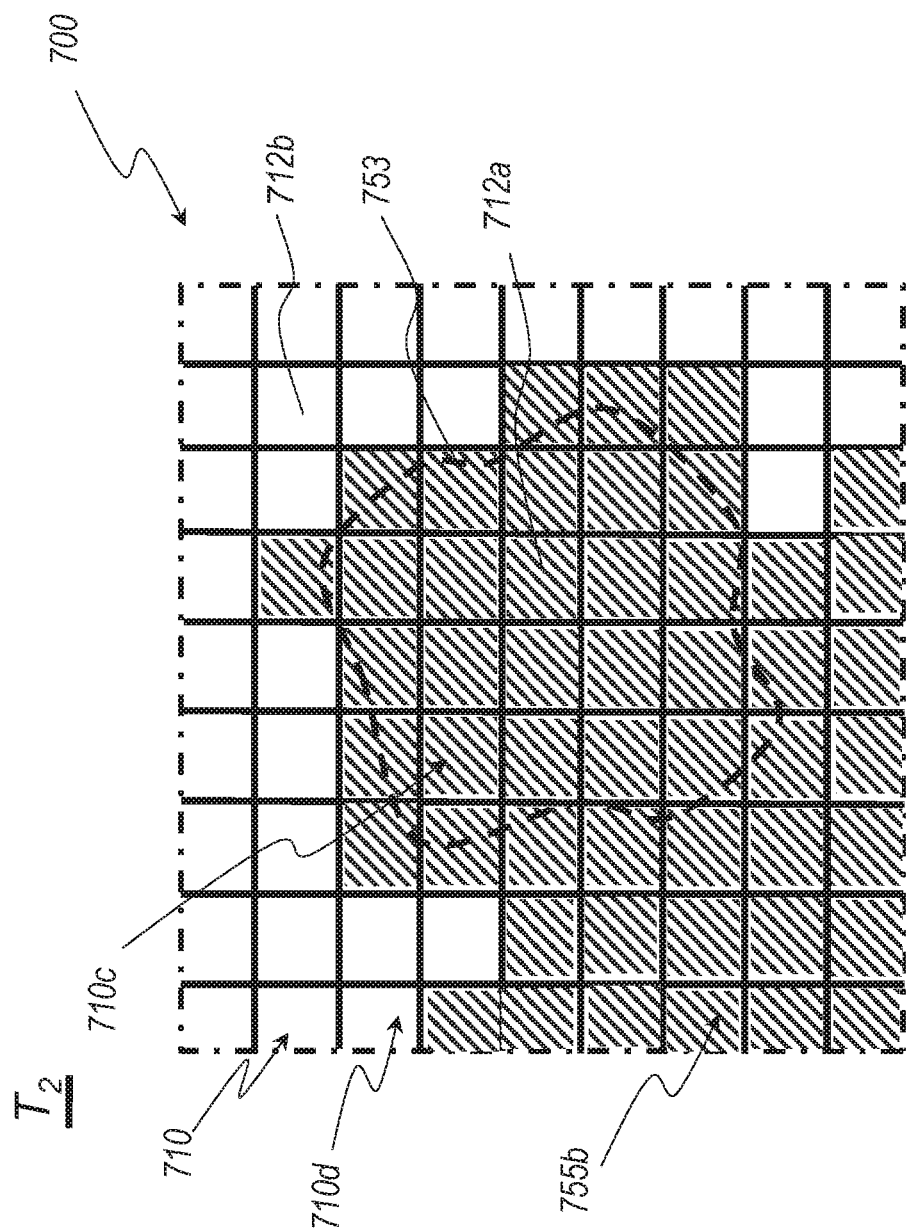

FIG. 13C represents a moment $T_2$ after the sub-array 710a has heated the hydrometeor 752 briefly and during which the wind gust 754 has traversed a group 755b of the heating elements 712. A sub-array 710c of activated elements consists of the group 755b of heating elements 712 over which the wind gust 754 passes (i.e., the activated pixels within the sub-array 710c over which the hydrometeor 752 is not positioned) and a second set of heating elements 712 over which the hydrometeor 752 is positioned. In the illustrated scenario, the group 755b includes elements in the lower left corner of the array 710. Thus, it can be seen that the wind gust has progressed from the upper right corner of the array 710 to the lower left corner of the array 710. As discussed further below, the timing, duration, direction, and/or geometry (e.g., number and orientation of wind-activated pixels 755a, 755b) of such movement can be used to determine one or more of the speed and direction of the gust.

Figure 13D:
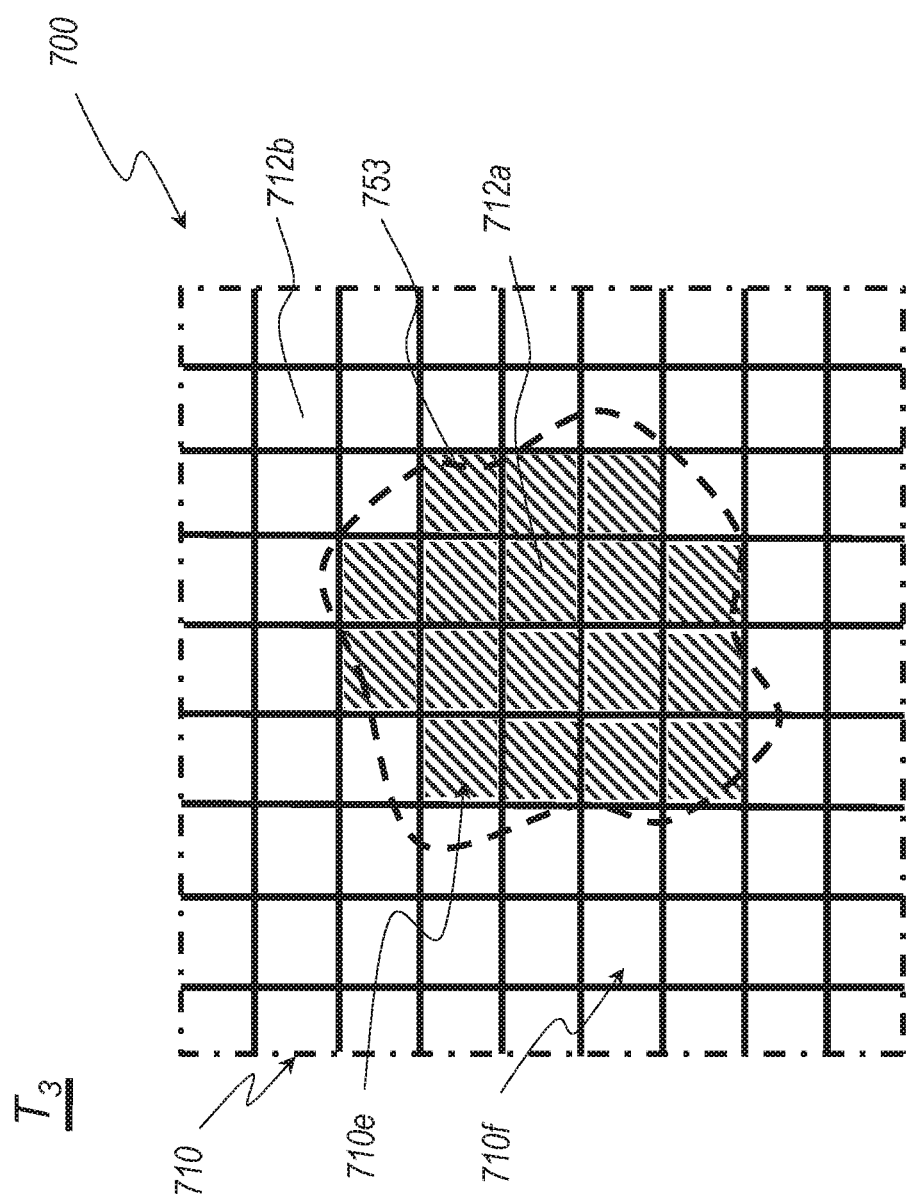
Figure 13E:
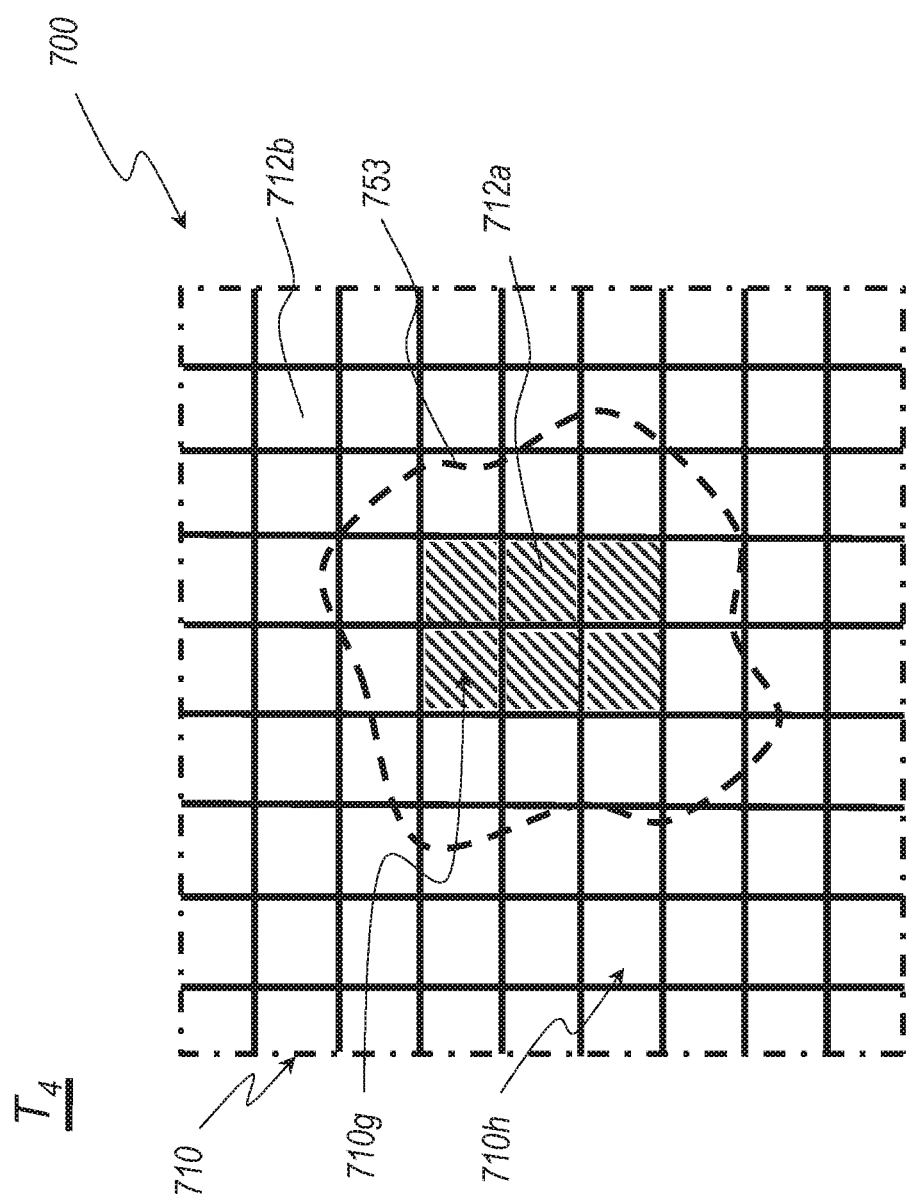
Figure 13F:
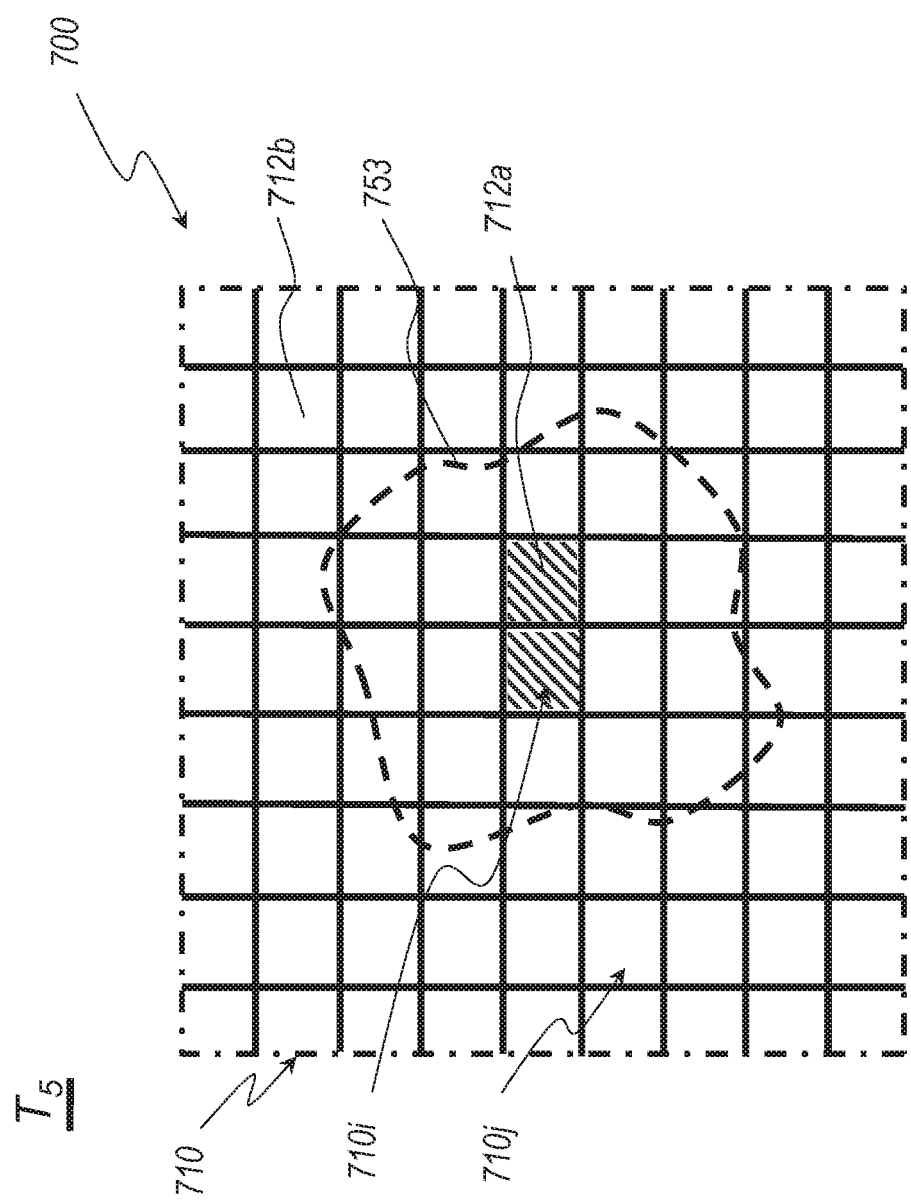

FIGS. 13D-13G represent moments $T_3$-$T_6$ that are analogous to the moments $T_2$-$T_5$ depicted in FIGS. 8C-8F, respectively. In FIG. 13D, the array 710 consists of two sub-arrays 710e, 710f, where the sub-array 710e is composed of actuated heating elements 712 and the sub-array 710f is composed of non-actuated heating elements 712. In like manner, the array 710 includes activated sub-arrays 710g and 710i and includes non-activated sub-arrays 710h and 710j in FIGS. 13E and 13F, respectively.

Figure 13G:
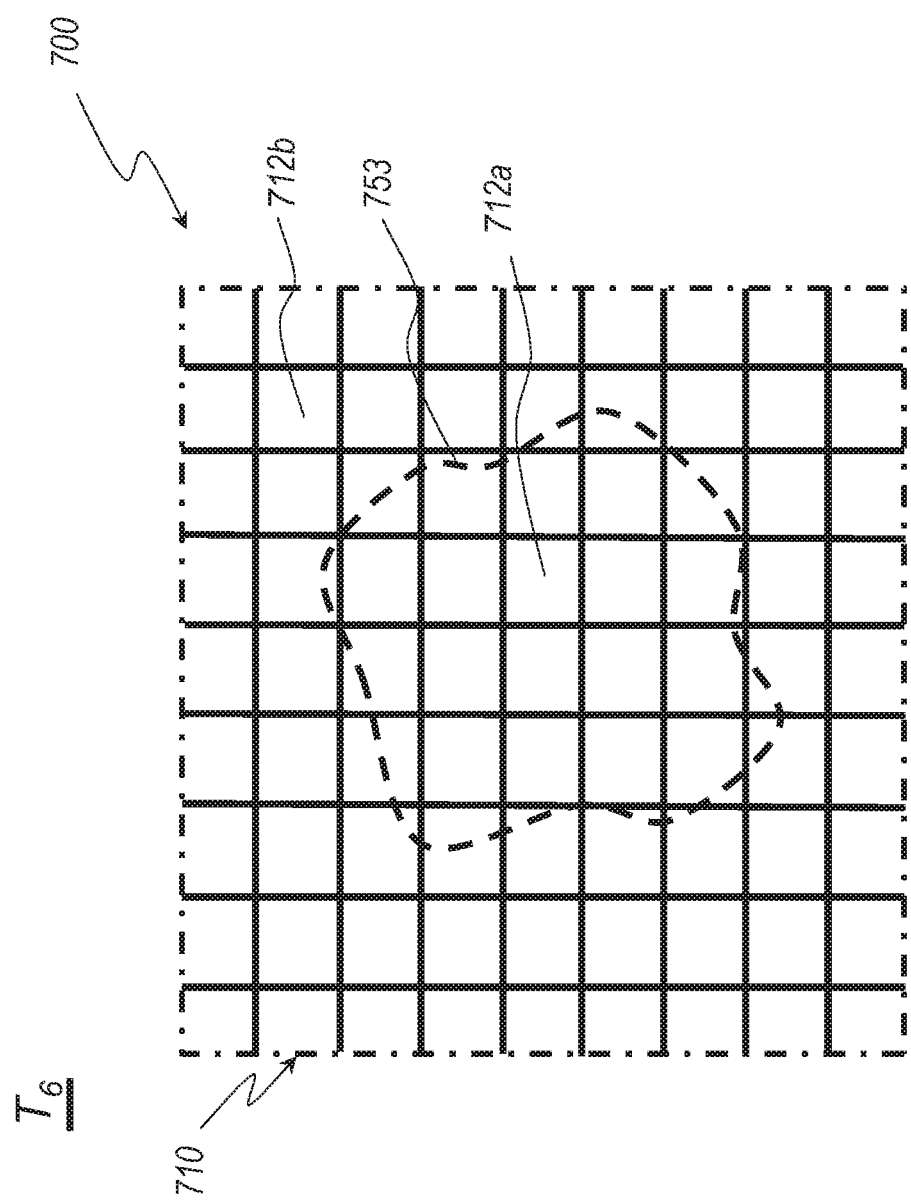

FIG. 13G represents a moment $T_6$ after the sub-array 710h (FIG. 13F) has heated the hydrometeor 752 until the final portion thereof has evaporated or sublimated. The array 710 has thus transitioned to the operational mode depicted in FIG. 13A in which the heating elements are activated only intermittently to maintain them at the target temperature.

In certain embodiments, a processor (such as those discussed above) can use data regarding one or more of the sub-arrays 710a, 710b, 710c, 710d, 710e, 710f, 710g, 710h, 710i, 710j to determine properties of the hydrometeor 752 and/or the wind gust 754. For example, the size, shape, density, and/or orientation of the portion of the hydrometeor 752 that continues to contact the detection region 706 after application of a known quantity of heat can be determined from the data. In other or further instances, the presence, strength, duration, and/or direction of the wind gust 754 may be determined. The processor may further be configured to filter data that pertains to one or both of the cooling events 750a, 750b, as further discussed below.

In some instances, the wind 754 may have a laminar flow. In other instances, the wind 754 may have a turbulent flow, and the wind 754 may also be referred to as turbulence. The time constants associated with recovery from laminar or turbulent flow may be different. In some embodiments, the device 700 is capable of distinguishing one type of wind flow from another based on the time constants associated therewith.

FIGS. 13B-13G represent snapshots of a spatial heating profile of the hydrometeor 752 at times $T_1$, $T_2$, $T_3$, $T_4$, $T_5$, and $T_6$ respectively. Similarly, FIGS. 13B and 13C represent snapshots of a spatial heating profile that corresponds to the wind 754 at times $T_1$ and $T_2$, respectively. The temporal heating profiles of the hydrometeor and of the wind are demonstrated, in part, in FIGS. 14 and 15, respectively.

Figure 14:
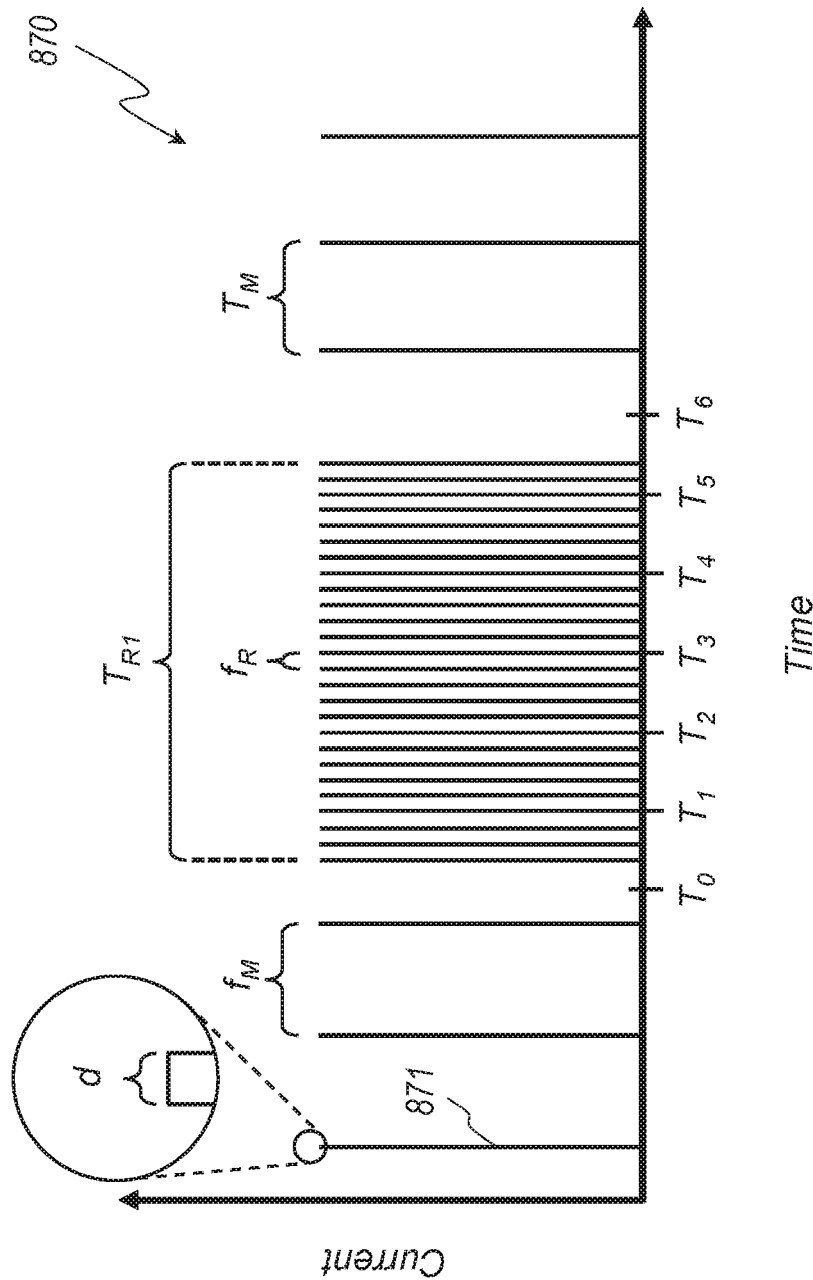
FIG. 14 is a plot of the current supplied to one of the heating elements of the device of FIG. 12 as a function of time, with the times $T_0$, $T_1$, $T_2$, $T_3$, $T_4$, $T_5$, and $T_6$ of FIGS. 13A-13G identified, and depicts a temporal heating profile of the heating element.

In particular, FIG. 14 is a plot 870 of the current supplied to one of the heating elements of the device 700 as a function of time, with the times $T_0$, $T_1$, $T_2$, $T_3$, $T_4$, $T_5$, and $T_6$ of FIGS. 13A-13G identified. The overall temporal heating profile of the hydrometeor would constitute a compilation or integration of similar temporal profiles obtained for all of the pixels, or heating elements, from which heat was transferred to the hydrometeor.

In the illustrated embodiment, a controller, such as any of the controllers previously discussed, intermittently directs a pulse 871 of current through the heating element 712a to maintain the heating element at a target temperature, which may be above the boiling point of water for a given set of environmental conditions (e.g., 120 or 130° C., in some instances). Each pulse 871 has the same amplitude and the same duration d.

The maintenance frequency $f_M$, maintenance time $T_M$, and/or the recovery frequency $f_R$ of the present example may either be the same as or different from those discussed with respect to FIG. 9. In some instances a recovery time $T_{R1}$ of the device 700 relative to the hydrometeor 752 may be different from the recovery time $T_R$ for the device 500 relative to the hydrometeor 552. For example, if the same time scale is used in plots 760 (FIG. 9) and 870 (FIG. 14), the recovery time $T_{R1}$ is longer than the recovery time $T_R$.

Figure 15:
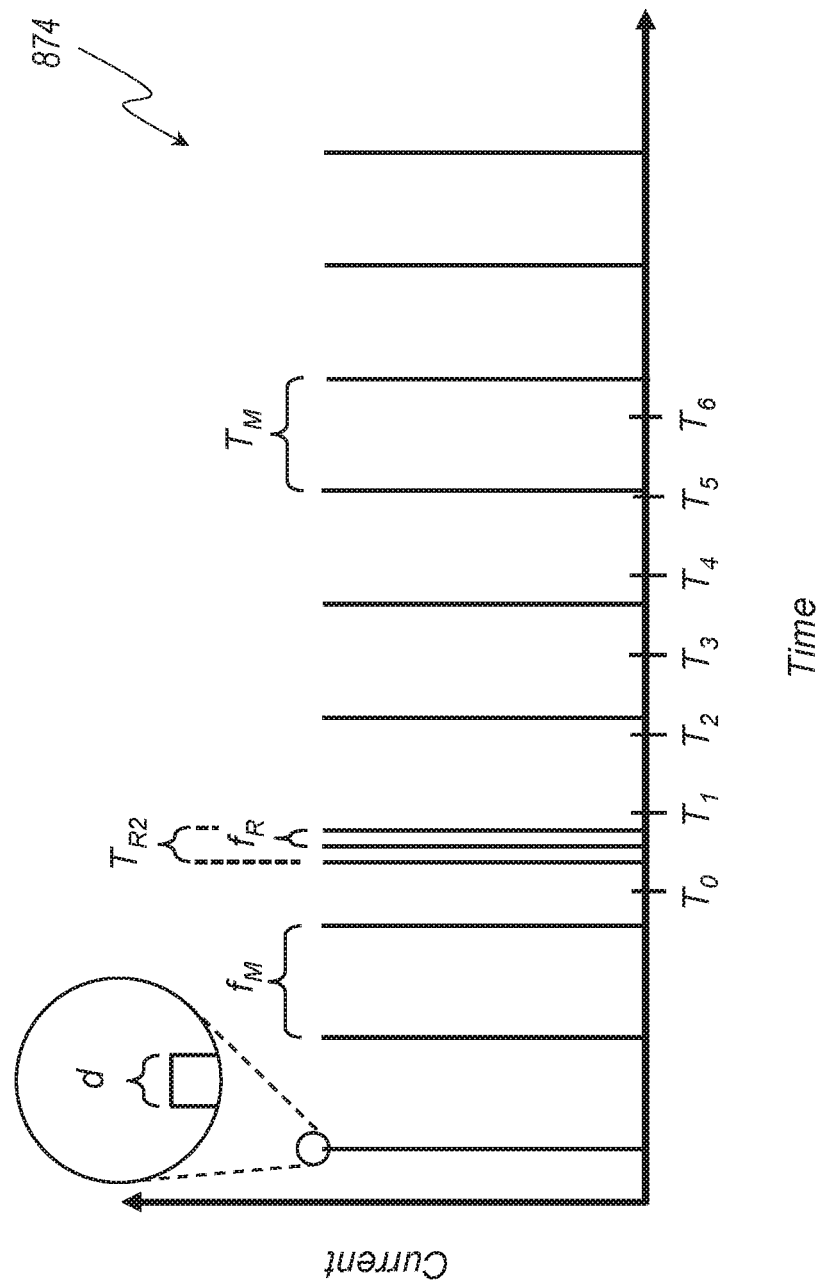
FIG. 15 is a plot of the current supplied to another of the heating elements of the device of FIG. 12 as a function of time, with the times $T_0$, $T_1$, $T_2$, $T_3$, $T_4$, $T_5$, and $T_6$ of FIGS. 13A-13G identified, and depicts a temporal heating profile of the heating element.

FIG. 15 is a plot 874 of the current supplied to the heating element 712b as a function of time, with the times $T_0$, $T_1$, $T_2$, $T_3$, $T_4$, $T_5$, and $T_6$ of FIGS. 13A-13G identified. As shown, the recovery time $T_{R2}$ at which the device 700 recovers from the cooling effects of the wind 754 is much smaller than the recovery time $T_{R1}$ at which the device 700 recovers from the cooling effects of the hydrometeor 752. Such a difference in time scales can be used in processing the heating profiles of the different cooling events.

For example, in some embodiments, it may be desirable to filter the effects of wind on the heating elements from data that pertains to precipitation. That is, it may be desirable for the device 700 to generate information pertaining only to precipitation. In certain of such embodiments, such filtering may involve removing or ignoring data having time constants or recovery times below a threshold value, and the threshold value may be set at or above a high end of recovery times associated with cooling events due to wind.

For example, in other embodiments, it may be desirable to filter the effects of precipitation on the heating elements from data that pertains to wind. That is, it may be desirable for the device 700 to generate information pertaining only to wind. In certain of such embodiments, such filtering may involve removing or ignoring data having time constants or recovery times above a threshold value, and the threshold value may be set at or below a low end of recovery times associated with cooling events due to precipitation.

The foregoing examples are only illustrative. In some instances, a wind event may be relatively sustained. For example a steady breeze, rather than a wind gust (such as the wind event 754), may yield fluctuations that occur on a much longer time scale than that associated with precipitation recovery times. As a result, recovery events having longer time constants may also or alternatively be filtered from the data in order to focus on precipitation.

The device 700 may typically encounter gusts of wind, such as the wind event 754, rather than steady wind flow. Such gusts may yield propagation signals that traverse some or all of the pixels of the device 700 in manners such as described above with respect to FIGS. 13A-13G. Such propagation signals may be readily separable from signals associated with heating hydrometeors, which may have longer time constants and/or which may involve less movement. For example, in many instances, hydrometeors (or the centroids thereof) may be substantially stationary once the hydrometeors are positioned on the device 700. For example, although there may be some movement along the edges of a hydrometeor as it sublimates or evaporates, there may be relatively little movement of the central portion of the hydrometeor from the time of initial contact until evaporation or sublimation of the hydrometeor is complete. Thus, the device 700 can detect movement signatures of the different cooling events. These movement signatures can be processed in a variety of ways.

For example, in some instances, the signals associated with wind gusts can be separated from those associated with hydrometeor heating in any suitable manner (e.g., using any suitable signal processing techniques, such as 2D Fourier transform). Stated otherwise, the wind gust signals can be filtered from the hydrometeor heating signals. The isolated hydrometeor signals can be analyzed for such quantities as precipitation rate, precipitation amount, etc.

In other or further instances, the signals associated with wind gusts can be analyzed. For example, the device 700 can detect properties, such as direction and speed, of wind gusts that propagate across the plate. These properties can be used to determine atmospheric turbulence, gust speed, etc. Further, gust velocities may be averaged over a period of time (e.g., 5 minutes, 10 minutes) to determine overall wind speed and direction. Any other suitable wind and/or gust analysis techniques or property determinations are contemplated. Accordingly, the device 700 may function as a precipitation sensor and/or as a wind sensor.

FIGS. 16A-16G are partial cross-sectional views of illustrative processes for fabricating weather-detecting devices. In certain embodiments, the processes employ MEMS fabrication materials and techniques.

Figure 16A:
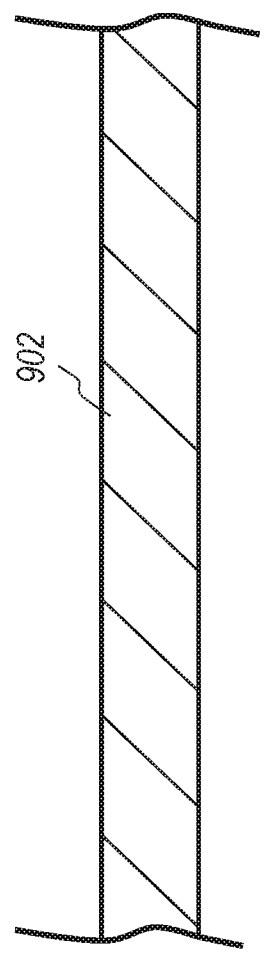
FIGS. 16A-16G are partial cross-sectional views of illustrative processes for fabricating weather-detecting devices.

With reference to FIG. 16A, a substrate 902 is provided. The substrate can comprise any suitable material, such as silicon or glass.

Figure 16B:
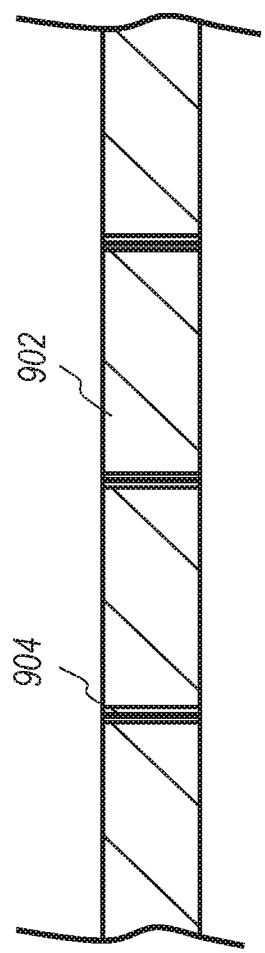

With reference to FIG. 16B, a plurality of vias 904 are provided in the substrate 902. The vias 904 are for electrical conduction, and can comprise any suitable material.

Figure 16C:
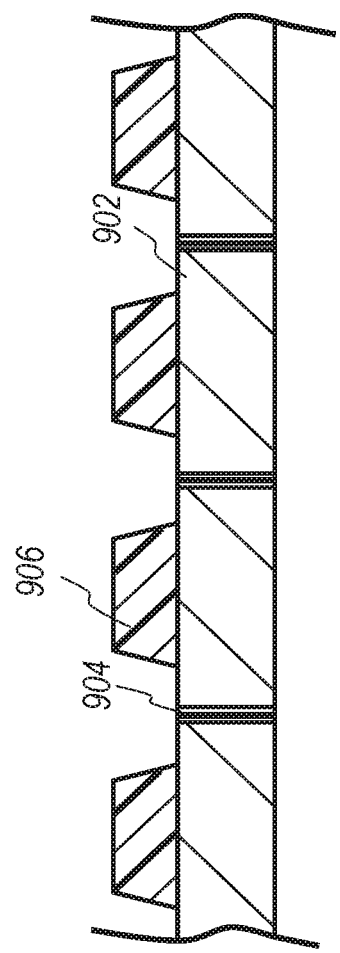

With reference to FIG. 16C, a plurality of sacrificial bases 906, which may also be referred to as a sacrificial layer, are deposited on the substrate 902 at positions spaced from the vias 904. In the illustrated embodiment, the sacrificial bases 906 are substantially trapezoidal in cross-section. Other configurations of the sacrificial bases 906 are contemplated. The sacrificial bases 906 can comprise any suitable material. In some embodiments, the bases 906 comprise one or more polymeric materials.

Figure 16D:
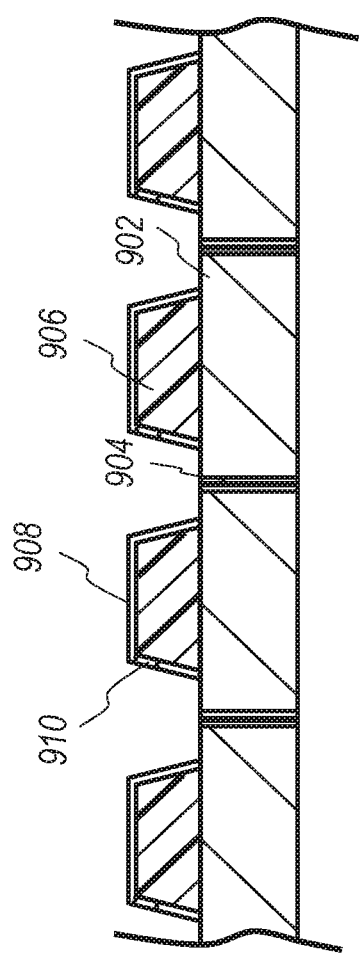

With reference to FIG. 16D, a layer of suspension elements 908 is deposited over the sacrificial bases 906. In some embodiments, the suspension elements 908 can generally assume the shape of the sacrificial bases 906, and thus the suspension elements 908 are substantially trapezoidal in the illustrated embodiment. The suspension elements 908 can be fashioned with an opening 910 to provide access to the sacrificial bases 906. The suspension elements 908 can comprise any suitable material, such as, for example, glass or an oxide. The suspension elements 908 can be thin so as to inhibit thermal conduction. In various embodiments, the suspension elements 908 have a thickness of no greater than 1, 2, or 3 microns. The thickness of the suspension elements 908 can be substantially smaller than a thickness of the substrate 902.

Figure 16E:
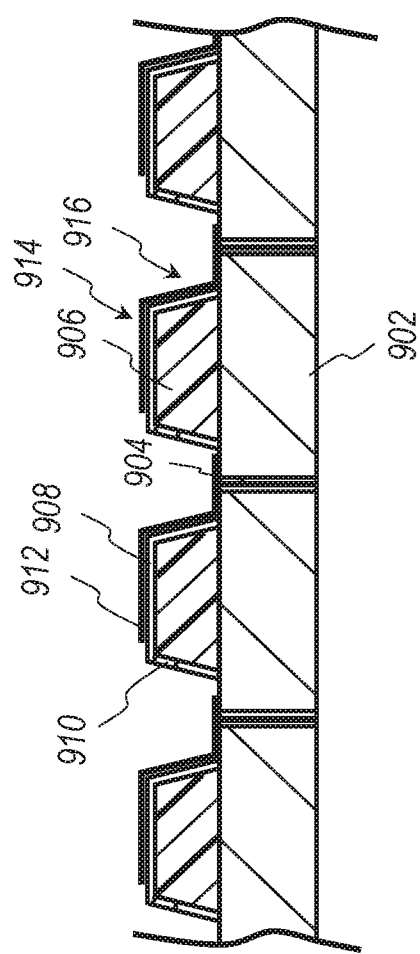

With reference to FIG. 16E, a plurality of heating elements 912 are deposited over the suspension elements 908. Each heating element 912 can include a substantially planar region 914 at an upper end of the trapezoidal suspension elements 908. The planar regions 914 of neighboring heating elements 912 can be substantially coplanar. The heating elements 912 further include electrical lead portions 916 that electrically connect the planar regions 914 to the vias 904. The heating elements 912 can be deposited in any suitable manner, such as, for example, electroplating.

Figure 16F:
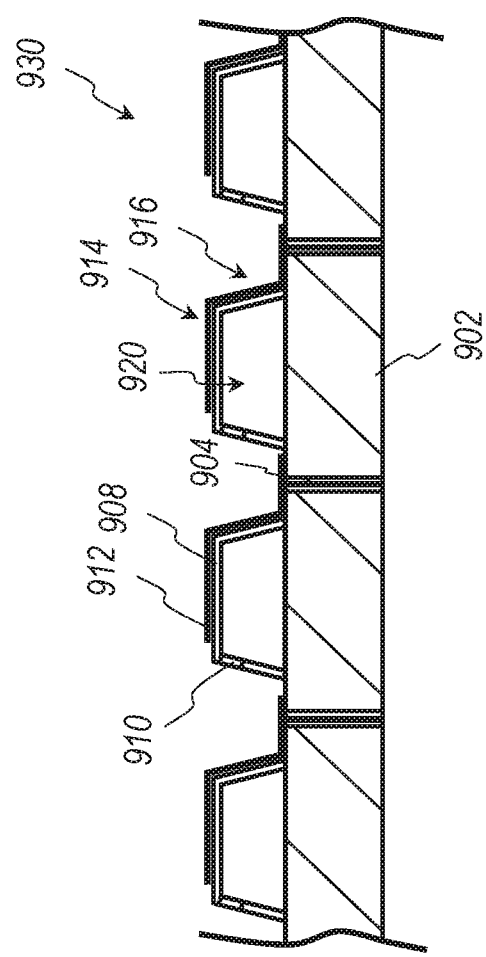

With reference to FIG. 16F, the sacrificial bases 906 are removed by way of the holes 910 in any suitable manner. For example, in some embodiments, the sacrificial bases 906 are removed by introducing etchant through the holes 910. Removal of the bases 906 yields air gaps 920 that inhibit heat transfer between the heating elements 912 and the substrate 902. In some embodiments, creation of the air gaps 920 is the final step of manufacturing a chip 930, and the heating elements 912 are left directly exposed to the surrounding environment. The air gaps 920 can distance the heating elements 912 from the substrate 902 to inhibit thermal transfer between the heating elements 912 and the substrate 902. In various embodiments, the maximum distance between the heating elements 912 and the substrate is no greater than about 10, 15, or 20 microns. Other arrangements and distances are also contemplated.

Figure 16G:
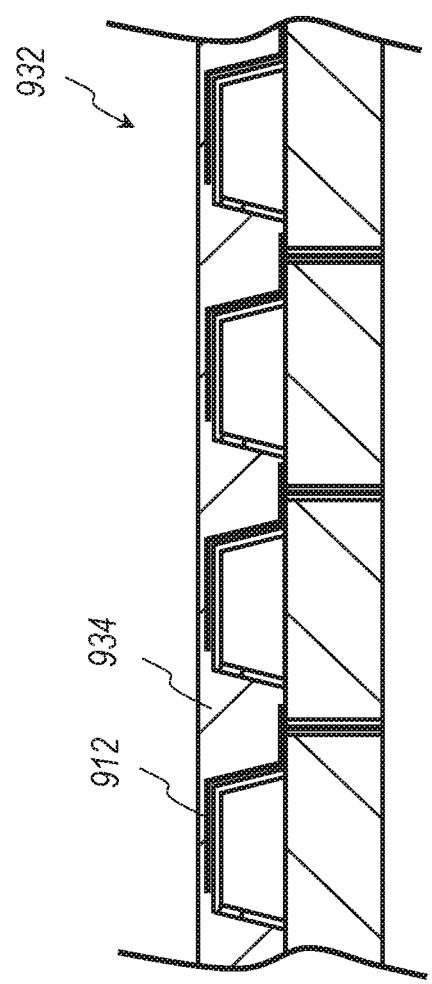

FIG. 16G depicts a step employed in fabricating a chip 932 that is substantially the same as the chip 930, with one exception. The chip 932 is formed by further depositing a protective, thermal-conducting layer 934 (such as the layer 334 discussed above) over the heating elements 912.

Figure 17A:
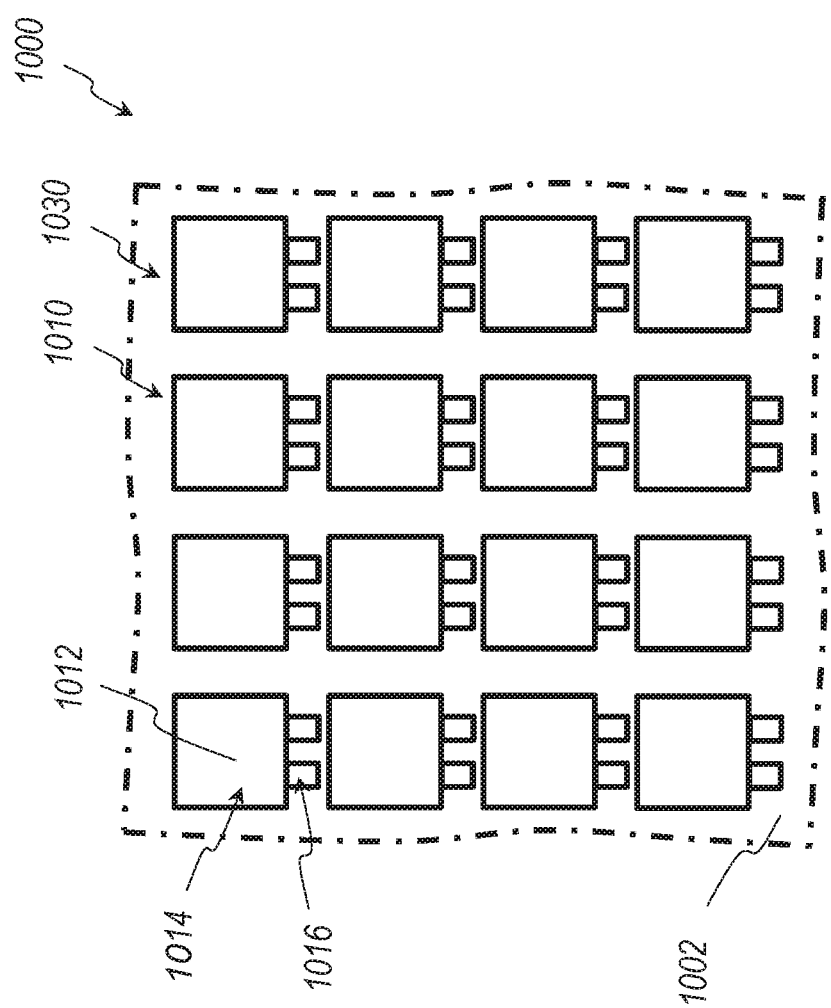
FIG. 17A is a top plan view of a portion of an embodiment of a weather-detecting device that has been fabricated in accordance with the process depicted in FIGS. 16A-16F.

FIG. 17A is a top plan view of a portion of an embodiment of a weather-detecting device 1000 that includes a chip 1030 that has been fabricated in accordance with the process depicted in FIGS. 16A-16F. The device 1000 includes an array 1010 of heating elements 1012 mounted to a substrate 1002. Each heating element 1012 includes a substantially planar region 1014 and an electrical lead portion 1016. The array 1010 is patterned as a 2-dimensional grid of equally spaced heating elements 1012.

Figure 17B:
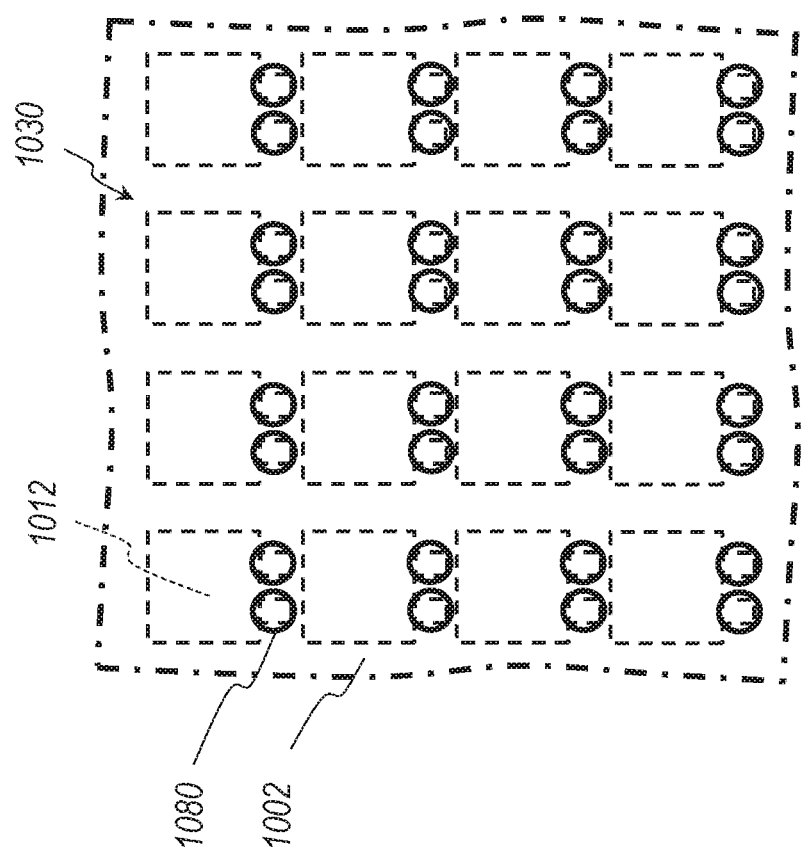
FIG. 17B is a bottom plan view of a substrate portion of the weather-detecting device of FIG. 17A that further depicts electrical contacts coupled to heating elements of the device.

FIG. 17B is a bottom plan view of the chip 1030 showing a grid of electrical connectors 1080 mounted at an opposite side of the substrate 1002. The connectors 1080 are electrically coupled with the heating elements 1012 by way of vias (such as the vias 904) that extend through the substrate 1002. The vias permit both the heating elements 1012 and the electrical contacts 1080 to be arranged in the same pattern at opposite sides of the substrate 1002. Stated otherwise, the electrical contacts 1080 form a grid that is complementary to a grid formed by the heating elements 1012. These grids may each define substantially equal areas.

Mapping the heating elements 1012 and their associated contacts 1080 can be greatly facilitated with an arrangement such as depicted in FIGS. 17A and 17B. The chip 1030 can be readily coupled with a controller in any suitable manner, such as by flip chip techniques.

Figure 18A:
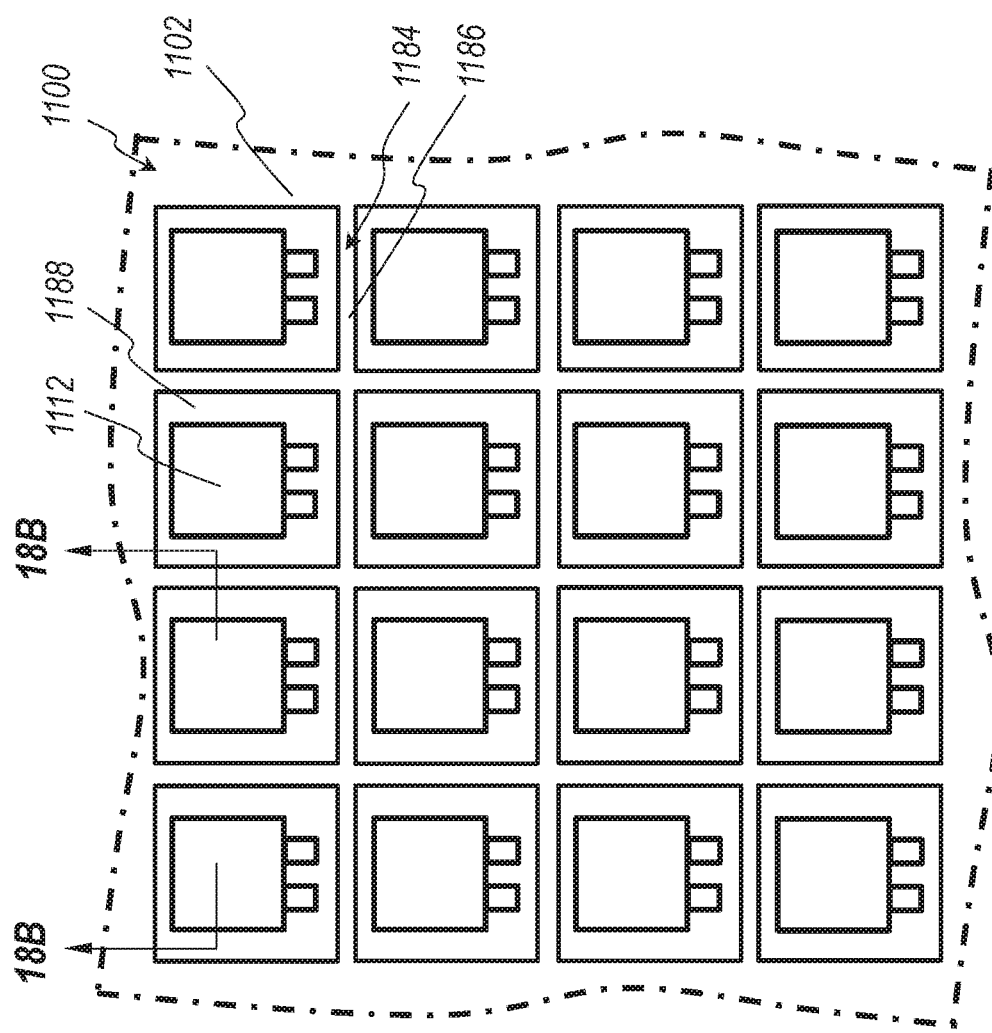
FIG. 18A is a top plan view of a portion of another embodiment of a weather-detecting device that has been fabricated in accordance with a process such as that depicted in FIGS. 16A-16F, but which also includes the creation of trenches in a substrate.
Figure 18B:
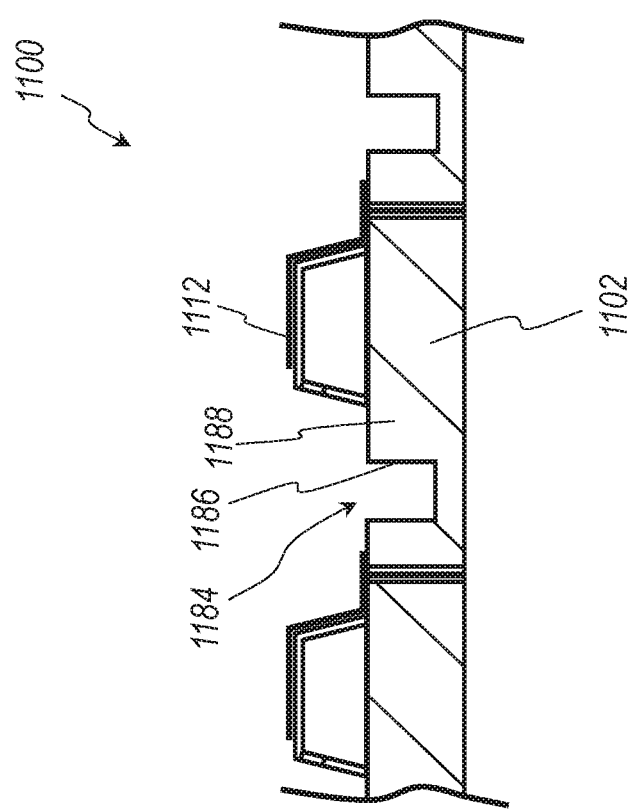
FIG. 18B is a cross-sectional view of the weather-detecting device of FIG. 18A taken along the view line 18B-18B in FIG. 18A.

FIGS. 18A and 18B are top plan and cross-sectional views, respectively, of portions of another embodiment of a weather-detecting device 1100 that has been fabricated in accordance with a process similar to that depicted in FIGS. 16A-16F. The process further includes the creation of thermal barriers 1184 in a substrate 1102 between adjacent heating elements 1112. In the illustrated embodiment, the thermal barriers 1184 are trenches 1186 or channels in the substrate 1102. The trenches 1186 are thus regions of reduced material thickness, which inhibits thermal transfer between neighboring heating elements 1112.

In the illustrated embodiment, the trenches 1186 are arranged as a two-dimensional grid of intersecting lines that form a two-dimensional array of islands 1188. Each heating element 1112 is positioned on one of the islands 1188.

Figure 19A:
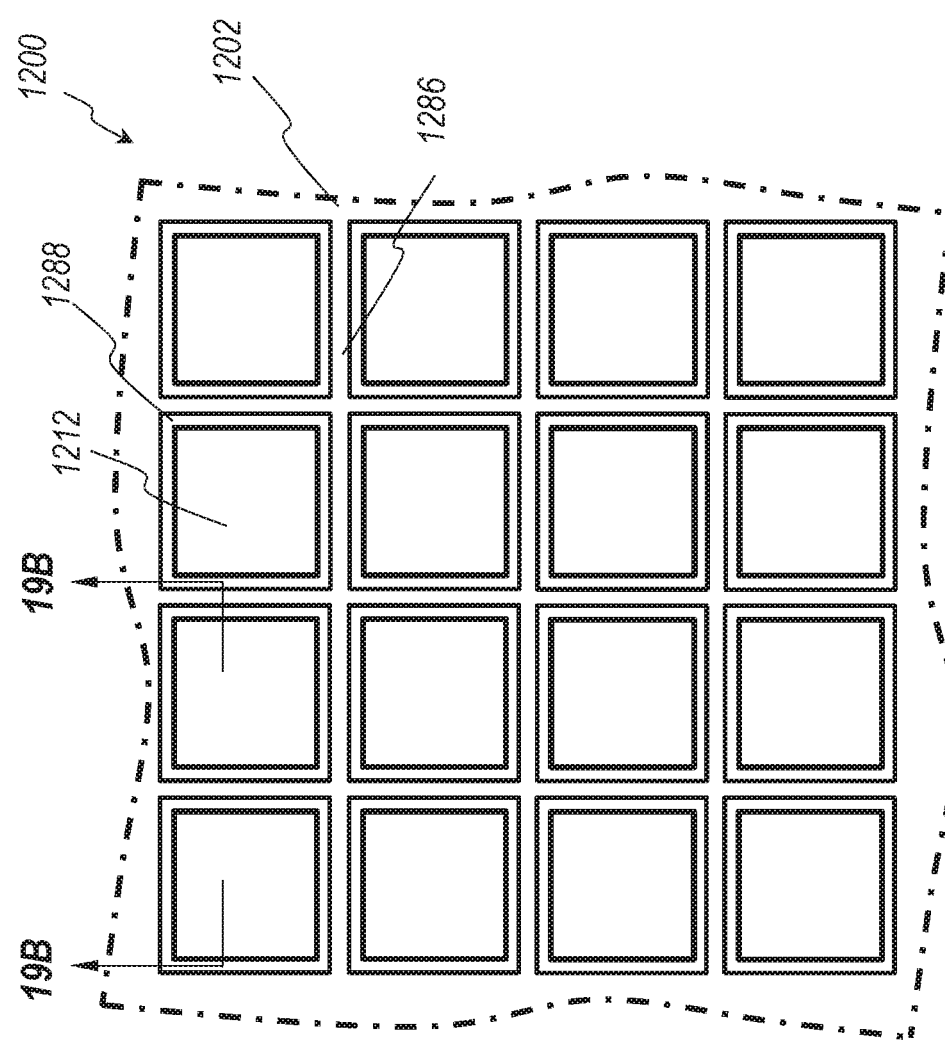
FIG. 19A is a top plan view of a portion of another embodiment of a weather-detecting device that includes trenches in a substrate.
Figure 19B:
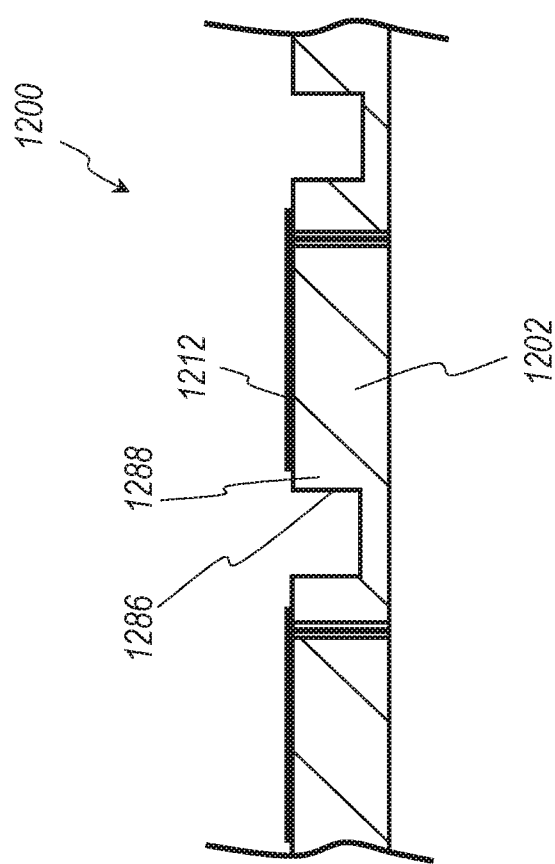
FIG. 19B is a cross-sectional view of the weather-detecting device of FIG. 19A taken along the view line 19B-19B in FIG. 19A.

FIGS. 19A and 19B are top plan and cross-sectional views, respectively, of portions of another embodiment of a weather-detecting device 1200 that has been fabricated in accordance with a process involving fewer steps than the process by which the device 1100 are formed. In particular, the weather-detecting device 1200 does not include suspension elements. Rather, heating elements 1212 are deposited directly on a substrate 1202. The device 1200 includes a similar arrangement of trenches 1286 and islands 1288 to inhibit thermal communication among the heating elements 1212.

Figure 20:
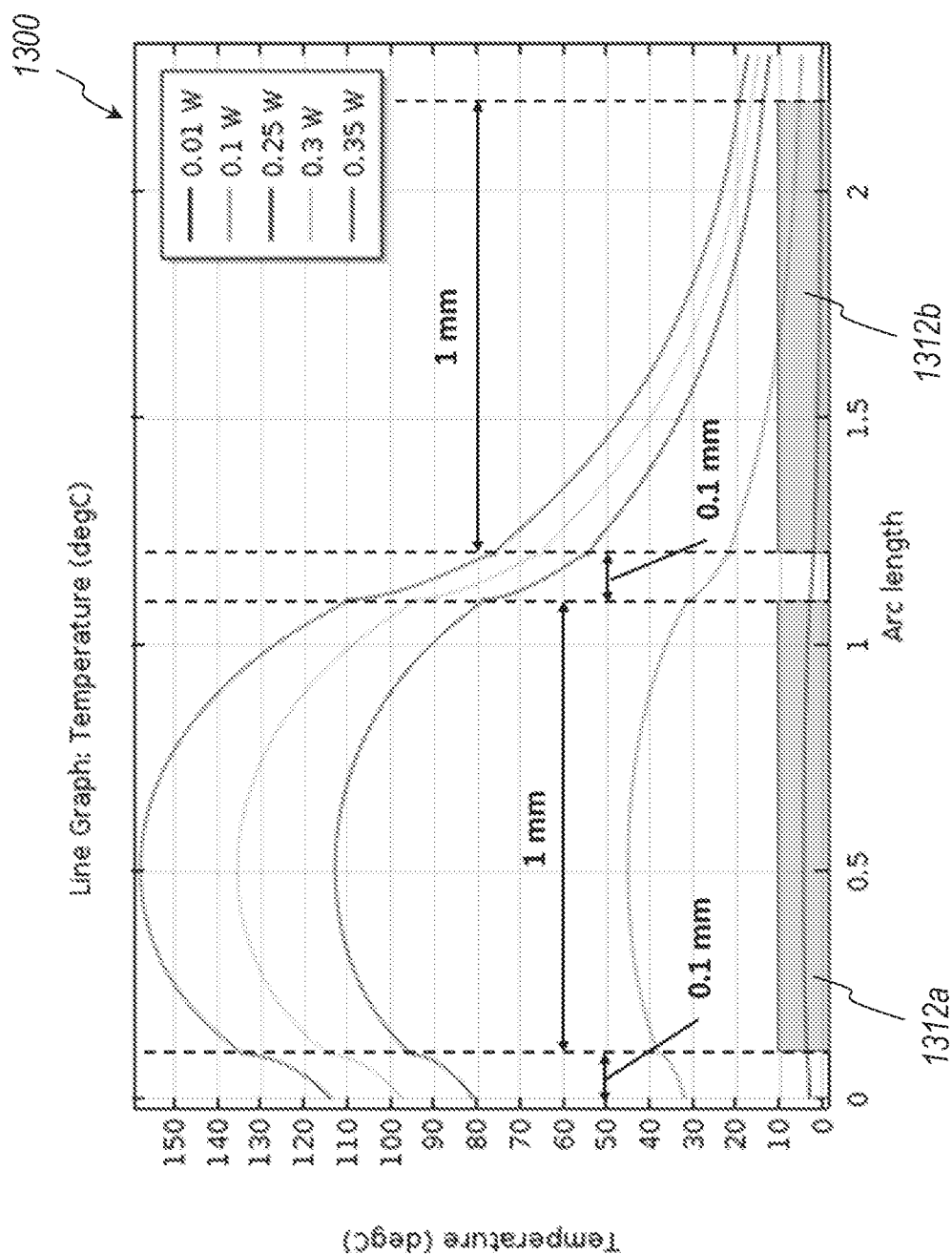
FIG. 20 is a plot that depicts, for five different operational powers, temperature as a function of position for two adjacent heating elements, where one of the heating elements is activated and the other is inactive.

FIG. 20 is a plot 1300 that depicts, for five different operational powers, temperature as a function of position for two adjacent heating elements 1312a, 1312b of another illustrative embodiment of a weather-detecting device, such as those described above. The operation powers of and temperatures achieved by the heating elements can vary with device design, such as the spacing between adjacent elements, the degree of thermal insulation between heating elements, and/or the materials of which the heating elements and/or other portions of the devices are formed. In the illustrated plot, the heating element 1312a is activated and the heating element 1312b is inactive. In some embodiments, it can be desirable to minimize cross-talk between an active and an inactive heating element 1312a, 1312b, to maintain as flat a temperature profile as possible across each heating element 1312a, 1312b, and/or to minimize the thermal response time of each heating element 1312a, 1312b.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Figure 21A:
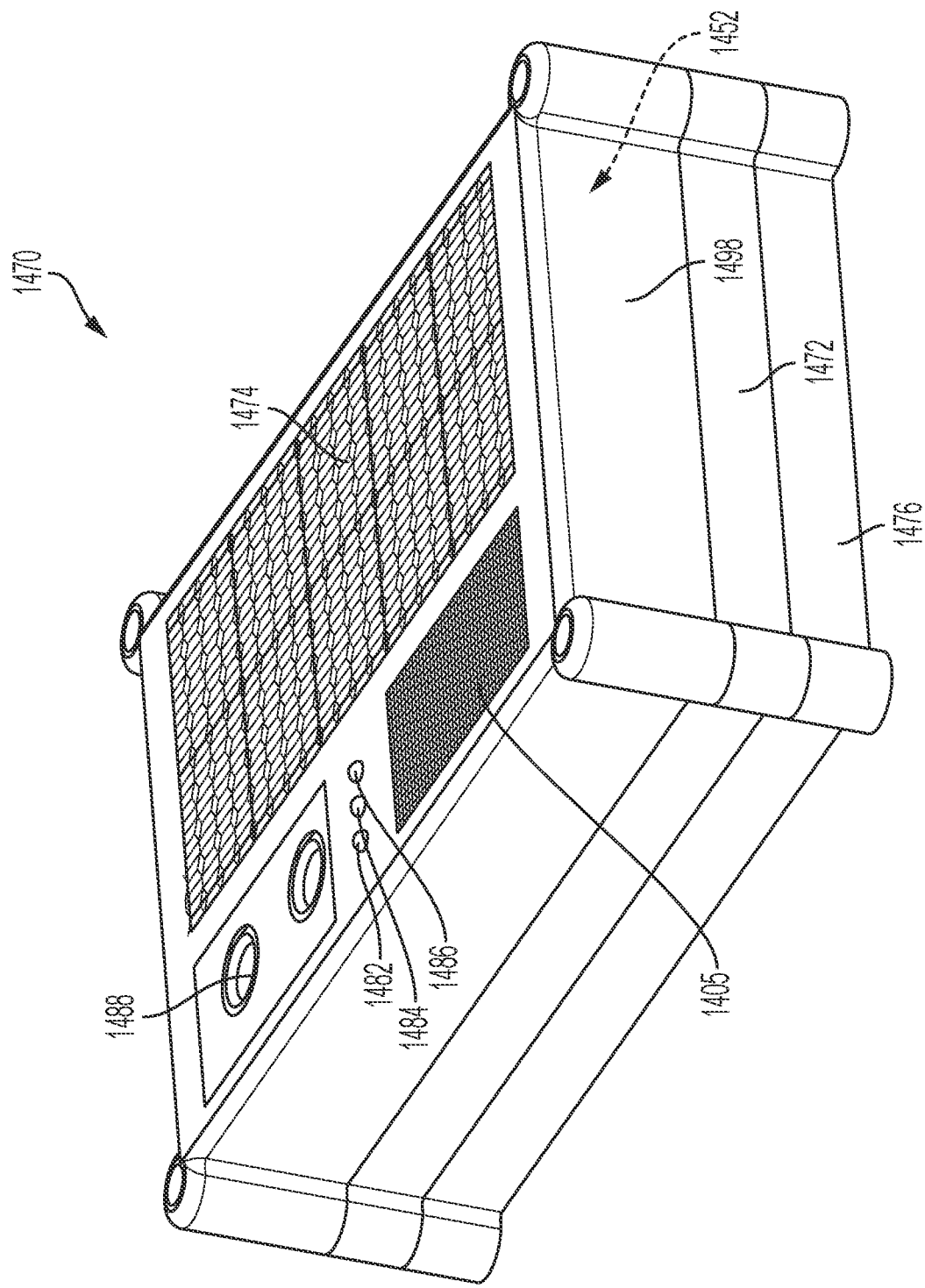
FIG. 21A is a perspective view of an embodiment of a present-weather system that includes a pixelated weather-detection device.

FIG. 21A depicts an embodiment of a weather-sensing system 1470 that resembles the weather-sensing system 70 discussed above with respect to FIG. 2C. The weather-sensing system 1470 includes a weather-detecting device 1405, such as any of the weather-detecting devices previously discussed. The system 1470 further includes a temperature sensor 1482, a humidity sensor 1484, a pressure sensor 1486, and a stereo camera 1488. The stereo camera 1488 can be used, for example, to detect cloud cover and/or base height. In the illustrated embodiment, the foregoing components are situated in a housing 1498, each with a portion thereof exposed to the environment to permit detection thereof. The housing 1498 further holds a solar panel 1474, which is electrically coupled with a rechargeable battery unit 1476. Also situated within the housing 1498 is a processor 1452 that controls operation of the system 1470 in manners such as discussed above.

Figure 21B:
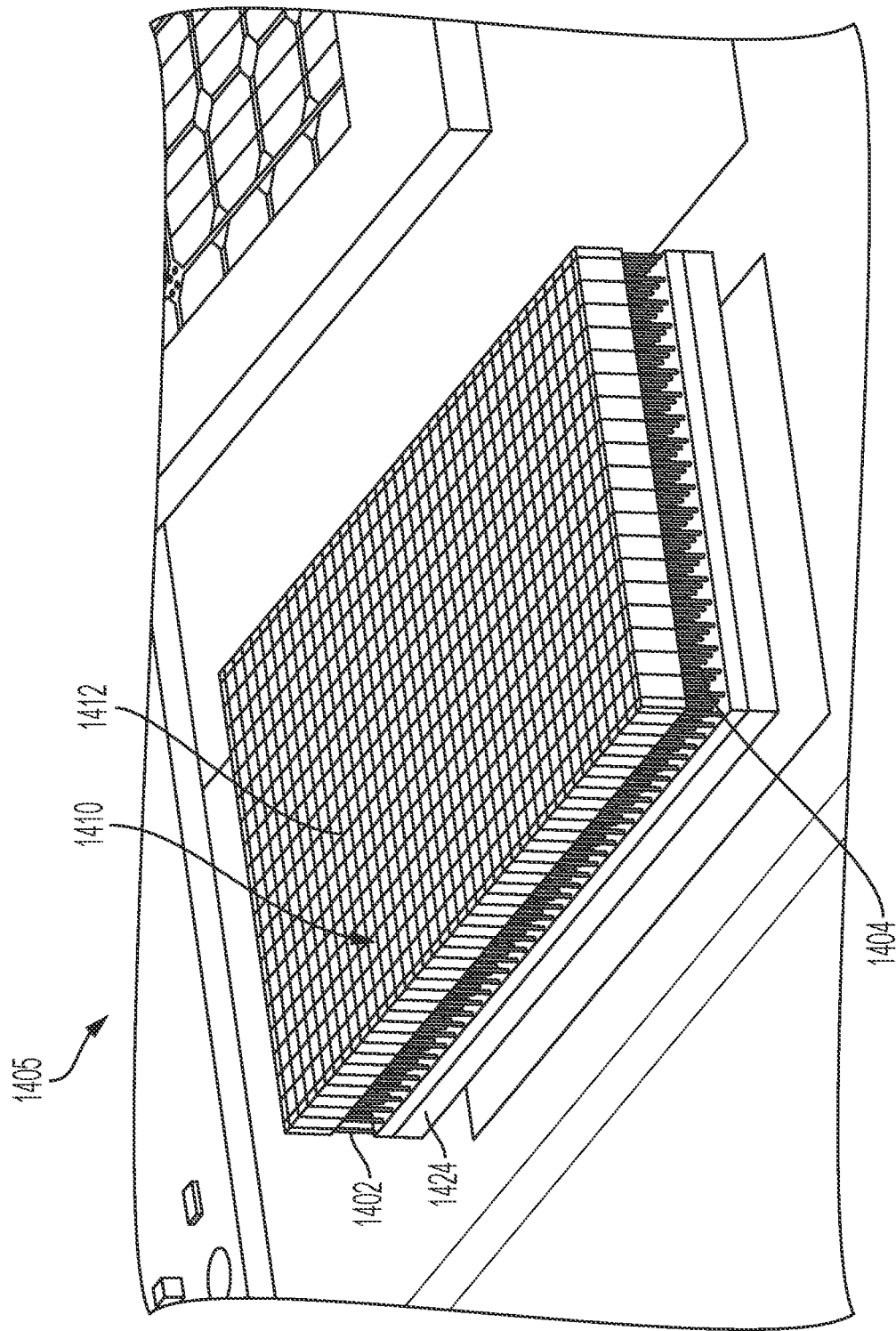
FIG. 21B is an enlarged view of the system of FIG. 21A with an upper housing piece removed to show the weather-detection device in further detail.

FIG. 21B depicts a portion of the weather-sensing system 1470 with the housing 1498 removed. The weather-detecting device 1405 is shown in greater detail. The weather-detecting device 1405 includes an array 1410 of heating elements 1412. The array 1410 is situated on a substrate 1402 through which a plurality of vias 1404 extend. Any suitable substrate can be used such as, but not limited to, a HermeS® glass wafer available from SCHOTT of Elmsford, N.Y. or a ceramic with electrical feedthroughs as available from Hereaus Technology Group and other manufacturers. Alternatively, a polymer substrate or a polymer film that is sufficiently heat resistant (e.g. KAPTON) can be used and mounted on a polymer frame or a conventional epoxy/glass fiber based (e.g. FR-4, FR-5) printed circuit board as a substrate. Regardless, the vias 1404 electrically couple the heating elements 1412 with a controller 1424 of any suitable variety, such as an ASIC chip. In some embodiments, the array 1410 of heating elements 1412 and substrate 1402 are coupled to the controller 1424 using known flip-chip bonding processes.

In some embodiments, the weather-detecting device 1405 may be configured to be readily removed from the system 1470, such as for repair or replacement, whether that replacement is with a weather-detecting device 1405 of the same variety or with one that has updated or enhanced capabilities (e.g., higher resolution). For example, the weather-detecting device may include one or more connectors for quickly coupling with or decoupling from connectors of the system 1470, as desired. One or more of the other sensors 1482, 1484, 1486 and/or other components of the system 1470 may likewise be readily replaceable or updatable. The system 1470 thus may be comprised of a collection of modular components.

Figure 22A:
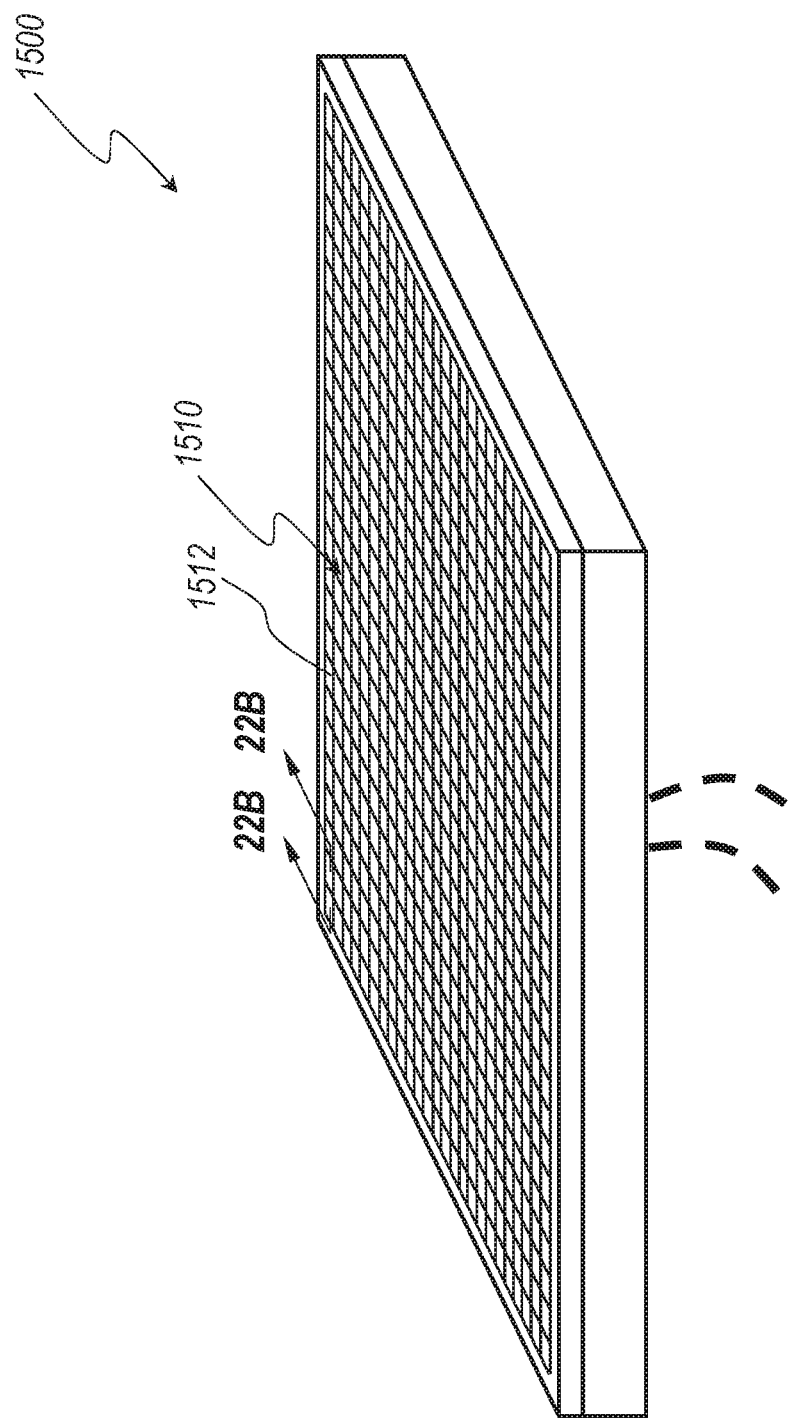
FIG. 22A is a perspective view of another embodiment of a weather-detecting device that includes a substantially square array of heating elements.
Figure 22B:
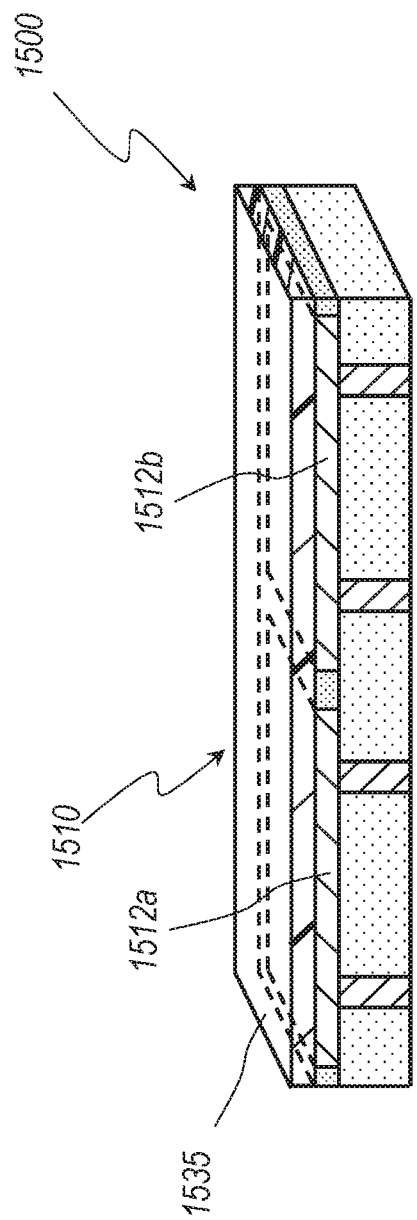
FIG. 22B depicts a cross-sectional perspective view of a portion of the weather-detecting device of FIG. 22A that depicts two of the heating elements of the array.

FIGS. 22A and 22B depict another embodiment of a weather-detecting device 1500, which can resemble the weather-detecting devices discussed above. The weather-detecting detecting device 1500 includes an array 1510 of heating elements 1512. In some embodiments, the heating elements 1512 can include elements that generate heat due to the passage of electricity through them, such as electrically resistive elements. In the illustrated embodiment, the heating elements 1512 comprise light-emitting diode (LED) chips, such as infrared (IR) LED chips. In FIG. 22B, two such LED chips 1512*a*, 1512*b* are shown. In some embodiments, the device 1500 includes an absorber layer 1535 positioned over the array 1510 of LED chips 1512. The absorber layer 1535 can comprise any suitable material to ensure an efficient conversion of light into heat. For example, in various embodiments, the absorber layer 1535 may comprise any suitable metal- and/or carbon-based bolometer absorbers, such as those that are conventionally used. In certain embodiments, the absorber layer 1535 can include one or more varieties of nanopatterned metamaterial absorbers that are tuned to the specific wavelength or wavelengths of usable light.

As previously mentioned, although many of the embodiments described above are described in the context of weather detection, these or further embodiments may be used in other contexts. For example, the foregoing discussions regarding wind or turbulence detection can apply to the detection of movement of media other than air. In various embodiments, the detectors may, more generally, be used to detect the turbulence or flow patterns of, e.g., fluids, whether those fluids are in a gaseous and/or liquid phase. Moreover, while various embodiments may be used to detect natural phenomena, such as weather, these or further embodiments may be used to detect man-made phenomena (e.g., artificial air flow). Accordingly, the term "fluid flow" may encompass such phenomena as natural wind, artificial air flow, and/or the flow of other media (e.g., one or more fluids). Similarly, the term "turbulence" may encompass such phenomena as natural air turbulence, artificial air turbulence, and/or turbulence in other media (e.g., one or more fluids). Heating or cooling events may arise from such fluid flow and/or turbulence in any of these contexts.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. For example, where the term "substantially planar" is recited with respect to a feature, it is understood that in further embodiments, the feature can have a precisely planar orientation. Similarly, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

As used herein, the term "at least one of" is intended to be synonymous with "one or more of." For example, "at least one of A, B and C" explicitly includes only A, only B, only C, and combinations of each.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the preceding claims up to and including claim [x]," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed in accordance with 35 U.S.C. § 112(f).

The invention claimed is:

1. A weather-detecting device comprising:
a substrate having a first side;
a detection region exposed to an environment within which the weather-detecting device is situated when in use;
an array of heating elements mounted at the first side of the substrate, at least one surface of each heating element in the array being positioned within the detection region; and
a controller electrically coupled to the array of heating elements, the controller being configured to individually address each heating element in the array to selectively pass electrical power through each heating element, wherein the controller is configured to maintain each heating element at a corresponding target temperature, wherein the corresponding target temperature of each heating element has a value above that of an ambient temperature of said environment, wherein the controller maintains each heating element at the target temperature thereof by sending pulses of electrical power through each heating element, and wherein for each heating element in the array, when the heating element encounters only the ambient temperature of said environment, the controller is configured to maintain the heating element at the target temperature by sending pulses of electrical power through the heating element.

2. The weather-detecting device of claim 1, further comprising a plurality of vias that are electrically coupled to the array of heating elements and pass through the substrate, wherein the controller is configured to address the array of heating elements by way of the plurality of vias.

3. The weather-detecting device of claim 1, wherein each heating element in the array is electrically isolated from the rest of the heating elements.

4. The weather-detecting device of claim 1, further comprising a plurality of thermal barriers that encompass individual heating elements to inhibit thermal conduction from the heating elements.

5. The weather-detecting device of claim 4, wherein the plurality of thermal barriers are arranged as a two-dimensional grid of intersecting lines that form a two-dimensional array of islands.

6. The weather-detecting device of claim 5, wherein each heating element is positioned on one of said islands.

7. The weather-detecting device of claim 1, wherein, for each heating element in the array, at least a portion of the heating element is suspended above the substrate to provide a thermal gap between the heating element and the substrate.

8. The weather-detecting device of claim 7, further comprising a suspension element via which said at least a portion of the heating element is suspended above the substrate.

9. The weather-detecting device of claim 8, wherein a maximum thickness of the suspension element is substantially smaller than a maximum thickness of the substrate.

10. The weather-detecting device of claim 8, wherein each heating element is positioned on its own suspension element, and wherein each suspension element is physically separate from neighboring suspension elements.

11. The weather-detecting device of claim 1, wherein for each heating element in the array, when the heating element encounters a cooling event that reduces the temperature of the heating element from the target temperature, the controller returns the heating element to the target temperature by sending pulses of electrical power though the heating element.

12. The weather-detecting device of claim 11, further comprising a processor coupled with the controller, wherein the processor is configured to filter a first cooling event that includes wind flow over a first set of the heating elements from a second cooling event that includes a hydrometeor contacting a second set of the heating elements to isolate data pertaining to the second cooling event.

13. The weather-detecting device of claim 12, wherein the second set of heating elements is a subset of the first set of heating elements.

14. The weather-detecting device of claim 12, wherein a first recovery time required for the controller to return at least a portion of the first set of heating elements to the target temperature after the first cooling event is different from a second recovery time required for the controller to return at least a portion of the second set of heating elements to the target temperature after the second cooling event.

15. The weather-detecting device of claim 14, wherein the processor is configured to filter the first cooling event from the second cooling event based on the first recovery time being different from the second recovery time.

16. The weather-detecting device of claim 1, wherein the controller comprises one or more comparators to determine whether each heating element is presently at the target temperature, wherein the controller is configured to continuously send pulses of electrical power to the heating element until the heating element is at the target temperature.

17. The weather-detecting device of claim 1, wherein the controller maintains each of the heating elements at the same target temperature.

18. The weather-detecting device of claim 1, further comprising a processor configured to determine a type of hydrometeor that comes into contact with one or more of the heating elements based on one or more of a number of heating elements in contact with the hydrometeor, a configuration of heating elements in contact with the hydrometeor, or an amount of power delivered to the hydrometeor via the heating elements.

19. The weather-detecting device of claim 1, further comprising a processor configured to determine a precipitation rate based on an amount of power delivered to hydrometeors that come into contact with the heating elements.

20. The weather-detecting device of claim 1, wherein at least a portion of each heating element comprises a planar portion, and wherein the planar portions of the heating elements are substantially coplanar.

21. The weather-detecting device of claim 1, wherein the array of heating elements has a density of no fewer than 10 heating elements per square centimeter or no fewer than 100 heating elements per square centimeter.

22. A weather-detecting device comprising:
a substrate comprising a first side and a second side opposite the first side;
a first heating element mounted at the first side of the substrate;
a first via in electrical contact with the first heating element, the first via extending through the substrate;
a second heating element mounted at the first side of the substrate, the second heating element being electrically isolated from the first heating element;
a second via in electrical contact with the second heating element, the second via extending through the substrate; and
a controller in electrical communication with each of the first and second heating elements by way of the first and second vias, respectively, wherein the controller is configured to separately provide power to each of the first and second heating elements while a single hydrometeor is in simultaneous contact with each of the first and second heating elements, wherein the controller is configured to maintain each heating element at a corresponding target temperature, wherein the corresponding target temperature of each heating element has a value above that of an ambient temperature of said environment, wherein the controller maintains each heating element at the target temperature thereof by sending pulses of electrical power through each heating element, and wherein for each heating element in the array, when the heating element encounters only the ambient temperature of said environment, the controller is configured to maintain the heating element at the target temperature by sending pulses of electrical power through the heating element.

23. A weather-detecting device comprising:
a substrate having a first side;

a detection region exposed to an environment within which the weather-detecting device is situated when in use;

an array of heating elements mounted at the first side of the substrate, at least one surface of each heating element in the array being positioned within the detection region;

a controller electrically coupled to the array of heating elements, the controller being configured to individually address each heating element in the array to selectively pass electrical power through each heating element; and a processor configured to determine a type of hydrometeor that comes into contact with one or more of the heating elements based on one or more of: a number of heating elements in contact with the hydrometeor, a configuration of heating elements in contact with the hydrometeor, or an amount of power delivered to the hydrometeor via the heating elements.

24. The weather-detecting device of claim 23, wherein the controller is configured to maintain each heating element at a corresponding target temperature, wherein the corresponding target temperature of each heating element has a value above that of an ambient temperature of said environment, wherein the controller maintains each heating element at the target temperature thereof by sending pulses of electrical power through each heating element, and wherein for each heating element in the array, when the heating element encounters only the ambient temperature of said environment, the controller is configured to maintain the heating element at the target temperature by sending pulses of electrical power through the heating element.

25. The weather-detecting device of claim 23, further comprising a plurality of thermal barriers that encompass individual heating elements to inhibit thermal conduction from the heating elements.

26. The weather-detecting device of claim 23, wherein for each heating element in the array, when the heating element encounters a cooling event that reduces the temperature of the heating element from the target temperature, the controller returns the heating element to the target temperature by sending pulses of electrical power though the heating element.

27. The weather-detecting device of claim 23, further comprising a processor coupled with the controller, wherein the processor is configured to filter a first cooling event that includes wind flow over a first set of the heating elements from a second cooling event that includes a hydrometeor contacting a second set of the heating elements to isolate data pertaining to the second cooling event.

28. The weather-detecting device of claim 23, wherein the controller maintains each of the heating elements at the same target temperature.

29. The weather-detecting device of claim 23, further comprising at least one of:

a processor configured to determine a precipitation rate based on an amount of power delivered to hydrometeors that come into contact with the heating elements; and wherein at least a portion of each heating element comprises a planar portion, and wherein the planar portions of the heating elements are substantially coplanar.

* * * * *